United States Patent
Takahashi et al.

(10) Patent No.: US 11,792,338 B2
(45) Date of Patent: Oct. 17, 2023

(54) IMAGE PROCESSING SYSTEM FOR CONTROLLING AN IMAGE FORMING APPARATUS WITH A MICROPHONE

(71) Applicant: CANON KABUSHIKI KAISHA, Tokyo (JP)

(72) Inventors: Toru Takahashi, Matsudo (JP); Yuji Naya, Kawasaki (JP); Takeshi Matsumura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/459,911

(22) Filed: Aug. 27, 2021

(65) Prior Publication Data
US 2021/0392236 A1   Dec. 16, 2021

Related U.S. Application Data

(63) Continuation of application No. 16/723,844, filed on Dec. 20, 2019, now Pat. No. 11,159,684.

(30) Foreign Application Priority Data

Dec. 27, 2018 (JP) ................................. 2018-246036

(51) Int. Cl.
*H04N 1/00* (2006.01)

(52) U.S. Cl.
CPC ..... *H04N 1/00403* (2013.01); *H04N 1/00384* (2013.01); *H04N 2201/0094* (2013.01)

(58) Field of Classification Search
CPC .................................................. H04N 1/00403
USPC ......................................................... 358/1.15
See application file for complete search history.

(56) References Cited

U.S. PATENT DOCUMENTS

| | | | |
|---|---|---|---|
| 10,599,767 B1* | 3/2020 | Mattera | G06F 40/268 |
| 2003/0212563 A1* | 11/2003 | Ju | G06F 3/018 704/277 |
| 2006/0122884 A1 | 6/2006 | Graham et al. | |
| 2008/0074293 A1* | 3/2008 | Yoshimura | H04N 1/00488 341/23 |
| 2010/0009720 A1 | 1/2010 | Cha et al. | |
| 2011/0035671 A1* | 2/2011 | Iwai | H04N 1/00403 715/728 |
| 2014/0376016 A1* | 12/2014 | Yanagi | B65H 1/28 358/1.12 |
| 2018/0144590 A1* | 5/2018 | Mixter | G10L 15/22 |

FOREIGN PATENT DOCUMENTS

| CN | 104796527 A | 7/2015 |
|---|---|---|
| JP | 2011039571 A | 2/2011 |

* cited by examiner

*Primary Examiner* — Jacky X Zheng
(74) *Attorney, Agent, or Firm* — Canon U.S.A., Inc. IP Division

(57) ABSTRACT

An image forming system is configured to receive an input of natural language speech. Regardless of whether the natural language speech includes a combination of first words or second words, the image forming system can recognize the natural language speech as an instruction to select a specific print setting displayed on a screen.

23 Claims, 72 Drawing Sheets

FIG. 7B

| GROUP ID | SPEECH RECOGNITION RESULT | |
|---|---|---|
| | KATAKANA | KANA/KANJI |
| OPR00000 | SOSA | 操作 (OPERATION) |
| OPR00001 | TATCHI | |
| | TAPPU | |
| | OSU | 押す (PRESS) |
| | OUKA | 押下 (PRESS) |
| | KURIKKU | |
| OPR00002 | RONGUTATCHI | |
| | RONGUTAPPU | |
| | NAGAOSHI | 長押し (HOLD DOWN) |
| OPR00003 | SUWAIPU | |
| OPR00004 | SURAIDO | |
| OPR00005 | SUKURORU | |
| OPR00010 | OKE | OK |
| | OKKE | |
| | KAKUTEI | 確定 (CONFIRM) |
| | KETTEI | 決定 (DETERMINE) |
| | KIMARI | 決まり (DECIDE) |
| OPR00011 | KAISHI | 開始 (START) |
| | SUTATO | |
| | HAJIME | 始め (BEGIN) |
| OPR00012 | SHURYO | 終了 (END) |
| | OWARI | 終わり (FINISH) |
| | KANRYO | 完了 (COMPLETE) |
| OPR00013 | KYANSERU | |
| | CHUSHI | 中止 (STOP) |
| OPR00014 | TEISHI | 停止 (PAUSE) |
| | POZU | |
| OPR00020 | TOJIRU | 閉じる (CLOSE) |
| | TOJITE | 閉じて (CLOSE) |
| | KUROZU | |
| OPR00040 | SENTAKU | 選択 (SELECT) |
| | SETTEI | 設定 (SET) |
| | SHITEI | 指定 (SPECIFY) |
| OPR00041 | HENKO | 変更 (CHANGE) |
| | HENSHU | 編集 (EDIT) |
| OPR00042 | HOSEI | 補正 (COMPENSATE) |
| | SHUSEI | 修正 (CORRECT) |
| | CHOSEI | 調整 (ADJUST) |
| OPR00043 | SAKUJO | 削除 (DELETE) |
| | KESHI | 消し (ERASE) |
| | KESU | 消す (ERASE) |
| | SHOKYO | 消去 (DELETE) |
| | JOKYO | 除去 (REMOVE) |
| | NAKUSU | なくす (ELIMINATE) |
| | NAKUSHITE | なくして (ELIMINATE) |
| OPR00044 | KATTO | |
| | KAIJO | 解除 (CLEAR) |
| | KURIA | |
| OPR00045 | RISETTO | |
| | YARINAOSHI | やり直し (RESET) |

| GROUP ID | SPEECH RECOGNITION RESULT | |
|---|---|---|
| | KATAKANA | KANA/KANJI |
| FNC00000 | KINO | 機能 (FUNCTION) |
| | FANKUSHON | |
| FNC00001 | KOPI | |
| | FUKUSYA | 複写 (COPY) |
| | FUKUSEI | 複製 (DUPLICATE) |
| FNC00002 | INSATSU | 印刷 (PRINT) |
| | PURINTO | |
| FNC00003 | SUKYAN | |
| | YOMITORI | 読み取り (READ) |
| | YOMIKOMI | 読み込み (SCAN) |
| FNC00004 | HOZON | 保存 (SAVE) |
| | HOKAN | 保管 (STORE) |
| | KAKUNO | 格納 (STORE) |
| | NOKOSU | 残す (LEAVE) |
| | HORUDO | |
| | KIROKU | 記録 (RECORD) |
| | KAKIKOMI | 書き込み (WRITE) |
| FNC00005 | SOSHIN | 送信 (TRANSMIT) |
| | SENDO | |
| FNC00006 | JUSHIN | 受信 (RECEIVE) |
| | RESHIBU | |
| FNC00007 | SUPURU | |
| | TAMATTE | 溜まって (SPOOL) |
| FNC00008 | SHOKAI | 紹介 (INTRODUCE) |
| | HERUPU | |
| | GAIDO | |
| | INTORO | |

| GROUP ID | SPEECH RECOGNITION RESULT | |
|---|---|---|
| | KATAKANA | KANA/KANJI |
| NUM00000 | ZERO | 0, 零 (ZERO) |
| | REI | 0, 零 (ZERO) |
| | ZEROBAN | 0番, 零番 (ZEROTH) |
| | REIBAN | 0番, 零番 (ZEROTH) |
| NUM00001 | ICHI | 1, 一 (ONE) |
| | ICHIBAN | 1番, 一番 (FIRST) |
| | HITOTSUME | 1つ目, 一つ目 (FIRST) |
| NUM00002 | NI | 2, 二 (TWO) |
| | NIBAN | 2番, 二番 (SECOND) |
| | FUTATSUME | 2つ目, 二つ目 (SECOND) |
| NUM00003 | SAN | 3, 三 (THREE) |
| | SANBAN | 3番, 三番 (THIRD) |
| | MITTSUME | 3つ目, 三つ目 (THIRD) |
| NUM00004 | YON | 4, 四 (FOUR) |
| | YONBAN | 4番, 四番 (FOURTH) |
| | YOTTSUME | 4つ目, 四つ目 (FOURTH) |
| NUM99999 | KYUMAN KYUSEN KYUHYAKU KYUJU KYU | 99999, 九万九千九百九十九 (NINETY-NINE THOUSAND NINE HUNDRED AND NINETY-NINE) |
| | KYUMAN KYUSEN KYUHYAKU KYUJU KYUBAN | 99999番, 九万九千九百九十九番 (NINETY-NINE THOUSAND NINE HUNDRED AND NINETY-NINTH) |

| GROUP ID | SPEECH RECOGNITION RESULT | |
|---|---|---|
| | KATAKANA | KANA/KANJI |
| PAP00000 | YOSHI | 用紙 (SHEET) |
| | KAMI | 紙 (PAPER) |
| | SHITO | |
| | PEPA | |
| PAP00001 | SAIZU | |
| | OKISA | 大きさ (SIZE) |
| PAP00002 | KEIRETSU | 系列 (SERIES) |
| | KEITO | 系統 (SYSTEM) |
| | KATEGORI | |
| | KATEGORII | |
| PAP00003 | ISAIZU | 異サイズ (DIFFERENT SIZE) |
| PAP00004 | DOHABA | 同幅 (SAME WIDTH) |
| PAP00005 | IHABA | 異幅 (DIFFERENT WIDTH) |
| PAP00100 | EISAN | A3 |
| | ESAN | A3 |
| PAP00101 | EIYON | A4 |
| | EYON | A4 |
| PAP00102 | EIGO | A5 |
| | EGO | A5 |
| PAP00103 | BIIYON | B4 |
| | BIYON | B4 |

| GROUP ID | SPEECH RECOGNITION RESULT | |
|---|---|---|
| | KATAKANA | KANA/KANJI |
| CHR00000 | E | A, a |
| | EI | A, a |
| CHR00001 | BI | B, b |
| CHR00002 | SHI | C, c |
| CHR00003 | DI | D, d |
| | DE | D, d |
| CHR00004 | I | E, e |
| CHR00005 | EFU | F, f |
| CHR00006 | JI | G, g |
| CHR00007 | EICHI | H, h |
| | ETCHI | H, h |
| CHR00008 | AI | I, i |
| CHR00025 | ZEITO | Z, z |
| | ZI | Z, z |

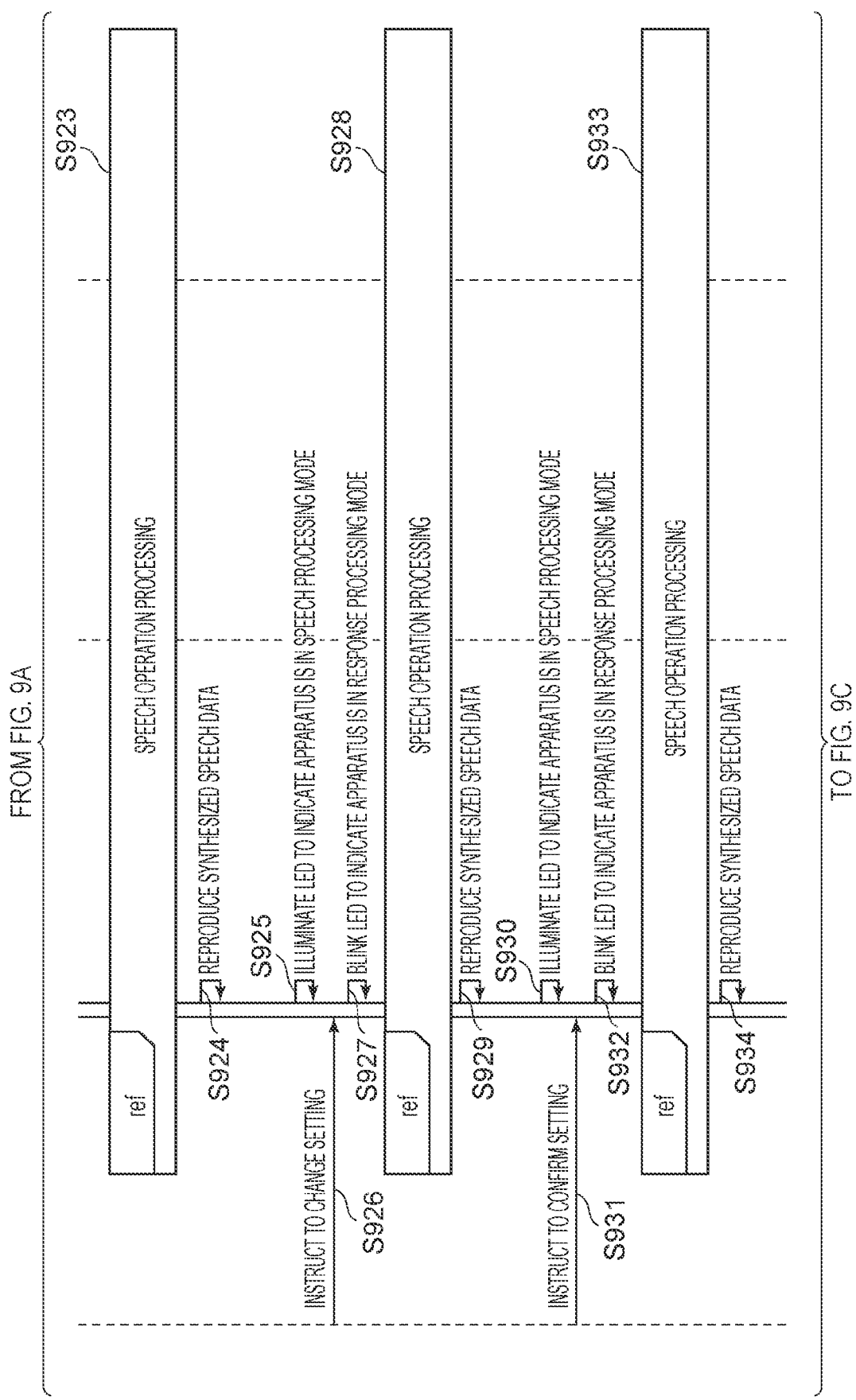

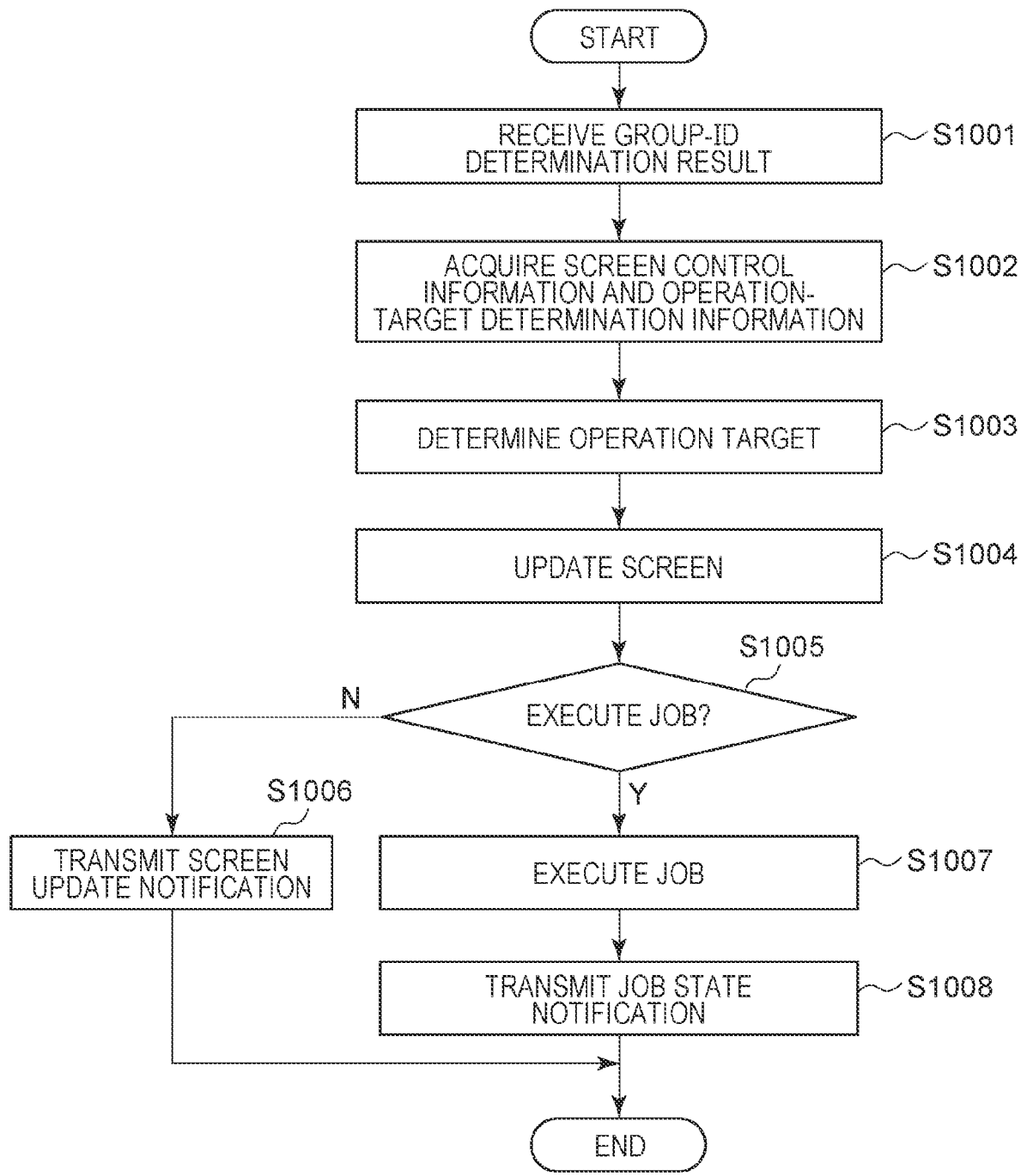

FIG. 11A

| GROUP ID | SPEECH RECOGNITION RESULT | |
| --- | --- | --- |
| | KATAKANA | KANA/KANJI |
| COL00000 | KARA | |
| | IRO | 色 (COLOR) |
| COL00001 | REDDO | |
| | AKA | 赤 (RED) |
| | AKAIRO | 赤色 (RED COLOR) |
| COL00002 | GURIN | |
| | MIDORI | 緑 (GREEN) |
| | MIDORIIRO | 緑色 (GREEN COLOR) |
| COL00003 | BURU | |
| | AO | 青 (BLUE) |
| | AOIRO | 青色 (BLUE COLOR) |
| COL00004 | IERO | |
| | KI | 黄 (YELLOW) |
| | KIIRO | 黄色 (YELLOW COLOR) |
| COL00005 | MAZENTA | |
| | MAZENDA | |
| COL00006 | SHIAN | |
| COL00100 | BURAKKU | |
| | KURO | 黒 (BLACK) |
| | KUROIRO | 黒色 (BLACK COLOR) |
| COL00101 | GURE | |
| | GURESUKERU | |
| | SHIROKUROTACHI | 白黒多値 (BLACK-AND-WHITE MULTIVALUED) |
| COL00102 | SHIROKURO | 白黒 (BLACK AND WHITE) |
| | BIDABURYU | BW |
| | MONOKURO | |
| COL00103 | SHIROKURONICHI | 白黒2値、白黒二値 (BLACK-AND-WHITE BINARY) |
| COL00110 | TANSHOKU | 単色 (SINGLE COLOR) |
| | MONOKARA | |
| COL00111 | NISHOKU | 2色、二色 (TWO COLORS) |
| | BAIKARA | |
| COL00200 | IROBETSU | 色別 (FOR EACH COLOR) |
| | IROGOTO | 色ごと (FOR EACH COLOR) |
| | KAKUSHOKU | 各色 (EACH COLOR) |
| COL00201 | ZENSHOKU | 全色 (FULL COLOR) |
| | FURUKARA | |

FIG. 11B

| GROUP ID | SPEECH RECOGNITION RESULT | |
|---|---|---|
| | KATAKANA | KANA/KANJI |
| DGR00000 | REBERU | |
| | SUIJUN | 水準 (LEVEL) |
| | DOAI | 度合い (DEGREE) |
| DGR00001 | SAISHO | 最小 (MINIMUM) |
| | MINIMAMU | |
| DGR00002 | SAIDAI | 最大 (MAXIMUM) |
| | MAKKUSU | |
| DGR00003 | MAINASU | |
| | GENSHO | 減少 (DECREASE) |
| | HERASU | 減らす (DECREASE) |
| | CHIISAKU | 小さく (SMALLER) |
| | SHUKUSHO | 縮小 (REDUCE) |
| | SUKUNAKU | 少なく (LESS) |
| | MIJIKAKU | 短く (SHORTER) |
| DGR0004 | PURASU | |
| | ZOKA | 増加 (INCREASE) |
| | FUYASU | 増やす (INCREASE) |
| | OKIKU | 大きく (LARGER) |
| | KAKUDAI | 拡大 (ENLARGE) |
| | OKU | 多く (MORE) |
| | NAGAKU | 長く (LONGER) |
| DGR0005 | ONAJI | 同じ (SAME) |
| | ISSHO | いっしょ (SAME) |
| | KAWARANAI | 変わらない (UNCHANGED) |
| | KIN'ITSU | 均一 (UNIFORM) |
| DGR00006 | CHIGAU | 違う (DIFFERENT) |
| | KOTONARU | 異なる (DIFFERENT) |
| DGR00007 | SONOMAMA | そのまま (REMAIN) |
| DGR00008 | JIDO | 自動 (AUTOMATIC) |
| | OTO | |
| DGR00009 | SHUDO | 手動 (MANUAL) |
| | MANYUARU | |
| DGR00010 | FURI | |
| | JIYU | 自由 (FREE) |
| | NIN'I | 任意 (ARBITRARY) |
| DGR00011 | TSUYOI | 強い (STRONG) |
| | TUYOKU | 強く (HARD) |
| | KITSUKU | きつく (TIGHTLY) |
| DGR00012 | YOWAI | 弱い (WEAK) |
| | YOWAKU | 弱く (SOFTLY) |
| | YURUKU | ゆるく (LOOSELY) |
| DGR00013 | TAKAKU | 高く (HIGH) |
| | TAKAME | 高目 (HIGHER) |
| DGR00014 | HIKUKU | 低く (LOW) |
| | HIKUME | 低目 (LOWER) |
| DGR00015 | HIKUI | 低い (LOW) |
| | TEI | 低 (LOW) |
| DGR00016 | CHU | 中 (MIDDLE) |
| DGR00017 | TAKAI | 高い (HIGH) |
| | KOU | 高 (HIGH) |
| DGR00018 | SUKOSHI | 少し (A LITTLE) |
| | CHOTTO | ちょっと (BIT) |
| | BI | 微 (MINUTE) |
| | WAZUKA | 僅か (SLIGHT) |
| DGR00019 | SHOSU | 少数 (FEW) |
| DGR00020 | TASU | 多数 (MANY) |
| | TAKUSAN | たくさん (A LOT OF) |

FIG. 12B

| No. | USER OPERABLE UI COMPONENT TYPE | LABEL | SCREEN CONTROL DURING OPERATION | INTERNAL PROCESSING DURING OPERATION |
|---|---|---|---|---|
| 1101 | BUTTON | Auto (Color/Black) | HIGHLIGHT THE BUTTON | |
| 1102 | BUTTON | Full Color | HIGHLIGHT THE BUTTON | |
| 1103 | BUTTON | Black | HIGHLIGHT THE BUTTON | |
| 1104 | BUTTON | Single Color | TRANSITION TO ADVANCED SETTINGS SCREEN FOR SINGLE COLOR | |
| 1105 | BUTTON | Two Colors | TRANSITION TO ADVANCED SETTINGS SCREEN FOR TWO COLORS | |
| 1111 | BUTTON | Cancel | TRANSITION TO COPY TOP SCREEN | |
| 1112 | BUTTON | OK | TRANSITION TO COPY TOP SCREEN | |
| 1113 | BUTTON | | TRANSITION TO HELP SCREEN | |
| 203 | HARDWARE KEY | | TRANSITION TO COPY TOP SCREEN | RESET JOB PARAMETERS TO DEFAULTS |
| 207 | HARDWARE KEY | | TRANSITION TO COPY JOB START SCREEN | START EXECUTION OF COPY JOB |

FIG. 12C

| No. | GROUP ID | EXAMPLE OF USER SPEECH DURING OPERATION | OPERATION ON OPERATION PANEL |
|---|---|---|---|
| 1101 | DGR00008/<br>DGR00008+COL0000+COL00102 | ・自動 (AUTO)<br>・自動カラー白黒 (AUTO, COLOR, BLACK AND WHITE) | PRESS BUTTON<br>(TOUCH THE BUTTON COORDINATE AREA) |
| 1102 | COL00201 | ・フルカラー (FULL COLOR) | PRESS BUTTON<br>(TOUCH THE BUTTON COORDINATE AREA) |
| 1103 | COL00102 | ・白黒 (BLACK AND WHITE) | PRESS BUTTON<br>(TOUCH THE BUTTON COORDINATE AREA) |
| 1104 | COL00110+COL00000 | ・単色カラー (SINGLE COLOR) | PRESS BUTTON<br>(TOUCH THE BUTTON COORDINATE AREA) |
| 1105 | COL00111+COL00000 | ・2色カラー (TWO COLORS) | PRESS BUTTON<br>(TOUCH THE BUTTON COORDINATE AREA) |
| 1111 | OPR00013 | ・キャンセル (CANCEL) | PRESS BUTTON<br>(TOUCH THE BUTTON COORDINATE AREA) |
| 1112 | OPR00010 | ・OK (OK) | PRESS BUTTON<br>(TOUCH THE BUTTON COORDINATE AREA) |
| 1113 | FNC00008 | ・ヘルプ (HELP) | PRESS BUTTON<br>(TOUCH THE BUTTON COORDINATE AREA) |
| 203 | OPR00045 | ・リセット (RESET) | PRESS HARDWARE KEY |
| 207 | OPR00011 | ・スタート (START) | PRESS HARDWARE KEY |

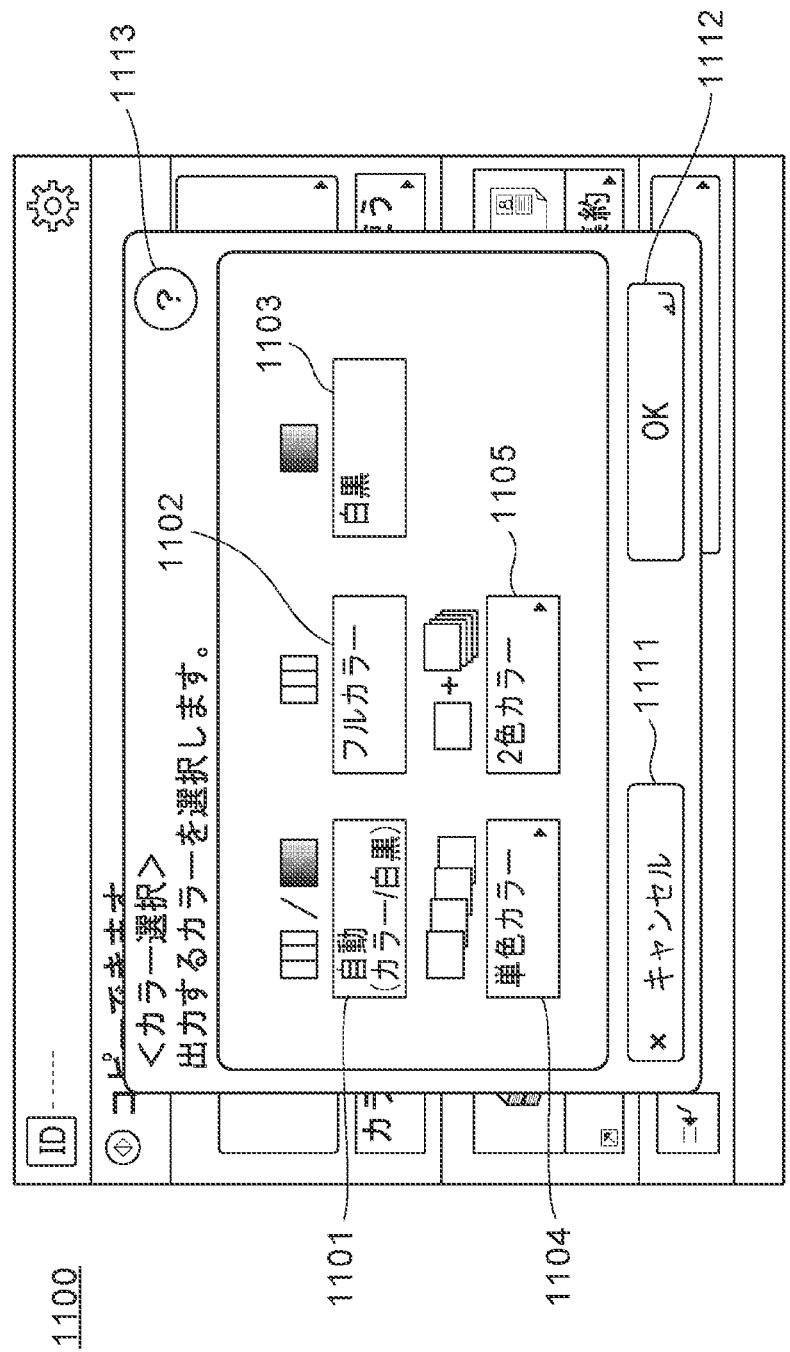

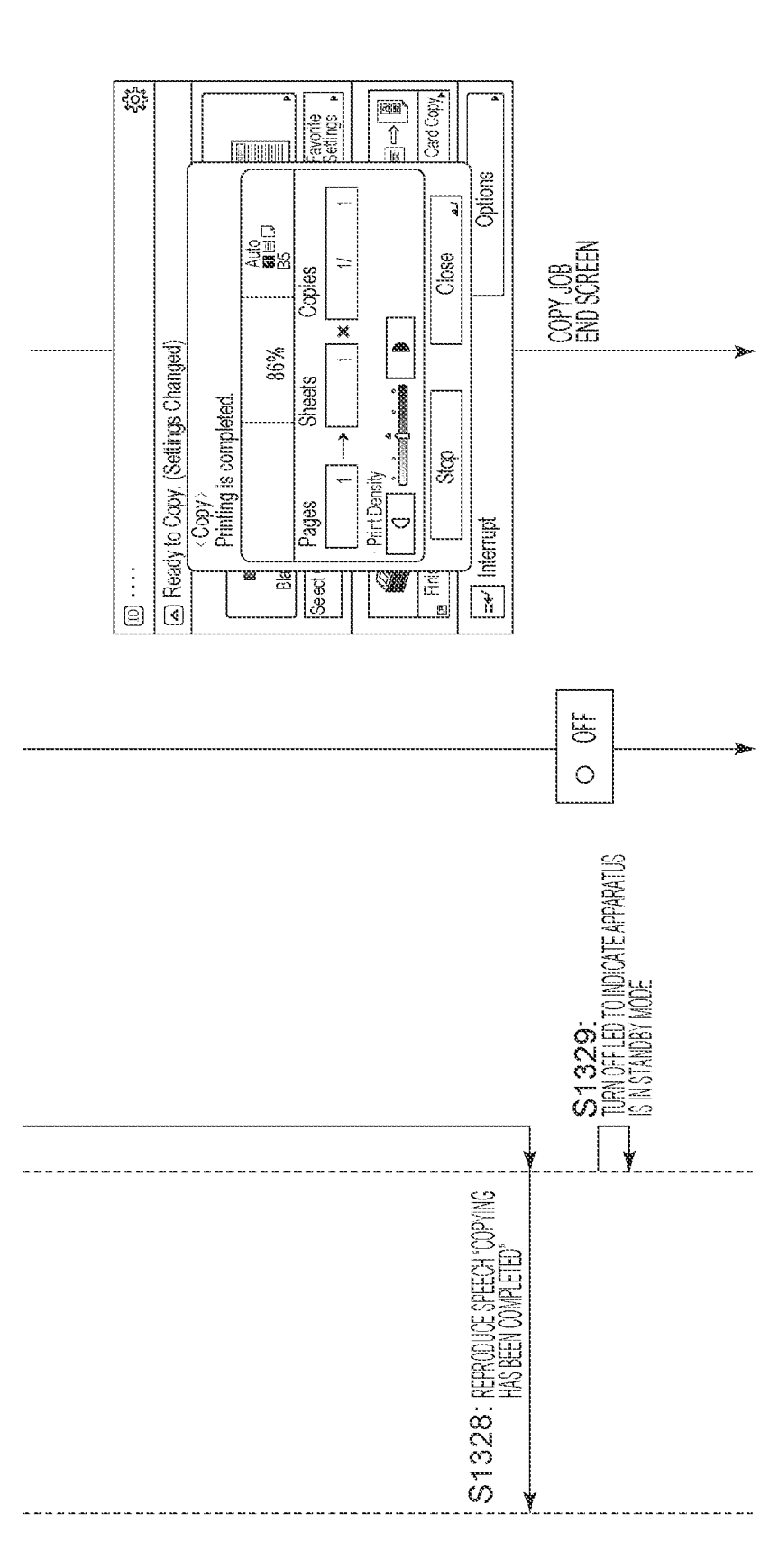

FIG. 14A

| GROUP ID | SPEECH RECOGNITION RESULT | |
|---|---|---|
| | KATAKANA | KANA/KANJI |
| NUM00000 | ZERO | 0、零(ZERO) |
| | REI | 0、零(ZERO) |
| | ZEROBAN | 0番、零番(ZEROTH) |
| | REIBAN | 0番、零番(ZEROTH) |
| NUM00001 | ICHI | 1、一(ONE) |
| | ICHIBAN | 1番、一番(FIRST) |
| | HITOTSUME | 1つ目、一つ目(FIRST) |
| NUM00002 | NI | 2、二(TWO) |
| | NIBAN | 2番、二番(SECOND) |
| | FUTATSUME | 2つ目、二つ目(SECOND) |
| NUM00003 | SAN | 3、三(THREE) |
| | SANBAN | 3番、三番(THIRD) |
| | MITTSUME | 3つ目、三つ目(THIRD) |
| NUM00004 | YON | 4、四(FOUR) |
| | YONBAN | 4番、四番(FOURTH) |
| | YOTTSUME | 4つ目、四つ目(FOURTH) |
| NUM00005 | GO | 5、五(FIVE) |
| | GOBAN | 5番、五番(FIFTH) |
| | ITSUTSUME | 5つ目、五つ目(FIFTH) |
| NUM00006 | ROKU | 6、六(SIX) |
| | ROKUBAN | 6番、六番(SIXTH) |
| | MUTTSUME | 6つ目、六つ目(SIXTH) |
| NUM00007 | NANA, SHICHI | 7、七(SEVEN) |
| | NANABAN | 7番、七番(SEVENTH) |
| | NANATSUME | 7つ目、七つ目(SEVENTH) |
| NUM00008 | HACHI | 8、八(EIGHT) |
| | HACHIBAN | 8番、八番(EIGHTH) |
| | YATTSUME | 8つ目、八つ目(EIGHTH) |
| NUM00009 | KYU | 9、九(NINE) |
| | KYUBAN | 9番、九番(NINTH) |
| | KOKONOTSUME | 9つ目、九つ目(NINTH) |
| NUM00010 | JU | 10、十(TEN) |
| | JUBAN | 10番、十番(TENTH) |
| NUM00011 | JUICHI | 11、十一(ELEVEN) |
| | JUICHIBAN | 11番、十一番(ELEVENTH) |
| NUM00012 | JUNI | 12、十二(TWELVE) |
| | JUNIBAN | 12番、十二番(TWELFTH) |
| ⋮ | | |
| NUM99999 | KYUMAN KYUSEN KYUHYAKU KYUJU KYU | 99999、九万九千、九百九十九 (NINETY-NINE THOUSAND NINE HUNDRED AND NINETY-NINE) |
| | KYUMAN KYUSEN KYUHYAKU KYUJU KYUBAN | 99999番、九万九、千九百九十九番 (NINETY-NINE THOUSAND NINE HUNDRED AND NINETY-NINTH) |

FIG. 14B

| GROUP ID | SPEECH RECOGNITION RESULT | |
|---|---|---|
| | KATAKANA | KANA/KANJI |
| CHR00000 | E | A, a |
| | EI | A, a |
| CHR00001 | BI | B, b |
| CHR00002 | SHI | C, c |
| CHR00003 | DI | D, d |
| | DE | D, d |
| CHR00004 | I | E, e |
| CHR00005 | EFU | F, f |
| CHR00006 | JI | G, g |
| CHR00007 | EICHI | H, h |
| | ETCHI | H, h |
| CHR00008 | AI | I, i |
| ⋮ | ⋮ | ⋮ |
| CHR00025 | ZETTO | Z, z |
| | ZI | Z, z |

FIG. 15A

| GROUP ID | SPEECH RECOGNITION RESULT ||
|---|---|---|
| | KATAKANA | KANA/KANJI |
| CHR00100 | HIDARIKAKKO | 左括弧 (LEFT BRACKET) |
| CHR00101 | HIDARIKAGIKAKKO | 左鉤括弧、「(LEFT CORNER BRACKET) |
| CHR00102 | HIDARIMARUKAKKO | 左丸括弧、((LEFT ROUND BRACKET) |
| | HIDARISHOKAKKO | 左小括弧、((LEFT PARENTHESIS) |
| CHR00103 | HIDARICHUKAKKO | 左中括弧、{ (LEFT CURLY BRACKET) |
| CHR00104 | HIDARIDAIKAKKO | 左大括弧、[ (LEFT SQUARE BRACKET) |
| CHR00110 | MIGIKAKKO | 右括弧 (RIGHT BRACKET) |
| | KAKKOTOJI | 括弧閉じ (CLOSING BRACKET) |
| CHR00111 | MIGIKAGIKAKKO | 右鉤括弧、」(RIGHT CORNER BRACKET) |
| | KAGIKAKKOTOJI | 鉤括弧閉じ、」(CLOSING CORNER BRACKET) |
| CHR00112 | MIGIMARUKAKKO | 右丸括弧、) (RIGHT ROUND BRACKET) |
| | MARUKAKKOTOJI | 丸括弧閉じ、) (CLOSING PARENTHESIS) |
| | MIGISHOKAKKO | 右小括弧、) (RIGHT PARENTHESIS) |
| | SHOKAKKOTOJI | 小括弧、) (CLOSING PARENTHESIS) |
| CHR00113 | MIGICHUKAKKO | 右中括弧、} (RIGHT CURLY BRACKET) |
| | CHUKAKKOTOJI | 中括弧閉じ、} (CLOSING CURLY BRACKET) |
| CHR00114 | MIGIDAIKAKKO | 右大括弧、] (RIGHT SQUARE BRACKET) |
| | DAIKAKKOTOJI | 大括弧閉じ、] (CLOSING SQUARE BRACKET) |
| CHR00120 | HAIFUN | - |
| | YOKOBO | 横棒 (HORIZONTAL BAR) |
| | YOKOSEN | 横線 (HORIZONTAL LINE) |
| | BOSEN | 棒線 (BAR LINE) |
| CHR00121 | ANDABA | _ |
| | KASEN | 下線 (UNDERSCORE) |
| CHR00122 | KARETTO | ^ |
| | HATTO | ^ |
| CHR00123 | EN | 円 (YEN) |
| | ENKIGO | 円記号 (YEN SIGN) |
| | ENMAKU | 円マーク (YEN SIGN) |
| CHR00124 | ATTOMAKU | @ |
| CHR00125 | KANMA | , |
| | KONMA | , |
| CHR00126 | PIRIODO | . |
| | DOTTO | |

FROM FIG. 15A

| | | |
|---|---|---|
| CHR00127 | EKUSUKURAMESHON | ! |
| | KANTANFU | 感嘆符 (EXCLAMATION MARK) |
| CHR00128 | DABURUKOTO | " |
| | DABURUKUOTO | " |
| | DABURUKOTESHON | " |
| | DABURUKUOTESHON | " |
| | IN'YOFU | 引用符 (QUOTATION MARK) |
| CHR00129 | SHINGURUKOTO | ' |
| | SHINGURUKUOTO | ' |
| | SHINGURUKOTESHON | ' |
| | SHINGURUKUOTESHON | ' |
| | APOSUTOROFI | ' |
| | AKUSANTEGYU | ' |
| CHR00130 | BAKKUKOTO | ` |
| | BAKKUKUOTO | ` |
| | BAKKUKOTESHON | ` |
| | BAKKUKUOTESHON | ` |
| CHR00131 | IGETA | # |
| | SHAPU | |
| CHR00132 | DORU | $ |
| | DARA | $ |
| CHR00133 | ANDO | & |
| | ANPASANDO | & |
| CHR00134 | CHIRUDA | ~ |
| | NAMISEN | 波線 (WAVY LINE) |
| | NYORO | |
| CHR00135 | TATESEN | 縦線 (VERTICAL BAR) |
| | PAIPU | \| |
| CHR00136 | KORON | : |
| CHR00137 | SEMIKORON | ; |

FIG. 15C

| GROUP ID | SPEECH RECOGNITION RESULT | |
| --- | --- | --- |
| | KATAKANA | KANA/KANJI |
| CHR00138 | ASUTARISUKU | ＊ |
| | ASUTERISUKU | ＊ |
| | KOME | 米 (ASTERISK) |
| CHR00139 | RESUZAN | < |
| | SHONARI | 小なり (LESS THAN) |
| CHR00140 | GURETAZAN | > |
| | DAINARI | 大ナリ (GREATER THAN) |
| CHR00141 | SURASSHU | ／ |
| | SHASEN | 斜線 (SLASH) |
| | HIDARISHASEN | 左斜線 (DIAGONAL LINE FROM LOWER LEFT TO UPPER RIGHT) |
| CHR00142 | BAKKUSURASSHU | ＼ |
| | MIGISHASEN | 右斜線 (DIAGONAL LINE FROM UPPER LEFT TO LOWER RIGHT) |
| CHR00143 | KUESUCHON | ? |
| | KUESUSHON | ? |
| | HATENA | ? |
| | GIMONFU | 疑問符 (QUESTION MARK) |
| CHR00144 | IKORU | = |
| CHR00145 | KUTEN | 句点 (PERIOD) |
| | MARU | 丸 (CIRCLE) |
| CHR00146 | TOTEN | 読点 (COMMA) |
| | TEN | 点 (POINT) |
| CHR00147 | NAKATEN | 中点 (MIDDLE DOT) |
| | CHUTEN | 中点 (MIDPOINT) |

FIG. 15D

| GROUP ID | SPEECH RECOGNITION RESULT | |
| --- | --- | --- |
| | KATAKANA | KANA/KANJI |
| KEY00000 | TENKI | |
| | KIBODO | |
| KEY00001 | BAKKUSUPESU | |
| KEY00002 | RITAN | |
| KEY00003 | SUPESU | |
| | KUHAKU | 空白 (SPACE) |
| KEY00004 | HENKAN | 変換 (CONVERT) |
| KEY00005 | HANKAKU | 半角 (HALF-WIDTH) |
| KEY00006 | ZENKAKU | 全角 (FULL-WIDTH) |
| KEY00007 | KANAKAN | かな漢 (KANA-KANJI) |
| KEY00008 | KATAKANA | |
| KEY00009 | EIJI | 英字 (ALPHABETIC) |
| | EISUJI | 英数字 (ALPHANUMERIC) |
| | ARUFABETTO | |
| KEY00010 | KIGO | 記号 (SIGN) |
| | MAKU | |
| KEY00011 | KODO | |

FIG. 16A

| GROUP ID | SPEECH RECOGNITION RESULT | |
|---|---|---|
| | KATAKANA | KANA/KANJI |
| OPR00000 | SOSA | 操作 (OPERATION) |
| OPR00001 | TATCHI | |
| | TAPPU | |
| | OSU | 押す (PRESS) |
| | OUKA | 押下 (PRESS) |
| | KURIKKU | |
| OPR00002 | RONGUTATCHI | |
| | RONGUTAPPU | |
| | NAGAOSHI | 長押し (HOLD DOWN) |
| OPR00003 | SUWAIPU | |
| OPR00004 | SURAIDO | |
| OPR00005 | SUKURORU | |
| OPR00010 | OKE | OK |
| | OKKE | |
| | KAKUTEI | 確定 (CONFIRM) |
| | KETTEI | 決定 (DETERMINE) |
| | KIMARI | 決まり (DECIDE) |
| OPR00011 | KAISHI | 開始 (START) |
| | SUTATO | |
| | HAJIME | 始め (BEGIN) |
| OPR00012 | SHURYO | 終了 (END) |
| | OWARI | 終わり (FINISH) |
| | KANRYO | 完了 (COMPLETE) |
| OPR00013 | KYANSERU | |
| | CHUSHI | 中止 (STOP) |
| OPR00014 | TEISHI | 停止 (PAUSE) |
| | POZU | |
| OPR00020 | TOJIRU | 閉じる (CLOSE) |
| | TOJITE | 閉じて (CLOSE) |
| | KUROZU | |
| OPR00021 | TSUGINI | 次に (NEXT) |
| | TSUGIE | 次へ (NEXT) |
| | SUSUMU | 進む (PROCEED) |
| | JIGAMEN | 次画面 (NEXT SCREEN) |
| OPR00022 | MAENI | 前に (BACK) |
| | MAEE | 前へ (RETURN) |
| | MODORU | 戻る (RETURN) |
| | MODOSU | 戻す (RETURN) |
| | ZENGAMEN | 前画面 (PREVIOUS SCREEN) |
| OPR00030 | HAI | |
| | UN | |
| | IESU | Yes |
| OPR00031 | IIE | |
| | NO | No |
| OPR00032 | ON | ON |
| | YUKO | 有効 (ENABLE) |
| OPR00033 | OFU | OFF |
| | MUKO | 無効 (DISABLE) |
| OPR00034 | ARI | 有り (OK) |
| | SURU | する (YES) |
| OPR00035 | NASHI | 無し (CANCEL) |
| | SHINAI | (NO) |

FIG. 16B

| GROUP ID | SPEECH RECOGNITION RESULT | |
| --- | --- | --- |
| | KATAKANA | KANA/KANJI |
| OPR00040 | SENTAKU | 選択(SELECT) |
| | SETTEI | 設定(SET) |
| | SHITEI | 指定(SPECIFY) |
| OPR00041 | HENKO | 変更(CHANGE) |
| | HENSHU | 編集(EDIT) |
| OPR00042 | HOSEI | 補正(COMPENSATE) |
| | SHUSEI | 修正(CORRECT) |
| | CHOSEI | 調整(ADJUST) |
| OPR00043 | SAKUJO | 削除(DELETE) |
| | KIE | 消え(DISAPPEAR) |
| | KESHI | 消し(ERASE) |
| | KESU | 消す(ERASE) |
| | SHOKYO | 消去(DELETE) |
| | JOKYO | 除去(REMOVE) |
| | NAKUSU | なくす(ELIMINATE) |
| | NAKUSHITE | なくして(ELIMINATE) |
| | KATTO | |
| OPR00044 | KAIJO | 解除(CLEAR) |
| | KURIA | |
| | TORIKESHI | 取り消し(CANCEL) |
| OPR00045 | RISETTO | |
| | YARINAOSHI | やり直し(RESET) |
| OPR00046 | CHEKKU | |
| | KAKUNIN | 確認(CHECK) |
| OPR00047 | TOROKU | 登録(REGISTER) |
| | REJISUTA | |
| OPR00048 | SHOSAI | 詳細(DETAILS) |
| | KOMAKAI | 細かい(ADVANCED) |
| | KUWASHI | 詳しい(DETAILED) |
| OPR00049 | RIYO | 利用(USE) |
| | SHIYO | 使用(USE) |
| | TSUKAU | 使う(USE) |
| OPR00050 | NYURYOKU | 入力(INPUT) |
| OPR00051 | SHUTSURYOKU | 出力(OUTPUT) |
| OPR00060 | KINSHI | 禁止(PROHIBITED) |
| | DEKINAI | できない(NOT ALLOWED) |
| | FUKYOKA | 不許可(NOT PERMITTED) |
| | DAME | |
| OPR00061 | ERA | |
| | SHIPPAI | 失敗(FAILURE) |
| | ENUJI | NG(FAILURE) |

FIG. 16C

| GROUP ID | SPEECH RECOGNITION RESULT | |
|---|---|---|
| | KATAKANA | KANA/KANJI |
| UIP00001 | BOTAN | |
| | KI | |
| UIP00002 | PURUDAUN | |
| | DOROPPUDAUN | |
| UIP00003 | AIKON | |
| UIP00004 | FOMU | |
| UIP00005 | BOKKUSU | |
| UIP00006 | GAMEN | 画面 (SCREEN) |
| | WINDO | |
| UIP00007 | POPPUAPPU | |
| | POPPUOBA | |
| | MODARU | |
| | DAIAROGU | |
| UIP00008 | MENYU | |
| UIP00009 | SURAIDA | |
| UIP00010 | SUITCHI | |
| UIP00011 | HYO | 表 (TABLE) |
| | RISUTO | |
| | ICHIRAN | 一覧 (LIST) |

FIG. 17A

| GROUP ID | SPEECH RECOGNITION RESULT | |
| --- | --- | --- |
| | KATAKANA | KANA/KANJI |
| POS00000 | ICHI | 位置 (POSITION) |
| | POJISHON | |
| POS00001 | BASHO | 場所 (PLACE) |
| | RYOIKI | 領域 (REGION) |
| | ERIA | |
| | BUROKKU | |
| POS00010 | UE | 上 (UP) |
| | REIDO | 0° |
| | ZERODO | 0° |
| POS00011 | MIGIUE | 右上 (UPPER RIGHT) |
| | YONJUGODO | 45° |
| POS00012 | MIGI | 右 (RIGHT) |
| | KYUJUDO | 90° |
| POS00013 | MIGISHITA | 右下 (LOWER RIGHT) |
| | HYAKUSANJUGODO | 135° |
| POS00014 | SHITA | 下 (DOWN) |
| | HYAKUHACHIJUDO | 180° |
| POS00015 | HIDARISHITA | 左下 (LOWER LEFT) |
| | NIHYAKUNIJUGODO | 225° |
| POS00016 | HIDARI | 左 (LEFT) |
| | NIHYAKUNANAJUDO | 270° |
| POS00017 | HIDARIUE | 左上 (UPPER LEFT) |
| | SANBYAKUJUGODO | 315° |
| POS00018 | CHUO | 中央 (CENTER) |
| | SENTA | Center |
| | MANNAKA | 真ん中 (MIDDLE) |
| | CHUSHIN | 中心 (CENTER) |
| POS00020 | JOBU | 上部 (UPPER PART) |
| | TEN | 天 (TOP) |
| | JOHEN | 上辺 (UPPER SIDE) |
| POS00021 | KABU | 下部 (LOWER PART) |
| | CHI | 地 (BOTTOM) |
| | KAHEN | 下辺 (LOWER SIDE) |
| | TEIHEN | 底辺 (BOTTOM SIDE) |
| POS00022 | JOGE | 上下 (UP AND DOWN) |
| | UESHITA | 上下 (UP AND DOWN) |
| POS00023 | SAYU | 左右 (LEFT AND RIGHT) |
| | HIDARIMIGI | 左右 (LEFT AND RIGHT) |
| | MIGIHIDARI | 右左 (RIGHT AND LEFT) |

FIG. 17B

| GROUP ID | SPEECH RECOGNITION RESULT | |
| --- | --- | --- |
| | KATAKANA | KANA/KANJI |
| POS00030 | ZENSHU | 全周 (PERIMETER) |
| | MAWARI | 周り (CIRCUMFERENCE) |
| POS00031 | OKU | 奥 (BACK) |
| | MUKO | 向う (OTHER SIDE) |
| | TOI | 遠い (DISTANT) |
| | TOKU | 遠く (FAR) |
| POS00032 | TEMAE | 手前 (FRONTWARD) |
| | KOTCHI | |
| | KOCHIRA | こちら (THIS SIDE) |
| | CHIKAI | 近い (NEAR) |
| | CHIKAKU | 近く (NEAR) |
| POS00040 | MUKI | 向き (ORIENTATION) |
| | HOKO | 方向 (DIRECTION) |
| POS00041 | TATEYOKO | 縦横 (VERTICAL AND HORIZONTAL) |
| POS00042 | TATE | 縦 (VERTICAL) |
| POS00043 | TATENAGA | 縦長 (PORTRAIT) |
| | POTORETO | |
| POS00045 | YOKO | 横 (HORIZONTAL) |
| POS00046 | YOKONAGA | 横長 (LANDSCAPE) |
| | RANDOSUKEPU | |
| POS00047 | CHOHEN | 長辺 (LONG SIDE) |
| | NAGATE | 長手 (LONGITUDINAL) |
| POS00048 | TANPEN | 短辺 (SHORT SIDE) |
| | MIJIKATE | 短手 (LATERAL) |
| | MIJIKADE | 短手 (LATERAL) |
| POS00050 | HANTAI | 反対 (OPPOSITE) |
| | GYAKU | 逆 (REVERSE) |
| | HANTEN | 反転 (INVERSE) |
| POS00051 | SEITAI | 正対 (FACE-TO-FACE) |
| POS00101 | ICHIDANME | 一段目、1段目 (FIRST ROW) |
| | ICHIGYOME | 一行目、1行目 (FIRST ROW) |
| POS00102 | NIDANME | 二段目、2段目 (SECOND ROW) |
| | NIGYOME | 二行目、2行目 (SECOND ROW) |
| POS00103 | SANDANME | 三段目、3段目 (THIRD ROW) |
| | SANGYOME | 三行目、3行目 (THIRD ROW) |
| POS00111 | ICHIRETSUME | 一列目、1列目 (FIRST COLUMN) |
| POS00112 | NIRETSUME | 二列目、2列目 (SECOND COLUMN) |
| POS00113 | SANRETSUME | 三列目、3列目 (THIRD COLUMN) |

FIG. 18A

| GROUP ID | SPEECH RECOGNITION RESULT | |
| --- | --- | --- |
| | KATAKANA | KANA/KANJI |
| FNC00000 | KINO | 機能(FUNCTION) |
| | FANKUSHON | |
| FNC00001 | KOPI | |
| | FUKUSYA | 複写(COPY) |
| | FUKUSEI | 複製(DUPLICATE) |
| FNC00002 | INSATSU | 印刷(PRINT) |
| | PURINTO | |
| FNC00003 | SUKYAN | |
| | YOMITORI | 読み取り(READ) |
| | YOMIKOMI | 読み込み(SCAN) |
| FNC00004 | HOZON | 保存(SAVE) |
| | HOKAN | 保管(STORE) |
| | KAKUNO | 格納(STORE) |
| | NOKOSU | 残す(LEAVE) |
| | HORUDO | |
| | KIROKU | 記録(RECORD) |
| | KAKIKOMI | 書き込み(WRITE) |
| FNC00005 | SOSHIN | 送信(SEND) |
| | SENDO | |
| FNC00006 | JUSHIN | 受信(RECEIVE) |
| | RESHIBU | |
| FNC00007 | SUPURU | |
| | TAMATTE | 溜まって(SPOOL) |
| FNC00008 | SHOKAI | 紹介(INTRODUCE) |
| | HERUPU | |
| | GAIDO | |
| | INTORO | |
| FNC00010 | NINSHO | 認証(AUTHENTICATION) |
| FNC00011 | JOKYO | 状況(STATUS) |
| | JOTAI | 状態(STATE) |
| | SUTETASU | |
| FNC00012 | PUREBYU | |
| FNC00013 | HYOJI | 表示(DISPLAY) |
| FNC00014 | KENSAKU | 検索(SEARCH) |
| | SACHI | |
| | SHIRABE | 調べ(SEARCH) |
| FNC00015 | TSUCHI | 通知(NOTIFICATION) |
| | ARAMU | |
| | ANAUNSU | |
| | OSHIE | 教え(TEACH) |
| | TSUTAE | 伝え(INFORM) |
| FNC00016 | RENRAKU | 連絡(COMMUNICATION) |
| | DENTATSU | 伝達(TRANSMISSION) |
| FNC00021 | WARIKOMI | 割り込み(INTERRUPT) |
| FNC00022 | YUSEN | 優先(PRIORITY) |
| FNC00023 | OIKOSHI | 追い越し(PASSING) |
| FNC00024 | TAMESHI | 試し(TEST) |
| | TESUTO | |
| | SANPURU | |

FIG. 18B

| GROUP ID | SPEECH RECOGNITION RESULT | |
| --- | --- | --- |
| | KATAKANA | KANA/KANJI |
| COL00000 | KARA | |
| | IRO | 色 (COLOR) |
| COL00001 | REDDO | |
| | AKA | 赤 (RED) |
| | AKAIRO | 赤色 (RED COLOR) |
| COL00002 | GURIN | |
| | MIDORI | 緑 (GREEN) |
| | MIDORIIRO | 緑色 (GREEN COLOR) |
| COL00003 | BURU | |
| | AO | 青 (BLUE) |
| | AOIRO | 青色 (BLUE COLOR) |
| COL00004 | IERO | |
| | KI | 黄 (YELLOW) |
| | KIIRO | 黄色 (YELLOW COLOR) |
| COL00005 | MAZENTA | |
| | MAZENDA | |
| COL00006 | SHIAN | |
| COL00100 | BURAKKU | |
| | KURO | 黒 (BLACK) |
| | KUROIRO | 黒色 (BLACK COLOR) |
| COL00101 | GURE | |
| | GURESUKERU | |
| | SHIROKUROTACHI | 白黒多値 (BLACK-AND-WHITE MULTIVALUED) |
| COL00102 | SHIROKURO | 白黒 (BLACK AND WHITE) |
| | BIDABURYU | BW |
| | MONOKURO | |
| COL00103 | SHIROKURONICHI | 白黒2値、白黒二値 (BLACK-AND-WHITE BINARY) |
| COL00110 | TANSHOKU | 単色 (SINGLE COLOR) |
| | MONOKARA | |
| COL00111 | NISHOKU | 2色、二色 (TWO COLORS) |
| | BAIKARA | |
| COL00200 | IROBETSU | 色別 (FOR EACH COLOR) |
| | IROGOTO | 色ごと (FOR EACH COLOR) |
| | KAKUSHOKU | 各色 (EACH COLOR) |
| COL00201 | ZENSHOKU | 全色 (FULL COLOR) |
| | FURUKARA | |

FIG. 19A

| GROUP ID | SPEECH RECOGNITION RESULT | |
| --- | --- | --- |
| | KATAKANA | KANA/KANJI |
| NEX00000 | SUJI | 数字 (NUMERAL) |
| | BANGO | 番号 (NUMBER) |
| | NANBA | |
| NEX00001 | NANBARINGU | |
| NEX00002 | KETA | 桁 (DIGIT) |
| NEX00003 | KAUNTO | |
| | KAUNTA | |
| NEX00004 | OFU | of |
| | OBU | of |
| NEX00005 | KASSEN | 括線 (VINCULUM) |
| NEX00006 | BUNNO | 分の (FRACTION OF) |
| NEX00007 | TAN'ITSU | 単一 (SINGLE) |
| | MONO | |
| | TANSU | 単数 (SINGULAR) |
| NEX00008 | MARUCHI | |
| | FUKUSU | 複数 (PLURAL) |

FIG. 19B

| GROUP ID | SPEECH RECOGNITION RESULT | |
| --- | --- | --- |
| | KATAKANA | KANA/KANJI |
| LEN00000 | NAGASA | 長さ (LENGTH) |
| | RENGUSU | |
| | KYORI | 距離 (DISTANCE) |
| LEN00001 | EKKUSU | X |
| | HABA | 幅 (WIDTH) |
| LEN00002 | WAI | Y |
| | TAKASA | 高さ (HEIGHT) |
| LEN00003 | POINTO | |
| LEN00004 | INCHI | |
| LEN00005 | METORU | |
| LEN00006 | BAIRITSU | 倍率 (RATIO) |
| | ZUMU | |
| LEN00007 | TOBAI | 等倍 (SAME SIZE) |
| LEN00008 | PASENTO | % |
| | HYAKUBUNRITSU | 百分率 (PERCENTAGE) |
| | WARIAI | 割合 (RATIO) |
| LEN00009 | DORITSU | 同率 (SAME RATIO) |
| LEN00010 | POSUTA | |

FIG. 19C

| GROUP ID | SPEECH RECOGNITION RESULT | |
|---|---|---|
| | KATAKANA | KANA/KANJI |
| DGR00000 | REBERU | |
| | SUIJUN | 水準 (LEVEL) |
| | DOAI | 度合い (DEGREE) |
| DGR00001 | SAISHO | 最小 (MINIMUM) |
| | MINIMAMU | |
| DGR00002 | SAIDAI | 最大 (MAXIMUM) |
| | MAKKUSU | |
| DGR00003 | MAINASU | |
| | GENSHO | 減少 (DECREASE) |
| | HERASU | 減らす (DECREASE) |
| | CHIISAKU | 小さく (SMALLER) |
| | SHUKUSHO | 縮小 (REDUCE) |
| | SUKUNAKU | 少なく (LESS) |
| | MIJIKAKU | 短く (SHORTER) |
| DGR00004 | PURASU | |
| | ZOKA | 増加 (INCREASE) |
| | FUYASU | 増やす (INCREASE) |
| | OKIKU | 大きく (LARGER) |
| | KAKUDAI | 拡大 (ENLARGE) |
| | OKU | 多く (MORE) |
| | NAGAKU | 長く (LONGER) |
| DGR00005 | ONAJI | 同じ (SAME) |
| | ISSHO | いっしょ (SAME) |
| | KAWARANAI | 変わらない (UNCHANGED) |
| | KIN'ITSU | 均一 (UNIFORM) |
| DGR00006 | CHIGAU | 違う (DIFFERENT) |
| | KOTONARU | 異なる (DIFFERENT) |
| DGR00007 | SONOMAMA | そのまま (REMAIN) |
| DGR00008 | JIDO | 自動 (AUTOMATIC) |
| | OTO | |
| DGR00009 | SHUDO | 手動 (MANUAL) |
| | MANYUARU | |
| DGR00010 | FURI | |
| | JIYU | 自由 (FREE) |
| | NIN'I | 任意 (ARBITRARY) |
| DGR00011 | TSUYOI | 強い (STRONG) |
| | TUYOKU | 強く (HARD) |
| | KITSUKU | きつく (TIGHTLY) |
| DGR00012 | YOWAI | 弱い (WEAK) |
| | YOWAKU | 弱く (SOFTLY) |
| | YURUKU | ゆるく (LOOSELY) |
| DGR00013 | TAKAKU | 高く (HIGH) |
| | TAKAME | 高目 (HIGHER) |
| DGR00014 | HIKUKU | 低く (LOW) |
| | HIKUME | 低目 (LOWER) |
| DGR00015 | HIKUI | 低い (LOW) |
| | TEI | 低 (LOW) |
| DGR00016 | CHU | 中 (MIDDLE) |
| DGR00017 | TAKAI | 高い (HIGH) |
| | KOU | 高 (HIGH) |
| DGR00018 | SUKOSHI | 少し (A LITTLE) |
| | CHOTTO | ちょっと (BIT) |
| | BI | 微 (MINUTE) |
| | WAZUKA | 僅か (SLIGHT) |
| DGR00019 | SHOSU | 少数 (FEW) |
| DGR00020 | TASU | 多数 (MANY) |
| | TAKUSAN | たくさん (A LOT OF) |

FIG. 20A

| GROUP ID | SPEECH RECOGNITION RESULT | |
| --- | --- | --- |
| | KATAKANA | KANA/KANJI |
| PAP00000 | YOSHI | 用紙 (SHEET) |
| | KAMI | 紙 (PAPER) |
| | SHITO | |
| | PEPA | |
| PAP00001 | SAIZU | |
| | OKISA | 大きさ (SIZE) |
| PAP00002 | KEIRETSU | 系列 (SERIES) |
| | KEITO | 系統 (SYSTEM) |
| | KATEGORI | |
| | KATERORII | |
| PAP00003 | ISAIZU | 異サイズ (DIFFERENT SIZE) |
| PAP00004 | DOHABA | 同幅 (SAME WIDTH) |
| PAP00005 | IHABA | 異幅 (DIFFERENT WIDTH) |
| PAP00100 | EISAN | A3 |
| | ESAN | A3 |
| PAP00101 | EIYON | A4 |
| | EYON | A4 |
| PAP00102 | EIGO | A5 |
| | EGO | A5 |
| PAP00103 | BIIYON | B4 |
| | BIYON | B4 |
| PAP00104 | BIIGO | B5 |
| | BIGO | B5 |
| PAP00110 | ERUTIARU | LTR |
| | RETA | |
| PAP00111 | ERUJIERU | LGL |
| | RIGARU | |
| PAP00112 | FORIO | |
| PAP00113 | EFUERUESUPI | FLSP |
| | FURUSUKYAPPU | |

FROM FIG. 20A

| | | |
|---|---|---|
| PAP00114 | REJA | |
| | TABUROIDO | |
| | IREBUNBAISEBUNTIN | 11x17 |
| PAP00115 | IEKKUSUISHI | EXEC |
| | EGUZEKUTIBU | |
| | EGUZEKKU | |
| PAP00116 | ESUTIEMUTI | STMT |
| | SUTETOMENTO | |
| PAP00120 | CHOJAKU | 長尺(LONG LENGTH) |
| PAP00121 | NOBI | |
| PAP00200 | HAGAKI | 葉書き(POSTCARD) |
| PAP00201 | OEICHIPI | OHP(TRANSPARENCY) |
| | OETCHIPI | OHP(TRANSPARENCY) |
| | TOMEISHI | 透明紙(TRANSPARENT PAPER) |
| | FIRUMU | |
| PAP00202 | FUTSUSHI | 普通紙(NORMAL PAPER) |
| PAP00203 | SAISEISHI | 再生紙(RECYCLED PAPER) |
| PAP00204 | ATSUGAMI | 厚紙(CARDBOARD) |
| PAP00205 | KOTOSHI | コート紙(COATED PAPER) |
| | KOTAKUSHI | 光沢紙(GLOSSY PAPER) |
| PAP00206 | INGASHI | 印画紙(PHOTOGRAPHIC PAPER) |
| | BUROMAIDO | |
| | FOTOPEPA | |
| PAP00207 | INDEKKUSUSHI | インデックス紙(INDEX PAPER) |
| | TABUSHI | タブ紙(TAB PAPER) |
| PAP00208 | MATTOKOTOSHI | マットコート紙(MATTE COATED PAPER) |
| PAP00209 | HAKUSHI | 白紙(BLANK PAPER) |
| | SHIROGAMI | 白紙(BLANK PAPER) |
| PAP00210 | IROGAMI | 色紙(COLORED PAPER) |
| | SHIKISHI | 色紙(COLORED PAPER) |

FIG. 20C

| GROUP ID | SPEECH RECOGNITION RESULT | |
|---|---|---|
| | KATAKANA | KANA/KANJI |
| SHT00000 | HYOSHI | 表紙 (FRONT COVER) |
| | KABASHITO | |
| SHT00001 | SONYUSHI | 挿入紙 (INSERT SHEET) |
| SHT00002 | AISHI | 合紙 (INSERTED SHEET) |
| SHT00003 | SHOSHI | 章紙 (CHAPTER PAGE) |
| SHT00004 | SHIKIRISHI | 仕切り紙 (SEPARATOR) |
| SHT00005 | NAKAZASHI | 中差し (INTERLEAF SHEET) |
| SHT00006 | GENKO | 原稿 (ORIGINAL) |
| SHT00007 | AIDIKADO | IDカード (ID CARD) |
| | MENKYOSHO | 免許証 (LICENSE) |
| | MENKYOSHO | 免許書 (LICENSE) |
| | SHOMEISHO | 証明書 (CERTIFICATE) |
| | HOKENSHO | 保険証 (INSURANCE CARD) |
| | HOKENSHO | 保険書 (INSURANCE PAPER) |

FIG. 20D

| GROUP ID | SPEECH RECOGNITION RESULT | |
|---|---|---|
| | KATAKANA | KANA/KANJI |
| SID00000 | RYOMEN | 両面 (BOTH SIDES) |
| | RYANMEN | |
| | OMOTEURA | 表裏 (FRONT AND BACK) |
| | URAOMOTE | 裏表 (BACK AND FRONT) |
| | HYORI | 表裏 (FRONT AND BACK) |
| | RYOGAWA | 両側 (BOTH SIDES) |
| SID00001 | KATAMEN | 片面 (ONE SIDE) |
| | KATAGAWA | 片側 (ONE SIDE) |
| | OMOTEDAKE | 表だけ (FRONT SIDE ONLY) |
| SID00002 | URA | 裏 (BACK) |
| | URAMEN | 裏面 (BACK SIDE) |
| SID00003 | OMOTE | 表 (FRONT) |
| | OMOTEMEN | 表面 (FRONT SIDE) |
| SID00004 | UCHIGAWA | 内側 (INSIDE) |
| SID00005 | SOTOGAWA | 外側 (OUTSIDE) |
| SID00006 | ZENMEN | 全面 (FULL PAGE) |

FIG. 21A

| GROUP ID | SPEECH RECOGNITION RESULT | |
|---|---|---|
| | KATAKANA | KANA/KANJI |
| FIN00000 | SHIAGE | 仕上げ (FINISHING) |
| | ATOSHORI | 後処理 (POSTPROCESSING) |
| FIN00001 | SOTO | |
| | KORETO | |
| | ICHIBUGOTO | 1部ごと (PAGE ORDER) |
| | BUTAN'I | 部単位 (PAGE ORDER) |
| FIN00002 | GURUPU | |
| FIN00003 | PEJIGOTO | ページごと (SAME PAGES) |
| | PEJITAN'I | ページ単位 (SAME PAGES) |
| FIN00004 | KAITEN | 回転 (ROTATION) |
| | MAWASU | 回す (ROTATE) |
| | MAWASHITE | 回して (ROTATE) |
| | ROTESHON | |
| | ROTETO | |
| FIN00010 | HOCHIKISU | |
| | HOTCHIKISU | |
| | SUTEIPURU | |
| | HARI | 針 (STAPLE) |
| | TOJI | 綴じ (STAPLE) |
| FIN00011 | SHIFUTO | |
| | ZURASHI | ずらし (SHIFT) |
| | IDO | 移動 (SHIFT) |
| FIN00012 | PANCHI | |
| | ANA | 穴 (HOLE) |
| FIN00013 | SADORU | |
| FIN00014 | ORI | 折り (FOLD) |
| | FORUDO | |
| | TATAMU | 畳む (FOLD) |

FIG. 21B

| GROUP ID | SPEECH RECOGNITION RESULT | |
| --- | --- | --- |
| | KATAKANA | KANA/KANJI |
| LYT00000 | REIAUTO | |
| | WARITSUKE | 割り付け (LAYOUT) |
| | HAICHI | 配置 (ARRANGEMENT) |
| | HARITSUKE | 貼り付け (PASTE) |
| LYT00001 | SOROE | 揃え (ALIGN) |
| LYT00002 | BUNKATSU | 分割 (SPLIT) |
| | WAKERU | 分ける (DIVIDE) |
| LYT00003 | MATOMERU | まとめる (COPY ONTO ONE SHEET) |
| | MATOMETE | まとめて (ONTO ONE SHEET) |
| | SHUYAKU | 集約 (N ON ONE) |
| LYT00010 | WAN'INWAN | 1in1 |
| | ICHI'IN'ICHI | |
| | WAN'APPU | 1up |
| | WAN'NAPPU | |
| | ICHIAPPU | |
| LYT00011 | TSUINWAN | 2in1 |
| | NI'IN'ICHI | |
| | TSUAPPU | 2up |
| | NIAPPU | |
| LYT00012 | FO'INWAN | 4in1 |
| | YON'IN'ICHI | |
| | FOAPPU | 4up |
| | YON'APPU | |
| LYT00013 | SHIKKUSUINWAN | 6in1 |
| | ROKUIN'ICHI | |
| | SHIKKUSUAPPU | 6up |
| | ROKUAPPU | |
| LYT00014 | EITOINWAN | 8in1 |
| | HACHI'IN'ICHI | |
| | EITOAPPU | 8up |
| | HACHIAPPU | |

FROM FIG. 21B

| | | |
|---|---|---|
| LYT00015 | NAIN'INWAN | 9in1 |
| | KYUIN'ICHI | |
| | NAIN'APPU | 9up |
| | KYUAPPU | |
| LYT00016 | SIKKUSUTIN'INWAN | 16in1 |
| | JUROKUIN'ICHI | |
| | SIKKUSUTIN'APPU | 16up |
| | JUROKUAPPU | |
| LYT00020 | RIPITO | |
| | KURIKAESHI | 繰り返し(REPEAT) |
| LYT00021 | HON | 本(BOOK) |
| | SHOSEKI | 書籍(BOOK) |
| | ZASSHI | 雑誌(MAGAZINE) |
| | SEIHON | 製本(BOOKLET) |
| | BUKKU | |
| LYT00022 | MIHIRAKI | 見開き(TWO-PAGE SPREAD) |
| LYT00023 | HIRAKU | 開く(OPEN) |
| | HIRAKI | 開き(SPREAD) |
| | MEKURU | めくる(TURN OVER) |
| | MEKURI | めくり(FLIP) |
| LYT00024 | TOJISHIRO | 綴じ代(GUTTER) |
| LYT00025 | WAKU | 枠(FRAME) |
| | FUREMU | |
| | SHUI | 周囲(EDGE) |
| | SHIHEN | 四辺(FOUR SIDES) |
| | YOHAKU | 余白(MARGIN) |
| LYT00026 | KURIPU | |
| | ZURE | ずれ(DISPLACEMENT) |
| LYT00027 | KYOZO | 鏡像(MIRROR IMAGE) |
| LYT00028 | YORI | 寄り(SIDE) |
| | GAWA | 側(SIDE) |

FIG. 22A

| GROUP ID | SPEECH RECOGNITION RESULT | |
|---|---|---|
| | KATAKANA | KANA/KANJI |
| IMG00000 | IMEJI | 画像 |
| | GAZO | 画像 (IMAGE) |
| IMG00001 | MOJI | 文字 (CHARACTER) |
| | JI | 字 (LETTER) |
| IMG00002 | SHASHIN | 写真 (PHOTOGRAPH) |
| | FOTO | |
| IMG00003 | CHIZU | 地図 (MAP) |
| | MAPPU | |
| IMG00004 | NODO | 濃度 (DENSITY) |
| | KOSA | 濃さ (DENSITY) |
| IMG00005 | KOI | 濃い (THICK) |
| | KOKU | 濃く (HEAVY) |
| | KOYUKU | こゆく (BOLD) |
| IMG00006 | USUI | 薄い (LIGHT) |
| | USUKU | 薄く (FAINT) |
| IMG00007 | HAIKEI | 背景 (BACKGROUND) |
| | KOKEI | 後景 (BACKGROUND) |
| | BAKKUGURAUND | |
| | BAKKUGURAND | |
| IMG00008 | URAUTSURI | 裏移り (OFFSET) |
| IMG00009 | SUKE | 透け (TRANSPARENT) |
| | TOKA | 透過 (TRANSPARENT) |
| | SUKASHI | 透かし (WATERMARK) |
| IMG00010 | SHAPUNESU | |
| IMG00011 | SAIDO | 彩度 (SATURATION) |
| | AZAYAKASA | 鮮やかさ (VIVIDNESS) |
| | TON | |
| IMG00012 | SHIKISO | 色相 (HUE) |
| | IROAI | 色合い (GRADATION) |
| IMG00013 | KONTORASUTO | |
| IMG00014 | KYOCHO | 強調 (HIGHLIGHT) |
| | KUKKIRI | くっきり (SHARP) |
| | HAKKIRI | はっきり (CLEAR) |
| IMG00015 | AIMAI | 曖昧 (BLURRY) |
| | BON'YARI | ぼんやり (BLURRY) |
| | BOKASU | ぼかす (BLURRING) |
| | BOKASHI | ぼかし (BLURRING) |
| IMG00016 | AZAYAKA | 鮮やか (VIVID) |
| | TON'APPU | |
| IMG00017 | OCHITSUITA | 落ち着いた (MUTED) |
| | TONDAUN | |
| IMG00018 | KARUKU | 軽く (LIGHT) |
| | RAITO | Light |
| IMG00019 | OMOKU | 重く (HEAVY) |
| | HEBI | Heavy |
| IMG00020 | HAIRAITO | |
| IMG00021 | AKARUI | 明るい (BRIGHT) |
| IMG00022 | KURAI | 暗い (DARK) |
| IMG00023 | RETORO | |
| | FURUI | 古い (OLD) |
| | NATSUKASHII | 懐かしい (NOSTALGIC) |
| | MUKASHIFU | 昔風 (OLD-FASHIONED) |
| IMG00024 | NEGAPOJI | |

FIG. 22B

| GROUP ID | SPEECH RECOGNITION RESULT | |
| --- | --- | --- |
| | KATAKANA | KANA/KANJI |
| SEL00000 | BUSU | 部数 (NUMBER OF COPIES) |
| | CHISU | |
| SEL00001 | PEJISU | ページ数、頁数 (NUMBER OF PAGES) |
| SEL00002 | MAISU | 枚数 (NUMBER OF SHEETS) |
| SEL00003 | BUNKATSUSU | 分割数 (NUMBER OF DIVISIONS) |
| SEL00004 | KONSAI | 混載 (MIXED) |
| | KONDO | 混同 (MIX) |
| | MIKKUSU | |
| SEL00005 | KETSUGO | 結合 (COMBINE) |
| | BIRUDO | |
| | KUMIAWASE | 組み合わせ (COMBINATION) |
| | ITTAI | 一体 (INTEGRATE) |
| | GOSEI | 合成 (COMBINE) |
| SEL00006 | INJI | 印字 (PRINT) |
| SEL00007 | SUTANPU | |
| SEL00008 | MARUHI | 丸秘 (SECRET) |
| SEL00009 | KONFIDENSHARU | Confidential |
| SEL00010 | DORAFUTO | Draft |
| SEL00011 | SHAGAIHI | 社外秘 (INTERNAL USE ONLY) |
| SEL00012 | KIMITSU | 機密 (CLASSIFIED) |
| SEL00013 | SHO | 章 (CHAPTER) |
| SEL00014 | SOPEJI | 総ページ (TOTAL NUMBER OF PAGES) |
| SEL00015 | JUSO | 重送 (DOUBLE FEED) |
| | KASANARI | 重なり (OVERLAPPING) |
| | KASANE | 重ね (OVERLAP) |
| | NIJU | 二重 (DOUBLE) |
| SEL00016 | SUKIPPU | |
| | TOBASHI | 飛ばし (SKIP) |
| SEL00017 | SETSUYAKU | 節約 (SAVING) |
| | HABUKU | 省く (SAVE) |
| SEL00018 | TATEN | 多点 (MULTIPOINT) |
| SEL00019 | SEKYUA | |

FIG. 23A

| GROUP ID | SPEECH RECOGNITION RESULT | |
|---|---|---|
| | KATAKANA | KANA/KANJI |
| SND00000 | ATESAKI | 宛先 (ADDRESS) |
| | OKURISAKI | 送り先 (DESTINATION) |
| | SOSHINSAKI | 送信先 (DESTINATION) |
| | ADORESU | |
| SND00001 | CHO | 帳 (ADDRESS BOOK) |
| SND00010 | MOBAIRU | |
| | SUMAHO | |
| | SUMATOHON | |
| | SUMATOFON | |
| | KEITAI | 携帯 (MOBILE) |
| SND00011 | MERU | |
| SND00012 | FAKKUSU | FAX |
| SND00013 | FAIRU | |
| SND00014 | FORUDA | |
| | DIREKUTORI | |
| SND00020 | MAI | |
| | JIBUN | 自分 (MYSELF) |
| | ORE | 俺 (ME) |
| | WATASHI | 私 (I) |
| | KOJIN | 個人 (PERSONAL) |
| SND00021 | SHISHI | Cc |
| SND00022 | BISHISHI | Bcc |
| SND00023 | ASSHUKU | 圧縮 (COMPRESS) |
| SND00030 | KAIZODO | 解像度 (RESOLUTION) |
| | DIPIAI | dpi |
| SND00031 | NOMARU | |
| | HYOJUN | 標準 (STANDARD) |
| | FUTSU | 普通 (NORMAL) |
| SND00032 | FAIN | |
| | RYO | 良 (FINE) |
| SND00033 | SUPA | |
| | SUPAFAIN | |
| SND00034 | URUTORA | |
| | URUTORAFAIN | |
| SND00040 | JEIPEGU | JPEG |
| SND00041 | PIDIEFU | PDF |
| | PIDEEFU | PDF |
| SND00042 | PEDIEFUE | PDFA |
| | PEDEEFUE | PDFA |
| SND00043 | TIFU | TIFF |
| SND00044 | EKKUSUPIESU | XPS |
| SND00050 | SUMISUTANPU | 済みスタンプ (FINISHED STAMP) |
| SND00060 | FAIRUMEI | ファイル名 (FILE NAME) |
| SND00061 | KENMEI | 件名 (SUBJECT) |
| | SABUJEKUTO | |
| SND00062 | HONBUN | 本文 (MESSAGE) |
| SND00063 | HENSIN | 返信 (REPLY) |
| SND00064 | JUYODO | 重要度 (PRIORITY) |

FIG. 23B

| GROUP ID | SPEECH RECOGNITION RESULT | |
| --- | --- | --- |
| | KATAKANA | KANA/KANJI |
| NET00000 | TSUSHIN | 通信(COMMUNICATION) |
| NET00001 | NETTOWAKU | |
| | TSUSHINMO | 通信網(COMMUNICATION NETWORK) |
| NET00002 | PUROTOKORU | |
| NET00003 | WINDOZU | Windows |
| | ESUEMUBI | SMB |
| | SANBA | Samba |
| NET00004 | EFUTIPI | FTP |
| NET00005 | WEBUDABU | WebDAV |
| | DABU | DAV |
| | DIEBUI | DAV |
| NET00006 | SABA | |
| NET00007 | HOSUTO | |
| | KURAIANTO | |
| | TANMATSU | 端末(TERMINAL) |
| NET00008 | PASU | |
| | YUARUERU | URL |
| NET00009 | YUZA | |
| | AKAUNTO | |
| NET00010 | PASUWADO | |
| | PASUKODO | |
| | PINKODO | PINコード(PIN CODE) |
| | OMAJINAI | おまじない(SECRET WORD) |
| | AIKOTOBA | 合言葉(PASSWORD) |
| NET00011 | KEIYU | 経由(VIA) |
| NET00012 | DAIREKUTO | |
| | CHOKUSETSU | 直接(DIRECT) |
| NET00013 | RAN | LAN |
| | ROKARUERIANETTOWAKU | |

FIG. 24

| GROUP ID | SPEECH RECOGNITION RESULT | |
|---|---|---|
| | KATAKANA | KANA/KANJI |
| DEV00000 | SOCHI | 装置 (APPARATUS) |
| | DEBAISU | |
| | KIKI | 機器 (DEVICE) |
| | KIKAI | 機械 (MACHINE) |
| DEV00001 | TEZASHI | 手差し (MANUAL FEED) |
| | SASHIKOMI | 差し込み (INSERT) |
| DEV00002 | TORE | |
| | TOREI | |
| | KUCHI | 口 (SLOT) |
| | OKI | 置き (LOADING) |
| DEV00003 | KASETTO | |
| | DEKKI | |
| DEV00004 | KYUSHI | 給紙 (PAPER FEEDING) |
| | HIKIKOMI | 引き込み (DRAWING IN) |
| DEV00005 | HAISHI | 排紙 (PAPER OUTPUT) |
| | HAISHUTSU | 排出 (DISCHARGE) |
| DEV00006 | FIDA | |
| | EIDIEFU | ADF |
| | KAMIOKURI | 紙送り (PAPER FEEDER) |
| DEV00007 | GENKODAI | 原稿台 (PLATEN GLASS) |
| DEV00008 | PURINTA | |
| | INSATSUKI | 印刷機 (PRINTER) |
| DEV00009 | SUKYANA | |
| | RIDA | |
| DEV00010 | AKUSESARI | |
| | OPUSHON | |
| | FUZOKU | 付属 (ACCESSORY) |
| DEV00011 | TONA | |
| DEV00012 | INKU | |
| | INKI | |
| DEV00013 | EMUEFUPI | MFP |
| | FUKUGOKI | 複合機 (MFP) |
| DEV00014 | KABA | |
| | DOA | |
| DEV00015 | MAIKU | |
| DEV00016 | SUPIKA | |
| DEV00017 | ONRYO | 音量 (VOLUME) |
| | BORYUMU | |
| DEV00018 | MEMORII | |
| | MEMORI | |
| DEV00019 | DENGEN | 電源 (POWER) |
| DEV00020 | SETSUDEN | 節電 (ENERGY SAVING) |

FIG. 25A

| GROUP ID | SPEECH RECOGNITION RESULT | |
| --- | --- | --- |
| | KATAKANA | KANA/KANJI |
| ELS00000 | YOKUTSUKAU | よく使う (FREQUENTLY USED) |
| | ITSUMOTSUKAU | いつも使う (ALWAYS USED) |
| ELS00001 | TEIKEI | 定型 (STANDARD) |
| | OKIMARI | お決まり (ROUTINE) |
| | ITSUMONO | |
| ELS00002 | WANTATCHI | |
| ELS00003 | HINDO | 頻度 (FREQUENCY) |
| ELS00004 | TSUNENI | 常に (CONSTANTLY) |
| | ITSUMO | いつも (REGULARLY) |
| | KANARAZU | 必ず (ALWAYS) |
| | MAIKAI | 毎回 (EVERY TIME) |
| ELS00010 | ZENBU | 全部 (ALL) |
| | SUBETE | 全て (ALL) |
| ELS00011 | DOKURITSU | 独立 (INDEPENDENTLY) |
| | SOREZORE | それぞれ (INDIVIDUALLY) |
| | BETSUBETSU | 別々 (SEPARATELY) |
| | KOBETU | 個別 (INDIVIDUALLY) |
| ELS00012 | NOMI | のみ (ONLY) |
| | DAKE | だけ (ALONE) |
| ELS00020 | RIREKI | 履歴 (HISTORY) |
| | HISUTORI | |
| ELS00021 | YOBIDASHI | 呼び出し (RECALL) |
| | YOMIDASHI | 読み出し (READ) |
| | YOBU | 呼ぶ (CALL) |
| | KORU | |
| ELS00022 | MEMO | |
| | KOMENTO | |
| | BIKO | 備考 (REMARKS) |
| | HOSOKUSETSUMEI | 補足説明 (SUPPLEMENTARY EXPLANATION) |
| ELS00030 | GOJUON | 五十音、50音 (50 PHONETIC CHARACTERS) |
| ELS00031 | MEISHO | 名称 (NAME) |
| | NAMAE | 名前 (NAME) |
| ELS00032 | RABERUMEI | ラベル名 (LABEL) |
| | TOROKUMEI | 登録名 (REGISTERED NAME) |
| ELS00033 | SHURUI | 種類 (TYPE) |
| | SHUBETSU | 種別 (TYPE) |
| | TAIPU | |
| ELS00034 | MODO | |
| ELS00040 | BOSHI | 防止 (PREVENT) |
| | FUSEGU | 防ぐ (AVOID) |
| | YOKUSHI | 抑止 (INHIBIT) |
| | SASENAI | させない (PROHIBIT) |
| | SASENAKU | させなく (DISABLE) |

FIG. 25B

| GROUP ID | SPEECH RECOGNITION RESULT | |
|---|---|---|
| | KATAKANA | KANA/KANJI |
| ELS00050 | SAISHO | 最初(FIRST) |
| | ATAMA | 頭(HEAD) |
| | SENTO | 先頭(TOP) |
| ELS00051 | SAIGO | 最後(LAST) |
| | SAISHU | 最終(FINAL) |
| | MATSUBI | 末尾(END) |
| | OSHIRI | お尻(BOTTOM) |
| ELS00060 | RENZOKU | 連続(SUCCESSIVE) |
| | TSUZUKETE | 続けて(CONTINUOUSLY) |
| ELS00061 | DOJI | 同時(SIMULTANEOUSLY) |
| | AWASETE | 合わせて(AT THE SAME TIME) |
| ELS00062 | SHINKI | 新規(NEW) |
| | ATARASHIKU | 新しく(NEWLY) |
| | ATARASHII | 新しい(NEW) |
| | ARATA | 新た(NEW) |
| ELS00070 | TSUKE | 付け(ADD) |
| | TSUIKA | 追加(ADDITION) |
| | FUKA | 付加(ADDED) |
| | TSUKI | 付き(WITH) |
| | FUKUMU | 含む(INCLUDE) |
| | KOMI | 込み(INCLUDED) |
| | TENPU | 添付(ATTACHED) |
| ELS00071 | MOJIRETSU | 文字列(CHARACTER STRING) |
| | TEKISUTO | |
| ELS00072 | HAN'I | 範囲(RANGE) |
| ELS00073 | SHINPURU | |
| | TANJUN | 単純(SIMPLE) |
| ELS00074 | FURU | |
| ELS00075 | JOKEN | 条件(CONDITION) |
| ELS00080 | SANSHO | 参照(REFERENCE) |
| ELS00081 | KOSHIN | 更新(UPDATE) |
| | APPUDETO | |
| | RIRODO | |
| | SAISHIN | 最新(LATEST) |
| ELS00082 | JUNKYO | 準拠(COMPLIANT) |
| ELS00083 | UKETSUKE | 受付(ACCEPT) |
| ELS00084 | KEKKA | 結果(RESULT) |
| ELS00085 | REPOTO | |
| | RIPOTO | |
| | HOKOKUSHO | 報告書(REPORT) |
| ELS00086 | TAIMA | |
| ELS00087 | HIZUKE | 日付(DATE) |
| | NICHIJI | 日時(TIME AND DATE) |
| | JIKOKU | 時刻(TIME) |
| | JIKAN | 時間(TIME) |
| ELS00090 | MACHI | 待ち(WAIT) |
| | TAIKI | 待機(STANDBY) |
| ELS00091 | MAE | 前(BEFORE) |
| ELS00092 | ATO | 後(AFTER) |
| | GO | 後(LATER) |
| ELS00093 | SUMI | 済み(FINISHED) |
| | ZUMI | 済み(DONE) |
| ELS00100 | DEFORUTO | |
| ELS00101 | MEIN | |
| | OMONA | 主な(MAIN) |
| | SHUYO | 主要(MAJOR) |
| ELS00102 | SABU | |
| | FUKUJITEKINA | 副次的な(SUBSIDIARY) |
| | HOJO | 補助(AUXILIARY) |

FIG. 26B

| No. | USER OPERABLE UI COMPONENT TYPE | LABEL | SCREEN CONTROL DURING OPERATION | INTERNAL PROCESSING DURING OPERATION |
|---|---|---|---|---|
| 2401 | BUTTON | 86% A3>B4 A4>B5 | DISPLAY SET VALUE IN 2444, HIGHLIGHT THE BUTTON | |
| 2402 | BUTTON | 81% B4>A4 B5>A5 | DISPLAY SET VALUE IN 2444, HIGHLIGHT THE BUTTON | |
| 2403 | BUTTON | 70% A3>A4 B4>B5 | DISPLAY SET VALUE IN 2444, HIGHLIGHT THE BUTTON | |
| 2404 | BUTTON | 61% A3>B5 | DISPLAY SET VALUE IN 2444, HIGHLIGHT THE BUTTON | |
| 2405 | BUTTON | 50% A3>A5 | DISPLAY SET VALUE IN 2444, HIGHLIGHT THE BUTTON | |
| 2406 | BUTTON | 25% Min. | DISPLAY SET VALUE IN 2444, HIGHLIGHT THE BUTTON | |
| 2411 | BUTTON | - | DISPLAY SET VALUE IN 2444 | |
| 2412 | BUTTON | 1:1 (100%) | DISPLAY SET VALUE IN 2444 | |
| 2413 | BUTTON | Set by Length | TRANSITION TO ADVANCED SETTINGS SCREEN FOR SETTING BY LENGTH | |
| 2414 | BUTTON | A Little Smaller (Full-Page Copy) | HIGHLIGHT THE BUTTON | |
| 2421 | BUTTON | + | DISPLAY SET VALUE IN 2444 | |
| 2422 | BUTTON | Auto | HIGHLIGHT THE BUTTON | |
| 2423 | BUTTON | XY Independent Zoom | TRANSITION TO ADVANCED SETTINGS SCREEN FOR XY INDEPENDENT ZOOM | |
| 2424 | BUTTON | Poster | TRANSITION TO ADVANCED SETTINGS SCREEN FOR POSTER | |
| 2431 | BUTTON | 400% Max. | DISPLAY SET VALUE IN 2444, HIGHLIGHT THE BUTTON | |
| 2432 | BUTTON | 200% A5>A3 | DISPLAY SET VALUE IN 2444, HIGHLIGHT THE BUTTON | |
| 2433 | BUTTON | 141% A4>A3 B5>B4 | DISPLAY SET VALUE IN 2444, HIGHLIGHT THE BUTTON | |
| 2434 | BUTTON | 122% A4>B4 A5>B5 | DISPLAY SET VALUE IN 2444, HIGHLIGHT THE BUTTON | |
| 2435 | BUTTON | 115% B4>A3 B5>A4 | DISPLAY SET VALUE IN 2444, HIGHLIGHT THE BUTTON | |
| 2441 | BUTTON | Cancel | TRANSITION TO COPY TOP SCREEN | |
| 2442 | BUTTON | OK | TRANSITION TO COPY TOP SCREEN | CHECK RANGE OF SET VALUE DISPLAYED IN 2444 |
| 2443 | BUTTON | | TRANSITION TO HELP SCREEN | |
| 201 | HARDWARE KEY | 0, 1, ..., 9 | DISPLAY INPUT VALUE IN 2444 | |
| 203 | HARDWARE KEY | | TRANSITION TO COPY TOP SCREEN | RESET JOB PARAMETERS TO DEFAULTS |
| 207 | HARDWARE KEY | | TRANSITION TO COPY JOB START SCREEN | START EXECUTION OF COPY JOB |

FIG. 26C

| No. | GROUP ID | EXAMPLE OF USER SPEECH DURING OPERATION | OPERATION ON OPERATION PANEL |
|---|---|---|---|
| 2401 | NUM00086<br>PAP00100+PAP00103<br>PAP00100+SHT00006+PAP00103<br>PAP00100+PAP00000+PAP00103<br>PAP00100+PAP00001+PAP00103<br>PAP00101+PAP00104<br>PAP00101+SHT00006+PAP00104<br>PAP00101+PAP00000+PAP00104<br>PAP00101+PAP00001+PAP00104 | ・86%、倍率86%に設定 (86%, SET RATIO AT 86%)<br>・A3からB4、A3からB4にコピー (FROM A3 TO B4, COPY A3 TO B4)<br>・A3原稿をB4用紙で印刷、A3原稿幅をB4に変更 (PRINT A3 ORIGINAL ON B4 SHEET, CHANGE A3 ORIGINAL TO B4)<br>・A3の縮小をB4の紙に縮小してコピー (REDUCE A3 PAPER TO B4 PAPER)<br>・A3サイズをB4サイズに変更 (RESIZE A3 TO B4)<br>・A4からB5、A4をB5サイズに変更 (FROM A4 TO B5, FIT A4 TO B5)<br>・A4原稿幅をB5に合わせて (COPY A4 ORIGINAL ONTO B5)<br>・A4用紙がB5用紙になるように引きコピー (COPY A4 SHEET ONTO B5 SHEET)<br>・大きさをA4サイズからB5サイズに縮小 (REDUCE A4 SIZE TO B5 SIZE) | PRESS BUTTON (TOUCH THE BUTTON COORDINATE AREA) |
| 2402 | NUM00081<br>PAP00103+PAP00101<br>PAP00103+SHT00006+PAP00101<br>PAP00103+PAP00000+PAP00101<br>PAP00103+PAP00001+PAP00101<br>PAP00104+PAP00102<br>PAP00104+SHT00006+PAP00102<br>PAP00104+PAP00000+PAP00102<br>PAP00104+PAP00001+PAP00102 | ・81%、倍率81%に設定 (81%, SET RATIO AT 81%)<br>・B4からA4、B4からA4にコピー (FROM B4 TO A4, COPY B4 TO A4)<br>・B4原稿をA4用紙で印刷、B4原稿幅をA4に変更 (PRINT B4 ORIGINAL ON A4 SHEET, CHANGE B4 ORIGINAL TO A4)<br>・B4の縮小をA4の紙に縮小してコピー (REDUCE B4 PAPER TO A4 PAPER)<br>・B4サイズをA4サイズに変更 (RESIZE B4 TO A4)<br>・B5からA5、B5をA5サイズに変更 (FROM B5 TO A5, FIT B5 TO A5)<br>・B5原稿幅をA5に合わせて (COPY B5 ORIGINAL ONTO A5)<br>・B5用紙がA5用紙になるように引きコピー (COPY B5 SHEET ONTO A5 SHEET)<br>・大きさをB5サイズからA5サイズに縮小 (REDUCE B5 SIZE TO A5 SIZE) | PRESS BUTTON (TOUCH THE BUTTON COORDINATE AREA) |
| | NUM00070<br>PAP00100+PAP00101 | ・70%、倍率70%に設定 (70%, SET RATIO AT 70%)<br>・A3からA4、A3からA4にコピー (FROM A3 TO A4, COPY A3 TO A4) | PRESS BUTTON (TOUCH THE BUTTON COORDINATE AREA) |

FROM FIG. 26C

| | | | |
|---|---|---|---|
| 2403 | PAP00100+SHT00006+PAP00101<br>PAP00100+PAP00001+PAP00101<br>PAP00103+PAP00104<br>PAP00103+SHT00006+PAP00104<br>PAP00103+PAP00000+PAP00104<br>PAP00100+PAP00001+PAP00104 | ・A3原稿をA4用紙で印刷、A3原稿をA4に変更 (PRINT A3 ORIGINAL ON A4 SHEET, CHANGE A3 ORIGINAL TO A4)<br>・A3の紙をA4の紙に縮小してコピー (REDUCE A3 PAPER TO A4 PAPER)<br>・A3サイズをA4サイズに変更 (RESIZE A3 TO A4)<br>・B4から B5、B4をB5に合わせて (FROM B4 TO B5, FIT B4 TO B5)<br>・B4原稿をB5でコピー (COPY B4 ORIGINAL ONTO B5)<br>・B4原稿がB5用紙になるようにコピー (COPY B4 SHEET ONTO B5 SHEET)<br>・大きさをB4サイズからB5サイズに縮小 (REDUCE B4 SIZE TO B5 SIZE) | |
| 2404 | NUM00061<br>PAP00100+PAP00104<br>PAP00100+SHT00006+PAP00104<br>PAP00100+PAP00000+PAP00104<br>PAP00100+PAP00001+PAP00104 | ・61%、倍率61%に設定 (61%, SET RATIO AT 61%)<br>・A3から B5、A3からB5に合わせて (FROM A3 TO B5, COPY A3 TO B5)<br>・A3原稿をB5用紙で印刷、A3原稿をB5に変更 (PRINT A3 ORIGINAL ON B5 SHEET, CHANGE A3 ORIGINAL TO B5)<br>・A3の紙をB5の紙に縮小して印刷 (REDUCE A3 PAPER TO B5 PAPER)<br>・A3サイズをB5サイズに変更 (RESIZE A3 TO B5) | PRESS BUTTON (TOUCH THE BUTTON COORDINATE AREA) |
| 2405 | NUM00050<br>PAP00100+PAP00102<br>PAP00100+SHT00006+PAP00102<br>PAP00100+PAP00000+PAP00102<br>PAP00100+PAP00001+PAP00102 | ・50%、倍率50%に設定 (50%, SET RATIO AT 50%)<br>・A3から A5、A3をA5に合わせて (FROM A3 TO A5, FIT A3 TO A5)<br>・A3原稿をA5でコピー (COPY A3 ORIGINAL ONTO A5)<br>・A3用紙がA5用紙になるようにコピー (COPY A3 SHEET ONTO A5 SHEET)<br>・大きさをA3サイズからA5サイズに縮小 (REDUCE A3 SIZE TO A5 SIZE) | PRESS BUTTON (TOUCH THE BUTTON COORDINATE AREA) |
| 2406 | NUM00025<br>DGR00001 | ・25%、倍率25%に設定 (25%, SET RATIO AT 25%)<br>・最小、最小の倍率でコピー (MINIMUM, COPY AT MINIMUM RATIO) | PRESS BUTTON (TOUCH THE BUTTON COORDINATE AREA) |

FROM FIG. 26D

| | | | |
|---|---|---|---|
| 2411 | DGR00003<br>NUM00***+LEN00008+DGR00003 | ・マイナス、マイナスボタン (MINUS, MINUS BUTTON)<br>・1%マイナス、倍率を20%小さくして、30%縮小 (DECREASE BY 1%, DECREASE RATIO BY 20% TO REDUCE 30%) | PRESS BUTTON (TOUCH THE BUTTON COORDINATE AREA) |
| 2412 | LEN00007<br>NUM00100 | ・等倍、等倍にして (1:1, SAME SIZE)<br>・100%、倍率100%に戻して (100%, RETURN RATIO TO 100%) | PRESS BUTTON (TOUCH THE BUTTON COORDINATE AREA) |
| 2413 | LEN00000+OPR00040<br>PAP00001+OPR00040 | ・長さで指定 (SET BY LENGTH)<br>・サイズで指定したい (SET BY SIZE) | PRESS BUTTON (TOUCH THE BUTTON COORDINATE AREA) |
| 2414 | DGR00018+DGR00003<br>SID00006<br>LYT00025+OPR00043<br>LYT00025+ELS00010 | ・少し小さめ、ちょっと小さく (A LITTLE SMALLER, MAKE IT A BIT SMALL)<br>・全面コピー、全面で (FULL PAGE COPY, FULL PAGE)<br>・原稿の周囲が消えないようにして (DON'T MAKE THE EDGE OF THE ORIGINAL DISAPPEAR)<br>・四辺を全部コピーしたい (COPY ALL FOUR SIDES) | PRESS BUTTON (TOUCH THE BUTTON COORDINATE AREA) |
| 2421 | DGR00004<br>NUM00***+LEN00008+DGR00004 | ・プラス、プラスボタン (PLUS, PLUS BUTTON)<br>・5%プラス、倍率を5%大きくして、30%拡大 (INCREASE BY 5%, INCREASE RATIO BY 25% TO ENLARGE 30%) | PRESS BUTTON (TOUCH THE BUTTON COORDINATE AREA) |
| 2422 | DGR00008 | ・自動、自動調節ボタンをクリック (AUTO, AUTO RATIO, CLICK ON AUTO BUTTON) | PRESS BUTTON (TOUCH THE BUTTON COORDINATE AREA) |
| 2423 | CHR00023+CHR00024+ELS00011<br>CHR00023+CHR00024+DGR00006<br>POS00041+ELS00011<br>POS00042+POS000045+DGR00006 | ・XY独立ズーム、XY独立、XY別々に指定したい (XY INDEPENDENT ZOOM, XY INDEPENDENT, SPECIFY X AND Y INDIVIDUALLY)<br>・XとYで違う倍率を設定したい (SET DIFFERENT RATIOS FOR X AND Y)<br>・縦横別々の倍率を設定したい (SET RATIOS FOR HORIZONTAL AND VERTICAL INDIVIDUALLY)<br>・縦と横で異なる倍率を設定したい (SET DIFFERENT RATIOS FOR HORIZONTAL AND VERTICAL) | PRESS BUTTON (TOUCH THE BUTTON COORDINATE AREA) |

FROM FIG. 26E

| | | | |
|---|---|---|---|
| 2424 | LEN00010<br>LYT00002+DGR00004 | ・ポスター (POSTER)<br>・複数枚に分割して大きく印刷して (DIVIDE INTO SEPARATE SHEETS AND ENLARGE) | PRESS BUTTON (TOUCH THE BUTTON COORDINATE AREA) |
| 2431 | NUM00400<br>DGR00002 | ・400%、倍率400%に設定 (400%, SET RATIO AT 400%)<br>・最大、倍率マックス (MAXIMUM COPY AT MAX RATIO) | PRESS BUTTON (TOUCH THE BUTTON COORDINATE AREA) |
| 2432 | NUM00200<br>PAP00102+PAP00100<br>PAP00102+SHT00006+PAP00100<br>PAP00102+PAP00000+PAP00100<br>PAP00102+PAP00001+PAP00100 | ・200%、倍率200%に設定 (200%, SET RATIO AT 200%)<br>・A5からA3、A5からA3にコピーして (FROM A5 TO A3, COPY A5 TO A3)<br>・A5原稿をA3用紙で印刷、A5原稿をA3に変更 (PRINT A5 ORIGINAL ON A3 SHEET, CHANGE A5 ORIGINAL TO A3)<br>・A5の紙をA3の紙に綺麗に拡大 (REDUCE A5 PAPER TO A3 PAPER)<br>・A5サイズをA3サイズに変更 (RESIZE A5 TO A3) | PRESS BUTTON (TOUCH THE BUTTON COORDINATE AREA) |
| 2433 | NUM00141<br>PAP00101+PAP00100<br>PAP00101+SHT00006+PAP00100<br>PAP00101+PAP00000+PAP00100<br>PAP00101+PAP00001+PAP00100<br>PAP00104+PAP00103<br>PAP00104+SHT00006+PAP00103<br>PAP00104+PAP00000+PAP00103<br>PAP00104+PAP00001+PAP00103 | ・141%、倍率141%に設定 (141%, SET RATIO AT 141%)<br>・A4からA3、A4からA3にコピーして (FROM A4 TO A3, COPY A4 TO A3)<br>・A4原稿をA3用紙で印刷、A4原稿をA3に変更 (PRINT A4 ORIGINAL ON A3 SHEET, CHANGE A4 ORIGINAL TO A3)<br>・A4の紙をA3の紙に綺麗に拡大 (REDUCE A4 PAPER TO A3 PAPER)<br>・A4サイズをA3サイズに変更 (RESIZE A4 TO A3)<br>・B5からB4、B5をB4に合わせて (FROM B5 TO B4, FIT B5 TO B4)<br>・B5原稿をB4でコピー (COPY B5 ORIGINAL ONTO B4)<br>・B5用紙がB4用紙に綺麗になるようにコピー (COPY B5 SHEET ONTO B4 SHEET)<br>・大きさをB5サイズからB4サイズに縮小 (REDUCE B5 SIZE TO B4 SIZE) | PRESS BUTTON (TOUCH THE BUTTON COORDINATE AREA) |

FROM FIG. 26F

| | | | |
|---|---|---|---|
| 2434 | NUM00122 | | |
| | PAP00101+PAP00103 | ・122%、倍率122%に設定 (122%, SET RATIO AT 122%) | PRESS BUTTON (TOUCH THE BUTTON COORDINATE AREA) |
| | PAP00101+SHT00006+PAP00103 | ・A4からB4、A4からB4にコピーして (FROM A4 TO B4, COPY A4 TO B4) | |
| | PAP00101+PAP00000+PAP00103 | ・A4原稿をB4用紙で印刷、A4原稿をB4に変更 (PRINT A4 ORIGINAL ON B4 SHEET, CHANGE A4 ORIGINAL TO B4) | |
| | PAP00101+PAP00001+PAP00103 | ・A4の紙をB4の紙に縮小してコピー (REDUCE A4 PAPER TO B4 PAPER) | |
| | PAP00102+SHT00006+PAP00104 | ・A4サイズをB4サイズに変更 (RESIZE A4 TO B4) | |
| | PAP00102+PAP00000+PAP00104 | ・A5からB5、A5をB5にコピーして (FROM A5 TO B5, FIT A5 TO B5) | |
| | PAP00102+PAP00001+PAP00104 | ・A5原稿をB5用紙で印刷、A5原稿をB5に変更 (COPY A5 ORIGINAL ONTO B5) | |
| | | ・A5用紙がB5用紙になるようにコピー (COPY A5 SHEET ONTO B5 SHEET) | |
| | | ・大きさをA5からB5サイズに縮小 (REDUCE A5 SIZE TO B5 SIZE) | |
| 2435 | NUM00115 | | |
| | PAP00103+PAP00100 | ・115%、倍率115%に設定 (115%, SET RATIO AT 115%) | PRESS BUTTON (TOUCH THE BUTTON COORDINATE AREA) |
| | PAP00103+SHT00006+PAP00100 | ・B4からA3、B4からA3にコピーして (FROM B4 TO A3, COPY B4 TO A3) | |
| | PAP00103+PAP00000+PAP00100 | ・B4原稿をA3用紙で印刷、B4原稿をA3に変更 (PRINT B4 ORIGINAL ON A3 SHEET, CHANGE B4 ORIGINAL TO A3) | |
| | PAP00103+PAP00001+PAP00100 | ・B4の紙をA3の紙に縮小してコピー (REDUCE B4 PAPER TO A3 PAPER) | |
| | PAP00103+PAP00001+PAP00100 | ・B4サイズをA3サイズに変更 (RESIZE B4 TO A3) | |
| | PAP00104+PAP00101 | ・B5からA4、B5をA4にコピーして (FROM B5 TO A4, FIT B5 TO A4) | |
| | PAP00104+SHT00006+PAP00101 | ・B5原稿をA4用紙で印刷、B5原稿をA4に変更 (COPY B5 ORIGINAL ONTO A4) | |
| | PAP00104+PAP00000+PAP00101 | ・B5用紙がA4用紙になるようにコピー (COPY B5 SHEET ONTO A4 SHEET) | |
| | PAP00104+PAP00001+PAP00101 | ・大きさをB5サイズからA4サイズに縮小 (REDUCE B5 SIZE TO A4 SIZE) | |

FROM FIG. 26G

| | | | |
|---|---|---|---|
| 2441 | OPR00013 | ・キャンセル, 設定を中止 (CANCEL, STOP SETTING) | PRESS BUTTON (TOUCH THE BUTTON COORDINATE AREA) |
| 2442 | OPR00010 OPR00012 | ・OK, この値で確定 (OK, ENTER THIS VALUE) ・倍率の設定終了 (RATIO SETTING HAS BEEN FINISHED) | PRESS BUTTON (TOUCH THE BUTTON COORDINATE AREA) |
| 2443 | FNC00008 CHR00143 | ・ヘルプを表示, 操作ガイドを呼出して (DISPLAY HELP, SHOW OPERATION GUIDE) ・ハテナマークをクリック (CLICK ON QUESTION MARK) | |
| 201 | NUM0000*+NUM0000*+NUM0000* NUM0000*+NUM0000* OPR00044 | ・イチニゴ, ニゴゼロ (ONE TWO FIVE, TWO FIVE ZERO) ・ハチナナ, サンキュー (EIGHT SEVEN, THREE NINE) ・クリア (CLEAR) | PRESS HARDWARE KEY |
| 203 | OPR00045 ELS00100+OPR00040+OPR00022 | ・リセット (RESET) ・デフォルト設定に戻す (RESET TO DEFAULTS) | PRESS HARDWARE KEY |
| 207 | OPR00011 | ・スタート, コピーを開始して (START, START COPYING) | PRESS HARDWARE KEY |

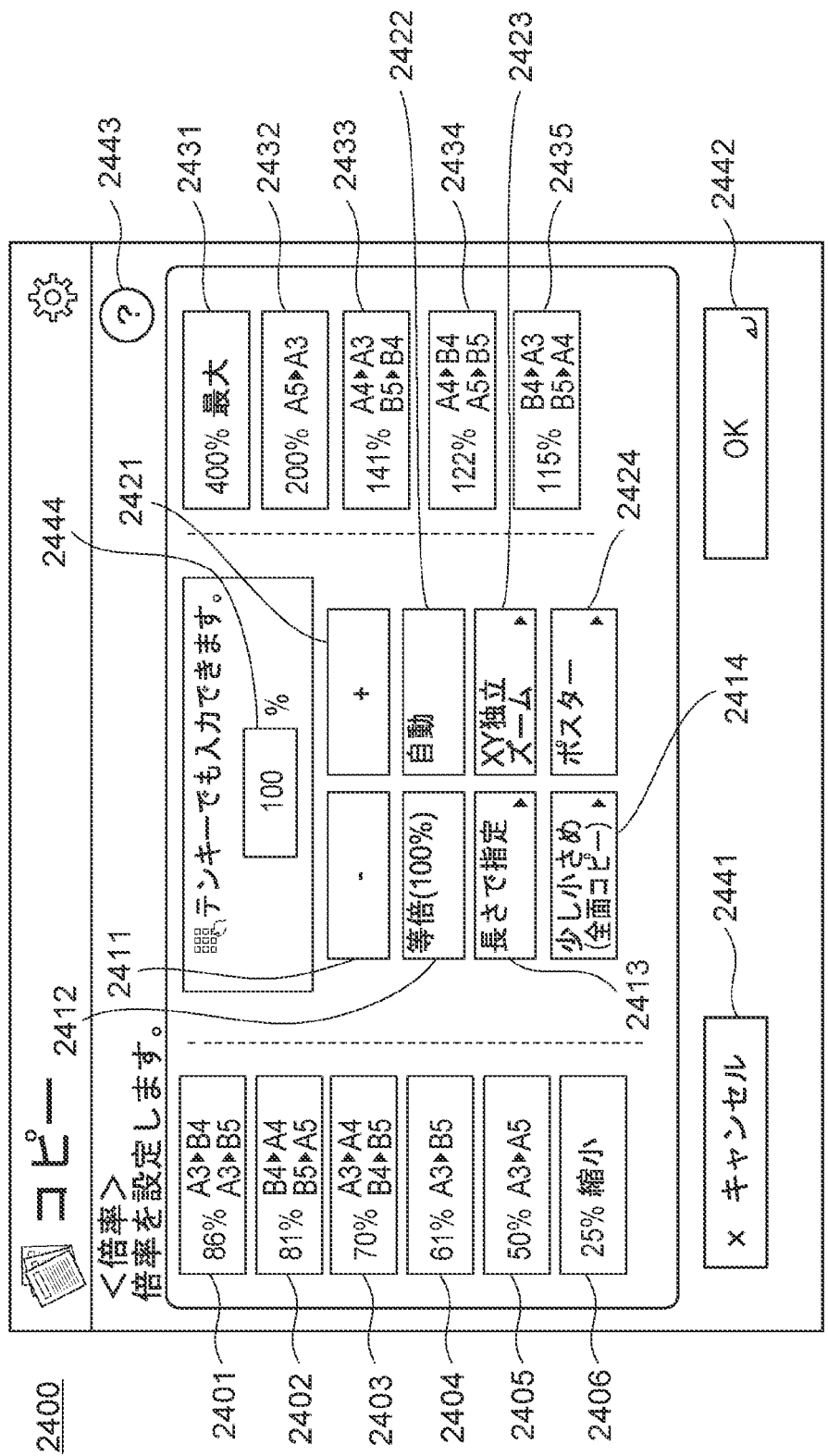

FIG. 27B

| USER OPERABLE UI COMPONENT | | | SCREEN CONTROL DURING OPERATION | INTERNAL PROCESSING DURING OPERATION |
|---|---|---|---|---|
| No. | TYPE | LABEL | | |
| 2501 | BUTTON | XY Same Ratio | HIGHLIGHT THE BUTTON, DISPLAY POP-UP MENU FOR ADVANCED SETTINGS | |
| 2502 | BUTTON | XY Independent | HIGHLIGHT THE BUTTON, DISPLAY POP-UP MENU FOR ADVANCED SETTINGS | |
| 2512 | BUTTON | Original Size | DISPLAY SET VALUE IN 2444 | |
| 2514 | BUTTON | Copy Size | HIGHLIGHT THE BUTTON | |
| 2521 | BUTTON | 0, 1, ···, 9 | DISPLAY SET VALUE IN 2444, HIGHLIGHT THE BUTTON | |
| 2531 | BUTTON | Cancel Settings | TRANSITION TO COPY TOP SCREEN | |
| 2532 | BUTTON | OK | TRANSITION TO COPY TOP SCREEN | CHECK RANGE OF SET VALUE DISPLAYED IN 2444 |
| 201 | HARDWARE KEY | 0, 1, ···, 9 | DISPLAY INPUT VALUE IN 2511 OR 2513 | |
| 203 | HARDWARE KEY | | TRANSITION TO COPY TOP SCREEN | RESET JOB PARAMETERS TO DEFAULTS |
| 207 | HARDWARE KEY | | TRANSITION TO COPY JOB START SCREEN | START EXECUTION OF COPY JOB |

FIG. 27C

| No. | GROUP ID | EXAMPLE OF USER SPEECH DURING OPERATION | OPERATION ON OPERATION PANEL |
|---|---|---|---|
| 2501 | CHR00023+CHR00024+LEN00009 | ・XY同率 (XY SAME RATIO) | PRESS BUTTON (TOUCH THE BUTTON COORDINATE AREA) |
| 2502 | CHR00023+CHR00024+ELS00011 | ・XY独立 (XY INDEPENDENT) | PRESS BUTTON (TOUCH THE BUTTON COORDINATE AREA) |
| 2512 | SHT00006+PAP00001 | ・原稿サイズ (ORIGINAL SIZE) | PRESS BUTTON (TOUCH THE BUTTON COORDINATE AREA) |
| 2514 | FNC00001+PAP00001 | ・コピーサイズ (COPY SIZE) | PRESS BUTTON (TOUCH THE BUTTON COORDINATE AREA) |
| 2521 | NUM0000*+NUM0000*+NUM0000* NUM0000*+NUM0000* OPR00044 CHR00002 | ・イチ ニ ゴ、ニ ゴ ゼロ (ONE TWO FIVE, TWO FIVE ZERO)<br>・ハチ ナナ、サン キュー (EIGHT SEVEN, THREE NINE)<br>・クリア (CLEAR)<br>・シー (C) | PRESS BUTTON (TOUCH THE BUTTON COORDINATE AREA) |
| 2531 | OPR00013 | ・キャンセル、設定を中止 (CANCEL, STOP SETTING) | PRESS BUTTON (TOUCH THE BUTTON COORDINATE AREA) |
| 2532 | OPR00010 OPR00012 | ・OK、この値で確定 (OK, ENTER THIS VALUE)<br>・倍率の設定完了 (RATIO SETTING HAS BEEN FINISHED) | PRESS BUTTON (TOUCH THE BUTTON COORDINATE AREA) |
| 201 | NUM0000*+NUM0000*+NUM0000* NUM0000*+NUM0000* OPR00044 | ・イチ ニ ゴ、ニ ゴ ゼロ (ONE TWO FIVE, TWO FIVE ZERO)<br>・ハチ ナナ、サン キュー (EIGHT SEVEN, THREE NINE)<br>・クリア (CLEAR) | PRESS HARDWARE KEY |
| 203 | OPR00045 ELS00100+OPR00040+OPR00022 | ・リセット (RESET)<br>・デフォルト設定に戻す (RESET TO DEFAULTS) | PRESS HARDWARE KEY |
| 207 | OPR00011 | ・スタート、コピーを開始して (START, START COPYING) | PRESS HARDWARE KEY |

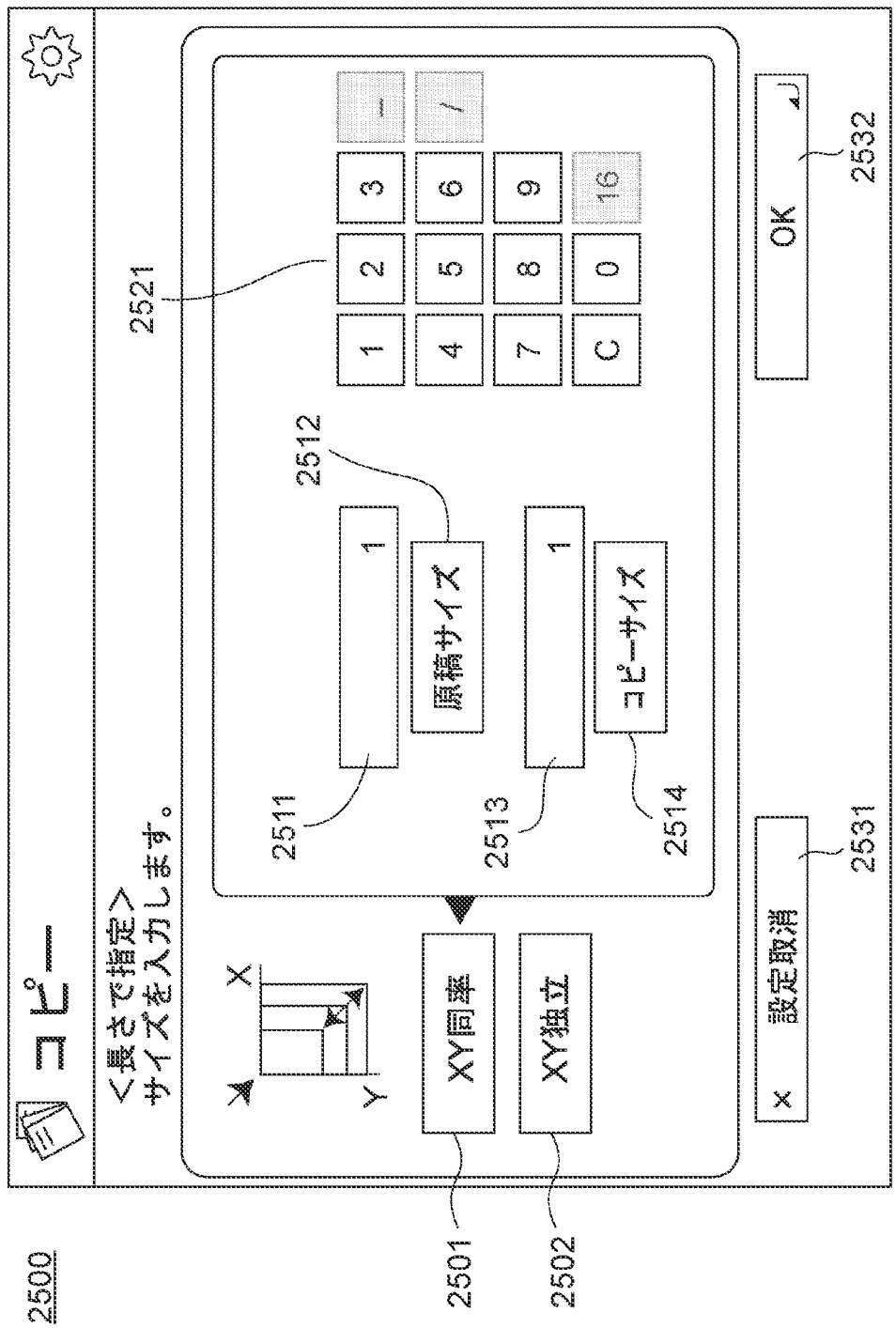

FIG. 28A

| FUNCTION | ITEM GROUP | ITEM |
|---|---|---|
| COMMON | COMMON | HELP, LOG OUT, TRANSITION TO RELEVANT SCREENS, OK, CANCEL |
| COPY | MAIN MENU | INSTRUCT TO START SCANNING, INSTRUCT TO STOP SCANNING, INSTRUCT TO START COPYING, INSTRUCT TO PRINT SAMPLE COPY, INSTRUCT TO RELOAD, INSTRUCT TO RECALL FUNCTION SCREEN (SELECT COLOR, COPY RATIO, SELECT PAPER, SPECIFY FAVORITE FUNCTION, INTERRUPT, CHECK SETTINGS, RECALL PREVIOUS SETTINGS, FAVORITE SETTINGS, BOOK → 2 PAGES, 2-SIDED, FINISHING, BOOKLET, JOB BUILD, N ON 1, ORIGINAL TYPE, TRANSPARENCY COVER SHEETS, SECURE WATERMARK, JOB LOCK, COLOR BALANCE, ONE TOUCH COLOR MODE, PAGE NUMBERING, COPY SET NUMBERING, SHARPNESS, ERASE FRAME, WATERMARK, PRINT DATE, SHIFT, GUTTER, PRINT AND CHECK, NEGATIVE/POSITIVE, REPEAT IMAGES, MERGE JOB BLOCKS, JOB DONE NOTICE, MIRROR IMAGE, AREA DESIGNATION, PRINT ON TAB, STORE IN MAIL BOX, SUPERIMPOSE IMAGE, ID CARD COPY, DOUBLE FEED DETECTION, CUSTOM SIZE ORIGINAL, PAPER SAVE) |
| COPY | OPTIONS | INSTRUCT TO RECALL FUNCTION SCREEN (SELECT COLOR, COPY RATIO, SELECT PAPER, SPECIFY FAVORITE FUNCTION, INTERRUPT, CHECK SETTINGS, RECALL PREVIOUS SETTINGS, FAVORITE SETTINGS, BOOK → 2 PAGES, 2-SIDED, FINISHING, BOOKLET, JOB BUILD, N ON 1, ORIGINAL TYPE, TRANSPARENCY COVER SHEETS, SECURE WATERMARK, JOB LOCK, COLOR BALANCE, ONE TOUCH COLOR MODE, PAGE NUMBERING, COPY SET NUMBERING, SHARPNESS, ERASE FRAME, WATERMARK, PRINT DATE, SHIFT, GUTTER, PRINT AND CHECK, NEGATIVE/POSITIVE, REPEAT IMAGES, MERGE JOB BLOCKS, JOB DONE NOTICE, MIRROR IMAGE, AREA DESIGNATION, PRINT ON TAB, STORE IN MAIL BOX, SUPERIMPOSE IMAGE, ID CARD COPY, DOUBLE FEED DETECTION, CUSTOM SIZE ORIGINAL, PAPER SAVE) |
| COPY | COPY RATIO | ENTER RATIO, SELECT FROM PRESET RATIOS, SET BY LENGTH, XY SAME RATIO OR INDEPENDENT, SPECIFY RATIO FOR POSTER BY % OR NUMBER OF SHEETS, USE NUMERIC KEYS |
| COPY | SELECT COLOR | AUTO, FULL COLOR, BLACK, SINGLE COLOR, TWO COLORS |
| COPY | SELECT PAPER | MANUAL PAPER FEED, SPECIFY CASSETTE, AUTO-FEED, CHECK PAPER DETAILS |
| COPY | CHECK SETTINGS | SELECT PRESET VALUE, SPECIFY CHANGES |
| COPY | PREVIOUS SETTINGS | SELECT SETTING FROM PREVIOUS SETTINGS |
| COPY | FINISHING | SELECT COLLATING, SELECT GROUPING, SET SHEET SIZE FOR OUTPUT IN ROTATE MODE, SELECT STAPLER, SELECT OFFSET, SET NUMBER OF COPIES FOR OFFSET, SELECT HOLE PUNCH, SPECIFY FOLD POSITION, SPECIFY NUMBER OF SHEETS FOR SADDLE FOLD, SPECIFY FIRST PAGE FOR SADDLE FOLD |
| COPY | FAVORITE SETTINGS | SELECT REGISTERED ICON, REGISTER, RENAME, DELETE |

FROM FIG. 28A

| | | |
|---|---|---|
| COPY | 2-SIDED | 1-SIDED → 2-SIDED, 2-SIDED → 2-SIDED, 2-SIDED → 1-SIDED, BOOK → 2-SIDED, ORIGINAL FORMAT (BOOK TYPE, CALENDAR TYPE), COPY FORMAT (BOOK TYPE, CALENDAR TYPE), RIGHT/LEFT PAGES → 2-SIDED, FRONT/BACK PAGES → 2-SIDED |
| COPY | BACKGROUND | SPECIFY DENSITY FOR EACH COLOR, SPECIFY OVERALL DENSITY, AUTO DENSITY ADJUSTMENT, PREVENT BLEED-THRU |
| COPY | ORIGINAL TYPE | TEXT/PHOTO PRINTED IMAGE, MAP, PHOTO PRINTOUT, TEXT/PHOTO (NON-BLEED-THROUGH), LEVEL ADJUSTMENT |
| COPY | N ON 1 | 2 ON 1, 4 ON 1, 8 ON 1, SET PAGE LAYOUT POSITION, SET PAGE LAYOUT ORDER |
| COPY | BOOKLET | BOOKLET LAYOUT (ON/OFF) SELECT OPENING TYPE, FOLD+SADDLE STITCH, DO NOT FOLD, FOLD ONLY, SPECIFY WHETHER TO PRINT ON FRONT/BACK SIDE OF FRONT/BACK COVER, DIVIDED BOOKLET, CREEP CORRECTION, CHANGE SADDLE STITCH POSITION, ADJUST FOLD POSITION |
| COPY | ADD COVER | SET FRONT COVER (LEAVE BLANK, PRINT ON FRONT SIDE, PRINT ON BACK SIDE, PRINT ON BOTH SIDES), SET BACK COVER (LEAVE BLANK, PRINT ON FRONT SIDE, PRINT ON BACK SIDE, PRINT ON BOTH SIDES), SELECT PAPER |
| COPY | INSERT SHEETS | SPECIFY SHEETS, SPECIFY CHAPTER PAGES, ADD, DETAILS/EDIT, DELETE, SCROLL THROUGH LIST, SPECIFY PAGE TO INSERT, ENTER WITH NUMERIC KEYS, SPECIFY WHETHER TO PRINT ON INSERTED SHEETS, SPECIFY THE NUMBER OF SHEETS TO INSERT, ADJUST IMAGE POSITION ON INSERTED SHEETS |
| COPY | DIFFERENT SIZE ORIGINALS | SELECT ORIGINALS OF SAME WIDTH OR DIFFERENT WIDTHS |
| COPY | TRANSPARENCY COVER SHEETS | SELECT INTERLEAF SHEETS, SELECT TRANSPARENCY SIZE, SELECT WHETHER TO PRINT ON INTERLEAF SHEETS |
| COPY | COLOR BALANCE | ADJUST SATURATION, ADJUST HUE, FINE ADJUST HUE, FINE ADJUST YMCK DENSITY, ADJUST BLACK HUE, RECALL SETTINGS, REGISTER SETTINGS, DELETE SETTINGS, RENAME SETTINGS, ADJUST HUE THROUGH NUANCE OF WORDS |
| COPY | PAGE NUMBERING | SET POSITION, ENTER NUMBERS FOR POSITION ADJUSTMENT, SET POSITION FOR 2-SIDED PRINT, SET IMAGE ORIENTATION, SET PRINT COLOR, SET PRINT PAGE RANGE, ADD CHARACTER STRING, REGISTER CHARACTER STRING, COUNT THE NUMBER OF SHEETS TO INSERT (ON/OFF), SET PRINT SIZE, SET PRINT START NUMBER, SET NUMBER TYPE (NUMBERS ONLY, NUMBERS WITH HYPHENS, NUMBERED CHAPTERS, TOTAL PAGE NUMBERING), SET PAGE NUMBERING DIGITS, NUMERIC KEYS |
| COPY | SHARPNESS | TEXT (HIGH/LOW), PHOTO/IMAGE (HIGH/LOW) |
| COPY | ERASE FRAME | ERASE ORIGINAL FRAME, ERASE BOOK FRAME, ERASE BINDING, SPECIFY VALUE, INDEPENDENTLY ADJUST UP/DOWN/RIGHT/LEFT |

FROM FIG. 28B

| | | |
|---|---|---|
| COPY | WATERMARK | SET WATERMARK POSITION, SET IMAGE ORIENTATION, SET PRINT SIZE, SET PRINT COLOR, SET WATERMARK TYPE, SET PRINT PAGE TYPE (HEADER, FULL PAGE), SET PRINT TYPE (TRANSPARENT, SOLID), SET DENSITY FOR TRANSPARENCY MODE |
| COPY | PRINT DATE | SET PRINT DATE POSITION, SET IMAGE ORIENTATION, SET PRINT SIZE, SET PRINT COLOR, SET DATE FORMAT, SPECIFY DATE, SET PRINT TYPE (TRANSPARENT, SOLID), SET DENSITY FOR TRANSPARENCY MODE |
| COPY | SHIFT IMAGE POSITION | SELECT POSITION (UPPER, UPPER-RIGHT, RIGHT, LOWER-RIGHT, LOWER, LOWER-LEFT, LEFT, UPPER-LEFT), SET SHIFT WIDTH BY NUMERIC KEYS, SET FRONT SIDE, SET BACK SIDE, NUMERIC KEYS |
| COPY | GUTTER | SELECT GUTTER POSITION (LEFT, RIGHT, TOP, BOTTOM), FRONT SIDE, BACK SIDE, SPECIFY GUTTER WIDTH |
| COPY | REPEAT IMAGES | SPECIFY NUMBER OF TIMES TO REPEAT (VERTICAL), SPECIFY NUMBER OF TIMES TO REPEAT (HORIZONTAL), SELECT AUTO SETTING, SPECIFY AREA BY TOUCH, SPECIFY AREA BY NUMERIC KEYS, SET MARGINS |
| COPY | MERGE JOB BLOCKS | FINISHING, JOB SEPARATOR, PAGE NUMBERING, COPY SET NUMBERING, WATERMARK, PRINT DATE, JOB DONE NOTICE, STORE IN MAIL BOX, SPECIFY JOB DONE NOTICE DESTINATION, SPECIFY INDEX, ENTER SEARCH NAME |
| COPY | AREA DESIGNATION | INSTRUCT TO START SCANNING, DESIGNATE AREA, FRAMING, BLANKING, ENTER AREA COORDINATES |
| COPY | PRINT ON TAB | SPECIFY NUMBER OF TABS, SELECT PAPER |
| COPY | STORE IN MAIL BOX | SELECT FILE NAME, SELECT BOX NUMBER, COPY UPON STORING |
| COPY | SUPERIMPOSE IMAGE | SPECIFY SIDE TO COMBINE (FRONT SIDE, BACK SIDE), SPECIFY FORM, SPECIFY COMPOSITION TYPE (SOLID, TRANSPARENT), SPECIFY DENSITY FOR TRANSPARENCY MODE, SELECT COLOR |
| COPY | ID CARD COPY | SPECIFY PAPER SIZE TO MAKE ID CARD COPIES |
| COPY | PAPER SAVE | SELECT COLOR OF ORIGINALS TO SKIP (WHITE/COLOR, WHITE ONLY), ADJUST BLANK PAGE DETECTION LEVEL |

FIG. 29A

| FUNCTION | ITEM GROUP | ITEM |
|---|---|---|
| SEND | MAIN MENU | INSTRUCT TO START SCANNING, INSTRUCT TO STOP SCANNING, INSTRUCT TO START SENDING, INSTRUCT TO RECALL CANCEL CONFIRMATION SCREEN (ADDRESS BOOK, ONE-TOUCH, REGISTER DESTINATIONS, MOBILE PORTAL, PREVIOUS SETTINGS, FAVORITE SETTINGS, SCAN SETTINGS (COLOR, RESOLUTION, SIZE, FILE FORMAT), OPTIONS, ORIGINAL TYPE, 2-SIDED ORIGINAL, BOOK→2 PAGES, DIFFERENT SIZE ORIGINALS, DENSITY, SHARPNESS, COPY RATIO, ERASE FRAME, JOB BUILD, DELAYED SEND PREVIEW, FINISHED STAMP, JOB DONE NOTICE, FILE NAME, SUBJECT/MESSAGE, REPLY-TO, E-MAIL PRIORITY, TX REPORT, ORIGINAL CONTENT ORIENTATION, SKIP BLANK PAGES, DOUBLE FEED DETECTION) |
| SEND | ADDRESS BOOK | SELECT ADDRESS LIST FILTERING METHOD (SEARCH BY INITIAL, SEARCH BY TYPE), CHANGE ADDRESS TABLE, DETAILED ADDRESS INFORMATION, SPECIFY DESTINATION ADDRESS, ENTER SEARCH NAME, USE SOFTWARE KEYBOARD, REGISTER IN ONE-TOUCH BUTTON, REGISTER NEW DESTINATIONS (E-MAIL ADDRESS, I-FAX ADDRESS, FILE, GROUP), SPECIFY REGISTERED DESTINATION NAME, SPECIFY REGISTERED DESTINATION ADDRESS, BROWSE FOLDERS, ADD TO ADDRESS BOOK |
| SEND | ONE-TOUCH | SELECT ITEM, SCROLL, SELECT NUMERIC KEY, REGISTER, EDIT, DELETE, CONFIRM DELETION, ENTER NAME, ENTER ONE-TOUCH NAME, ENTER ADDRESS, DIVIDE DATA |
| SEND | MOBILE PORTAL | SELECT LAN CONNECTION, SELECT DIRECT WIRELESS CONNECTION, START DIRECT CONNECTION |
| SEND | REGISTER E-MAIL ADDRESS | ENTER E-MAIL ADDRESS, DIVIDE DATA, STORE IN ADDRESS BOOK |
| SEND | REGISTER I-FAX ADDRESS | DIVIDE DATA, REGISTER TEMPLATE, SELECT "SEND VIA I-FAX SERVER", SET I-FAX DESTINATION CONDITIONS (PAPER SIZE, COMPRESSION METHOD, RESOLUTION, DIVIDE DATA, RECEIVE IN COLOR), SELECT I-FAX MODE |
| SEND | REGISTER FILE (NETWORK FOLDER) | FILE SETTINGS (SELECT PROTOCOL, ENTER HOST NAME, ENTER FOLDER PATH, ENTER USER NAME, ENTER PASSWORD, SEARCH FOR HOST (ENTER WORK GROUP NAME, ENTER HOST NAME), SELECT "DISPLAY CONFIRMATION SCREEN BEFORE SENDING" FOR EACH FOLDER |
| SEND | REGISTER GROUP ADDRESS | STORE IN MAIL BOX, SPECIFY BOX NUMBER |
| SEND | CC & BCC | SPECIFY CC DESTINATIONS, SPECIFY BCC DESTINATIONS |

FROM FIG. 29A

| | | |
|---|---|---|
| SEND | CHECK SETTINGS | SPECIFY SETTINGS TO BE CHECKED, INSTRUCT TO CHANGE SETTINGS |
| SEND | PREVIOUS SETTINGS | PREVIOUS SETTINGS, SPECIFY PREVIOUS SETTING, SCROLL |
| SEND | FAVORITE SETTINGS | SPECIFY FAVORITE SETTINGS, REGISTER, EDIT, SCROLL, SHOW COMMENTS (ON/OFF), DISPLAY CONFIRMATION FOR RECALLING (ON/OFF), ALLOW/REJECT REGISTRATION, SELECT REGISTRATION DESTINATION, ENTER NAME, ENTER COMMENT |
| SEND | SELECT COLOR | AUTO (COLOR/GRAY), AUTO (COLOR/BLACK), FULL COLOR, GRAYSCALE, BLACK & WHITE BINARY |
| SEND | RESOLUTION | 100×100 dpi TO 600×600 dpi |
| SEND | SCAN SIZE | A/B SIZE, AUTO, CUSTOM (X-VALUE, Y-VALUE, NUMERIC KEYS, REGISTERED SIZE), LONG ORIGINAL, FREE SIZE |
| SEND | FILE FORMAT | JPEG, TIFF, AUTO JPEG/TIFF, PDF, XPS, LIMITED COLOR, COMPACT, PDF/A COMPLIANT, DIVIDE INTO PAGES (SPECIFY NUMBER OF PAGES) |
| SEND | ORIGINAL TYPE | TEXT, PHOTO, TEXT/PHOTO, ADJUST LEVEL |
| SEND | 2-SIDED ORIGINAL | BOOK TYPE, CALENDAR TYPE |
| SEND | BOOK → 2 PAGES | LEFT OPENING BOOK, RIGHT OPENING BOOK |
| SEND | DIFFERENT SIZE ORIGINALS | SAME WIDTH, DIFFERENT WIDTHS |
| SEND | DENSITY | ADJUST DENSITY, ADJUST BACKGROUND (AUTO), ADJUST BACKGROUND (RGB, BATCH) |
| SEND | SHARPNESS | HIGH/LOW |
| SEND | COPY RATIO | ENTER RATIO, SELECT PLUS/MINUS, SELECT FROM PRESET RATIOS, SET BY LENGTH, XY SAME RATIO OR INDEPENDENT, SPECIFY RATIO FOR POSTER BY % OR NUMBER OF SHEETS, USE NUMERIC KEYS |
| SEND | ERASE FRAME | ERASE ORIGINAL FRAME, ERASE BOOK FRAME, ERASE BINDING, SPECIFY VALUE, ADJUST UP/DOWN/RIGHT/LEFT/CENTER, SPECIFY CENTER, SPECIFY BOOKLET |

FROM FIG. 29B

| SEND | DELAYED SEND | ENTER SEND TIME |
|---|---|---|
| SEND | PREVIEW | PREVIEW |
| SEND | JOB DONE NOTICE | NOTICE FOR ANY RESULT, NOTICE ONLY FOR ERRORS, SPECIFY DESTINATION TO NOTIFY, ATTACH TX IMAGE |
| SEND | FILE NAME | SPECIFY FILE NAME, REMOVE DATE/JOB NUMBER, OVERWRITE EXISTING FILE |
| SEND | SUBJECT/MESSAGE | ENTER SUBJECT, ENTER MESSAGE |
| SEND | E-MAIL PRIORITY | SET PRIORITY (LOW, NORMAL, HIGH) |
| SEND | ORIGINAL CONTENT ORIENTATION | TOP AT FAR EDGE, TOP AT SIDE EDGE |
| SEND | SKIP BLANK PAGES | SELECT COLOR OF ORIGINALS TO SKIP (WHITE/COLOR, WHITE ONLY), PREVIEW (ON/OFF), ADJUST DETECTION LEVEL |
| PRINT | MAIN MENU | FILTER JOBS (WAITING JOBS, PRINTED JOBS, PERSONAL, SHARED), SELECT JOB, CANCEL JOB SELECTION, UPDATE JOB LIST, PRINT SETTINGS, DISPLAY IMAGE, DELETE JOB, SPECIFY NUMBER OF COPIES, START PRINTING, PREVIEW (SPECIFY PAGE, DISPLAY ENLARGED/REDUCED PREVIEW) |
| PRINT | PRINT SETTINGS | SELECT COLOR (AUTO (COLOR/BLACK), BLACK, TWO COLORS), SELECT TONER SAVER MODE, SPECIFY TWO COLORS, 2-SIDED PRINTING (NO BINDING, LONG-EDGE BINDING, SHORT-EDGE BINDING), ENTER PIN FOR SECURED PRINTING, SPECIFY STAPLE POSITION, SPECIFY PUNCH HOLE POSITION |

FIG. 30A

| FUNCTION | ITEM GROUP | ITEM |
|---|---|---|
| SETTINGS | PREFERENCES | PAPER SETTINGS, DISPLAY SETTINGS, TIMER/ENERGY SETTINGS, NETWORK SETTINGS, EXTERNAL INTERFACE SETTINGS, SCROLL |
| SETTINGS | PREFERENCES > PAPER SETTINGS | PAPER SETTINGS FOR EACH CASSETTE, SELECT PAPER TYPE, SELECT ENVELOPE TYPE, ENTER ENVELOPE FLAP LENGTH, PAPER CASSETTE AUTO DETECTION SIZE, DISTINGUISH BETWEEN SIMILAR PAPER TYPES, PAPER TYPE MANAGEMENT SETTINGS, REGISTER FAVORITE PAPER TYPE, SPECIFY SORTING OF LISTED PAPER TYPES, SPECIFY PAPER LIST FILTER, SCROLL, ENTER NAME, SOFTWARE KEYBOARD |
| SETTINGS | PREFERENCES > DISPLAY SETTINGS | DEFAULT SCREEN AFTER STARTUP/RESTORATION (MAIN MENU, CUSTOM MENU, COPY, SCAN AND STORE, USE SAVED FILE, REMOTE SCANNER, SHOW USEFUL FUNCTIONS, PRINT, HOLD), CHANGE DEFAULT SCREEN, COPY SCREEN DISPLAY SETTINGS (SIMPLE/QUICK), STORE LOCATION DISPLAY SETTINGS ON/OFF (BOX, NETWORK SHARED BOX, MEMORY MEDIA), DISPLAY LANGUAGE SETTINGS, KEYBOARD SETTINGS, LOGIN USER NAME SETTINGS |
| SETTINGS | PREFERENCES > TIMER/ENERGY SETTINGS | ADJUST TIME, DATE/TIME SETTINGS (TIME ZONE, SUMMER TIME, ENTER TIME AND DATE), TIME FORMAT, STARTUP SETTINGS, AUTO CLEAR SETTINGS, AUTO SLEEP SETTINGS, SLEEP MODE EXIT TIME SETTINGS, HUMAN-PRESENCE SENSOR SETTINGS |
| SETTINGS | PREFERENCES > NETWORK | OUTPUT REPORT, NETWORK SETTINGS, CONFIRM CONNECTION, TCP/IP SETTINGS, SERVER SETTINGS, PORT SETTINGS, DRIVER SETTINGS, INDIVIDUAL COMMUNICATION STANDARD SETTINGS, FIREWALL SETTINGS, DEVICE POSITION INFORMATION SETTINGS |
| SETTINGS | PREFERENCES > EXTERNAL INTERFACE | USB SETTINGS (USB DEVICE USE SETTINGS), USB INPUT DEVICE/USB EXTERNAL STORAGE DEVICE DRIVER SETTINGS, USB EXTERNAL STORAGE DEVICE USE SETTINGS) KEY REPETITION SETTINGS, AUDIO MODE SETTINGS, AUDIO GUIDE VOLUME/SPEED SETTINGS, MICROPHONE TUNING |
| SETTINGS | ADJUSTMENT/MAINTENANCE | ADJUST IMAGE QUALITY, ADJUST ACTION, MAINTENANCE |
| SETTINGS | ADJUSTMENT/MAINTENANCE > ADJUST IMAGE QUALITY | CORRECT DENSITY FOR EACH APPLICATION, SPECIFY UNEVEN DENSITY CORRECTION METHOD, SPECIFY JOB TYPE TO APPLY TO UNEVEN DENSITY CORRECTION, VIVIDNESS SETTINGS, FINE ADJUST ZOOM |
| SETTINGS | ADJUSTMENT/MAINTENANCE > ADJUST IMAGE QUALITY > AUTO COLOR CORRECTION | SPECIFY TARGET SHEET, CORRECTION TYPE, REGISTER/SELECT SHEET, SPECIFY CORRECTION LEVEL, INITIALIZATION, SPECIFY CORRECTION TARGET CASSETTE, SPECIFY TEST PRINT, INSTRUCT TO READ TEST PAGE, CHECK AUTO GRADATION CORRECTION, FINE ADJUSTMENT OF AUTO GRADATION CORRECTION (CMYK DENSITY CORRECTION), CHANGE CORRECTION LEVEL |
| SETTINGS | ADJUSTMENT/MAINTENANCE > ACTION ADJUSTMENT | ADJUST SADDLE STITCH POSITION, SELECT FINISHER ACTION MODE, ADJUST FOLD POSITION, SET STAPLER EXECUTION TIME |

FROM FIG. 30A

| | | |
|---|---|---|
| SETTINGS | ADJUSTMENT/MAINTENANCE > MAINTENANCE | INSTRUCTION TO START CLEANING INSIDE MAIN UNIT, INSTRUCTION TO START CLEANING FEEDER, INSTRUCTION TO PLAY VIDEO ON CLEANING METHOD |
| SETTINGS | FUNCTION SETTINGS | COMMON, COPY, PRINTER, SEND, RECEIVE/FORWARD, STORE/ACCESS FILES |
| SETTINGS | FUNCTION > COMMON | PAPER FEED ACTION, PAPER OUTPUT ACTION, PRINT ACTION, SCAN ACTION, GENERATE FILE |
| SETTINGS | FUNCTION > COMMON > PAPER FEED ACTION | PAPER FEED ACTION (PAPER CASSETTE AUTO SELECTION ON/OFF, "SELECTED COLOR"-DEPENDENT SETTINGS, "PAPER TYPE"-DEPENDENT SETTINGS, SWITCH PAPER FEED METHOD, JOB INTERRUPTION TIMEOUT SETTINGS) |
| SETTINGS | FUNCTION > COMMON > PAPER OUTPUT ACTION | OUTPUT TRAY SETTINGS (SET PRIORITY FOR EACH FUNCTION), OFFSET JOBS, JOB SEPARATOR BETWEEN JOBS, INSERT JOB SEPARATION SHEET BETWEEN COPIES (SELECT PAPER, SET NUMBER OF COPIES, ON/OFF), UNFINISHED TAB PAPER FORCED OUTPUT |
| SETTINGS | FUNCTION > COMMON > PRINT ACTION | PRINT PRIORITY, PRODUCTIVITY/IMAGE QUALITY PRIORITY SETTINGS, TEXT/PHOTO PRIORITY IN BLACK-AND-WHITE ORIGINAL, OUTPUT REPORT SETTINGS, SUPERIMPOSITION FORM SETTINGS, IDENTIFICATION INFORMATION FORCED PRINT SETTINGS |
| SETTINGS | FUNCTION > COMMON > SCAN ACTION | FEEDER JAM RECOVERY METHOD, DOUBLE FEED DETECTION DEFAULT SETTINGS, STREAK REMOVAL SETTINGS, BLACK SCAN SPEED/IMAGE QUALITY PRIORITY, DISTINGUISH BETWEEN SIMILAR ORIGINALS, SET GAMMA VALUE FOR REMOTE SCANS |
| SETTINGS | FUNCTION > COMMON > FILE SETTINGS | IMAGE QUALITY LEVEL FOR HIGH COMPRESSION/LIMITED COLOR, SPECIFY MINIMUM PDF VERSION, CREATE PDF/A COMPLIANT FILES, OPTIMIZE PDF FOR WEB VIEW, SET DOCUMENT OPERATION AUTHORIZED SERVER |
| SETTINGS | FUNCTION > COPY | REGISTER/EDIT FAVORITE SETTINGS, CHANGE DEFAULT SETTINGS, REGISTER OPTIONS SHORTCUTS, AUTO COLLATE, AUTO ORIENTATION |
| SETTINGS | FUNCTION > PRINTER | SET PRINTER SPECIFICATIONS, PRINTER UTILITY (INITIALIZATION SETTING), RESTRICT PRINTER JOBS, PDL SELECTION |
| SETTINGS | FUNCTION > PRINTER > PRINTER SPECIFICATION SETTINGS | TONER DENSITY, TONER SAVER MODE, RESOLUTION, CMYK TONER DENSITY, LAYOUT, AUTO ERROR SKIP, TIMEOUT, PRINT AFTER COMPLETING RIP, SPECIFY BINDING MARGIN, FINISHING (COLLATE, STAPLE, SHIFT, STAPLE FREE BINDING), NUMBER OF PUNCH HOLES, BOOKLET, SADDLE STITCH CREEP CORRECTION, TRANSPARENCY INTERLEAVING, COPY SET NUMBERING (PRINT POSITION, PRINT SIZE, PRINT COLOR), PDL ADVANCED SETTINGS (HALFTONE SELECTION, MATCHING METHOD, GRAY COMPENSATION) |

FROM FIG. 30B

| | | |
|---|---|---|
| SETTINGS | FUNCTION > STORE/ACCESS FILES | SCAN AND STORE SETTINGS (DEFAULT SETTINGS, FAVORITE SETTINGS), ACCESS STORED FILES SETTINGS (DEFAULT SETTINGS, FAVORITE SETTINGS), COMMON SETTINGS, MAIL BOX SETTINGS, SHARED BOX SETTINGS, NETWORK SETTINGS, MEMORY MEDIA SETTINGS |
| SETTINGS | FUNCTION > STORE/ACCESS FILES > MAIL BOX SETTINGS | SET/REGISTER BOXES (NAME, PIN, AUTO DELETE, AUTO PRINT), SETTINGS FOR ALL BOXES, BOX SECURITY SETTINGS |
| SETTINGS | FUNCTION > STORE/ACCESS FILES > SHARED BOX SETTINGS | SET/REGISTER BOXES, SETTINGS FOR ALL BOXES (PUBLIC MODE, AUTHENTICATION MANAGEMENT, PERSONAL USE, WRITE FROM OUTSIDE, SAVED FILE FORMAT), BOX SECURITY SETTINGS |
| SETTINGS | FUNCTION > STORE/ACCESS FILES > NETWORK SETTINGS | NETWORK PLACE SETTINGS, COMMUNICATION PROTOCOL FOR EXTERNAL REFERENCE, CONFIRM CERTIFICATE |
| SETTINGS | FUNCTION > RECEIVE/FORWARD | OUTPUT REPORT, DEFAULT SETTINGS, FAVORITE SETTINGS, SAVING FORMAT SETTINGS, ERROR TIME SETTINGS, FAX SETTINGS |
| SETTINGS | FUNCTION > SEND | OUTPUT REPORT, DEFAULT SETTINGS, FAVORITE SETTINGS, TRANSMISSION METHOD SETTINGS, E-MAIL SETTINGS, I-FAX SETTINGS, FAX SETTINGS |
| SETTINGS | MANAGEMENT SETTINGS | DEVICE MANAGEMENT, USER MANAGEMENT, SECURITY, SET LICENSE/OTHERS, DATA MANAGEMENT |
| SETTINGS | MANAGEMENT SETTINGS > USER MANAGEMENT | AUTHENTICATION SETTINGS FOR FUNCTION EXECUTION, AUTHENTICATION SETTINGS FOR PRINTING |
| SETTINGS | MANAGEMENT SETTINGS > DEVICE MANAGEMENT | DEVICE INFORMATION SETTINGS (DEVICE NAME, LOCATION, DEVICE INFORMATION DISTRIBUTION SETTINGS (REGISTER DESTINATIONS, AUTO DISTRIBUTION SETTINGS, RECEIPT RESTRICTION SETTINGS), FUNCTION RESTRICTION, CERTIFICATE SETTINGS (KEY GENERATION, CERTIFICATE LIST, CONFIRM CERTIFICATE INFORMATION) |
| SETTINGS | MANAGEMENT SETTINGS > LICENSE/OTHERS | REGISTER LICENSE (ENTER LICENSE NUMBER), REMOTE UI SETTINGS, UPDATE SOFTWARE |
| SETTINGS | MANAGEMENT SETTINGS > DATA MANAGEMENT | IMPORT/EXPORT (USB MEMORY IMPORT/EXPORT, WEB IMPORT/EXPORT) |
| SETTINGS | MANAGEMENT SETTINGS > SECURITY SETTINGS | AUTHENTICATION FUNCTION SETTINGS, PASSWORD SETTINGS |

IMAGE PROCESSING SYSTEM FOR CONTROLLING AN IMAGE FORMING APPARATUS WITH A MICROPHONE

CROSS-REFERENCE TO RELATED APPLICATION

This application is a Continuation of U.S. application Ser. No. 16/723,844, filed Dec. 20, 2019, which claims the benefit of Japanese Patent Application No. 2018-246036 filed Dec. 27, 2018, which are hereby incorporated by reference herein in their entireties.

BACKGROUND

Field

The present disclosure relates to an image forming system and an image forming apparatus capable of displaying information and being operated by speech input. This image forming apparatus can be used, for example, as a copier, a multifunction peripheral (MFP), a personal computer (PC), or a mobile terminal.

Description of the Related Art

An image forming apparatus, such as an MFP, has been known as an apparatus that accepts the input of user's instructions via an input interface, such as a touch panel. In the technical fields related to the image forming apparatus, techniques have been studied which replace part of such instructional input with speech input. Japanese Patent Laid-Open No. 2007-114297 discloses a technique in which a combination of print settings registered in a mode memory is specified by speech input.

SUMMARY

It has now been determined that the technique disclosed in Japanese Patent Laid-Open No. 2007-114297 still has room for improvement in terms of user-friendliness in using speech input. For example, Japanese Patent Laid-Open No. 2007-114297 introduces a mechanism in which, when user's instructions based on speech input are used, speech contents and accents are associated with combinations of settings and registered in the mode memory in advance, so that speech that matches a registered content is detected. With this detection technique, however, detection of subtle differences in accent or irrelevant words spoken may lead to a determination that there is no match in the registered content. In this case, the user may be requested to repeat the speech until a match is found in the registered contents. This is not ideal in terms of user-friendliness. Systems that accept operations based on speech input may better be capable of processing natural language.

The technique disclosed in Japanese Patent Laid-Open No. 2007-114297 only provides a fixed function of calling a combination of settings registered in the mode memory, in response to speech input after the press of a speech input key. That is, this technique was unable to provide capabilities that would respond, in a user-friendly manner, to the user's operation on the apparatus and the current state of the displayed screen.

The present disclosure provides an image forming system that is capable of accepting an operation instruction on the screen in accordance with speech input in natural language. In particular, the present disclosure provides an image forming system that is capable of responding to speech input in natural language, in accordance with information displayed on the screen.

The present disclosure provides an image forming system that includes an image forming device configured to form an image on a sheet, a display device configured to display information, and at least one controller configured to cause the display device to display a setting screen including a plurality of selection objects for specifying image formation settings, acquire text information including a first word and a second word on the basis of speech acquired through the microphone, and specify one of the plurality of selection objects on the basis of an association between the one selection object and information about combination of a plurality of words including the first word and the second word, acquire text information including a third word and a fourth word on the basis of speech acquired through the microphone, and specify one of the plurality of selection objects on the basis of an association between the one selection object and information about combination of a plurality of words not including the first word and the second word but including the third word and the fourth word, and cause the image forming device to form an image on the basis at least of an image formation setting associated with a selection object specified on the setting screen.

Further features of the present disclosure will become apparent from the following description of exemplary embodiments with reference to the attached drawings.

BRIEF DESCRIPTION OF THE DRAWINGS

FIG. 7B shows examples of group ID lists managed and used by the control program of the server.

FIGS. 9A, 9B, and 9C present a sequence diagram illustrating interactions between the apparatuses included in the image forming system and also between the control programs of the apparatuses.

FIG. 10 is a flowchart illustrating a processing flow of the control program of the image forming apparatus.

FIGS. 11A and 11B show other examples of group ID lists managed and used by the control program of the server.

FIG. 12D illustrates in Japanese a screen displayed by the control program of the image forming apparatus, and FIGS. 12B and 12C illustrate an example of screen control information and an example of operation-target determination information, respectively, managed and used by the control program of the image forming apparatus.

FIGS. 13A, 13B, 13C, and 13D illustrate interactions between the image forming system and the user.

FIGS. 14A and 14B show other examples of group ID lists managed and used by the control program of the server.

FIGS. 15A, 15B, 15C, and 15D show other examples of group ID lists managed and used by the control program of the server.

FIGS. 16A, 16B, and 16C show other examples of group ID lists managed and used by the control program of the server.

FIGS. 17A and 17B show other examples of group ID lists managed and used by the control program of the server.

FIGS. 18A and 18B show other examples of group ID lists managed and used by the control program of the server.

FIGS. 19A, 19B, and 19C show other examples of group ID lists managed and used by the control program of the server.

FIGS. 20A, 20B, 20C, and 20D show other examples of group ID lists managed and used by the control program of the server.

FIGS. 21A, 21B, and 21C show other examples of group ID lists managed and used by the control program of the server.

FIGS. 22A and 22B show other examples of group ID lists managed and used by the control program of the server.

FIGS. 23A and 23B show other examples of group ID lists managed and used by the control program of the server.

FIG. 24 shows another example of group ID list managed and used by the control program of the server.

FIGS. 25A and 25B show other examples of group ID lists managed and used by the control program of the server.

FIG. 26I illustrates in Japanese another screen displayed by the control program of the image forming apparatus, FIG. 26B illustrates another example of the screen control information managed and used by the control program of the image forming apparatus, and FIGS. 26C, 26D, 26E, 26F, 26G, and 26H illustrate other examples of the operation-target determination information managed and used by the control program of the image forming apparatus.

FIG. 27D illustrates in Japanese another screen displayed by the control program of the image forming apparatus, 27B and 27C illustrate another example of the screen control information and another example of the operation-target determination information, respectively, managed and used by the control program of the image forming apparatus.

FIGS. 28A, 28B, and 28C illustrate a list of items that can be operated by speech input.

FIGS. 29A, 29B, and 29C illustrate a list of items that can be operated by speech input.

FIGS. 30A, 30B, and 30C illustrate a list of items that can be operated by speech input.

DESCRIPTION OF THE EMBODIMENTS

Embodiments of the present disclosure will now be described using specific configurations, with reference to the drawings. Note that configurations for implementing the present disclosure are not limited to those described in the embodiments. Some of the configurations described in the embodiments may be omitted or replaced with equivalents as long as similar advantageous effects are achievable.

Embodiments (System Configuration)

Figure 1:
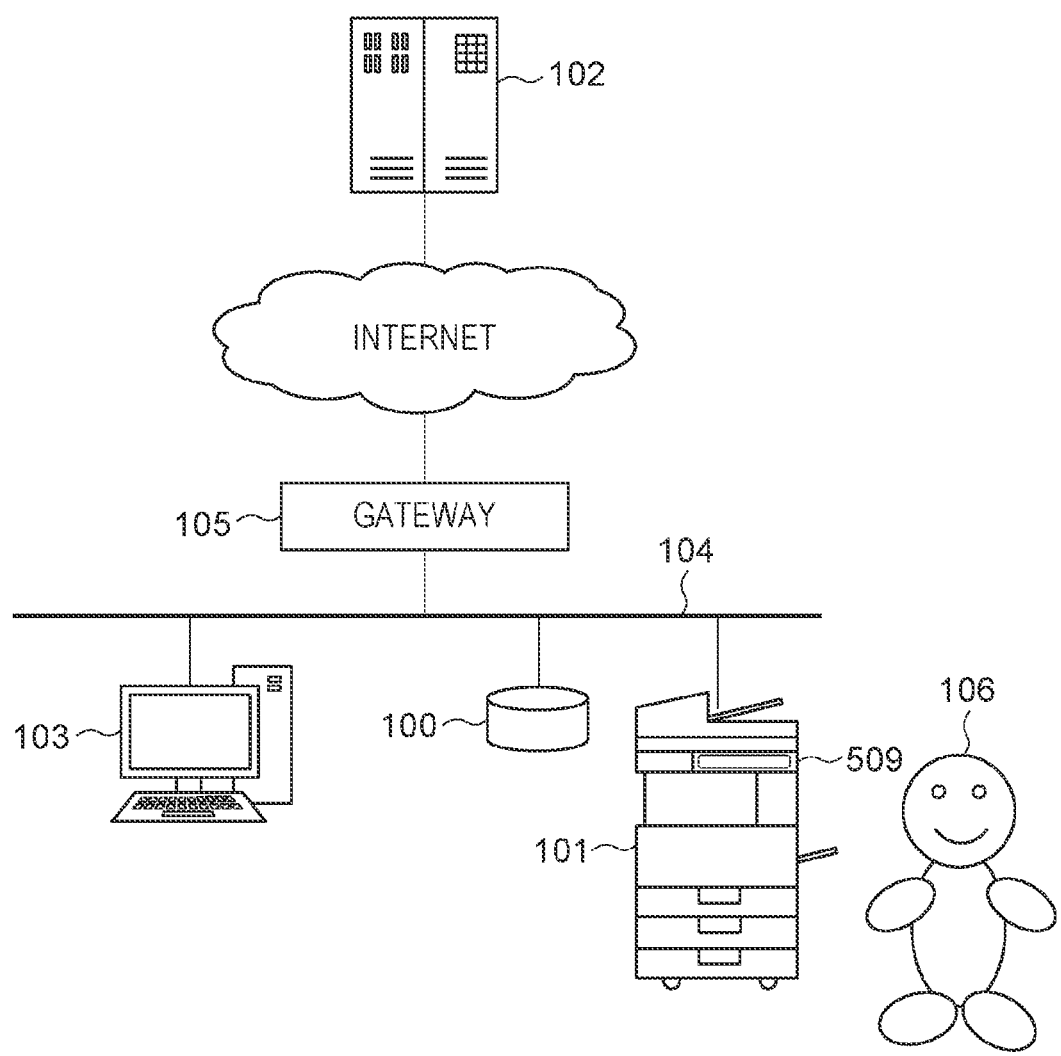
FIG. 1 illustrates a configuration of an image forming system.

FIG. 1 illustrates a configuration of an image forming system according to the present embodiment. As illustrated in FIG. 1, the image forming system includes an audio control apparatus 100, an image forming apparatus 101 (image processing apparatus), a server 102 (information processing apparatus), a client terminal 103, and a gateway 105.

The audio control apparatus 100, the image forming apparatus 101, and the client terminal 103 are capable of communicating with each other via the gateway 105 and a network 104 (local area network or LAN). Note that more than one audio control apparatus 100, more than one image forming apparatus 101, and more than one client terminal 103 may be configured to connect each other. The audio control apparatus 100, the image forming apparatus 101, and the client terminal 103 can communicate with the server 102 via the gateway 105 and the Internet.

In accordance with an instruction to start a speech operation (speech operation start instruction) from a user 106, the audio control apparatus 100 acquires speech of the user 106 and transmits coded audio data (audio information) to the server 102. The audio control apparatus 100 is, for example, a smart speaker. In the present embodiment, the audio control apparatus 100 and the image forming apparatus 101 are configured to be independent of each other. Alternatively, hardware components (or hardware blocks described below with reference to FIG. 3) and software functions (or software blocks described below with reference to FIG. 6) of the audio control apparatus 100 may be included in the image forming apparatus 101. That is, the configuration is not limited to that described above.

Although the image forming apparatus 101 described here is, for example, an MFP having multiple functions, such as copying, scanning, printing, and faxing, the image forming apparatus 101 may be a printer or scanner having a single function. The image forming apparatus 101 includes an operation panel 509 described below with reference to FIG. 2 and FIG. 5. The following description assumes that the image forming apparatus 101 is a color laser beam MFP.

The server 102 performs speech recognition on audio data representing speech of the user 106 and acquired by the audio control apparatus 100. From the speech recognition result, the server 102 determines words (word information) that are related to setting operations and job execution of the image forming apparatus 101. Additionally, the server 102 generates text in accordance with the speech recognition result or the determined words, and synthesizes audio data for the audio control apparatus 100 to reproduce speech from the text. Machine learning using a neural network, such as deep learning, enables the server 102 to provide accurate results of speech recognition. For example, the server 102 performs learning for accurately recognizing speech of a distant user. Also, the server 102 supports natural language processing. For example, through morphological analysis, syntax analysis, semantic analysis, and context analysis, the server 102 can acquire relevant information (words, results of kana-kanji conversion) from natural language received. Note that the "job" described above is a unit representing a series of image forming operations implemented by the image forming apparatus 101 (e.g., copying, scanning, or printing) using a print engine 513 or a scanner 515 (see FIG. 5).

The client terminal 103 is, for example, a PC used by the user 106. The client terminal 103 issues a print job for printing an electronic file on the image forming apparatus 101. The electronic file is stored, for example, in the client terminal 103, any server (not shown) on the Internet, or an external storage device 505 (see FIG. 5) of the image forming apparatus 101. The client terminal 103 receives image data scanned by the image forming apparatus 101. The operation of the client terminal 103 will not be described in further detail, as it is irrelevant to the series of descriptions of the present embodiment.

The network 104 enables the audio control apparatus 100, the image forming apparatus 101, the client terminal 103, and the gateway 105 to connect with one another. The network 104 enables transmission and reception of various types of data, such as audio data acquired by the audio control apparatus 100 and transmitted to the server 102, each data transmitted from the server 102, and print jobs and scan jobs.

The gateway 105 is, for example, a wireless LAN router that is compliant with the IEEE 802.11 standard series, or may be capable of operating in accordance with a different wireless communication system. The gateway 105 may not necessarily need to be a wireless LAN router, and may be a wired LAN router compliant with an Ethernet standard, such as 10 BASE-T, 100 BASE-T, or 1000 BASE-T, or may be capable of operating in accordance with a different wired communication system. Note that the IEEE 802.11 standard series described above includes a series of standards belonging to the IEEE 802.11, such as the IEEE 802.11a and IEEE 802.11b.

(Operation Panel of Image Forming Apparatus)

Figure 2:
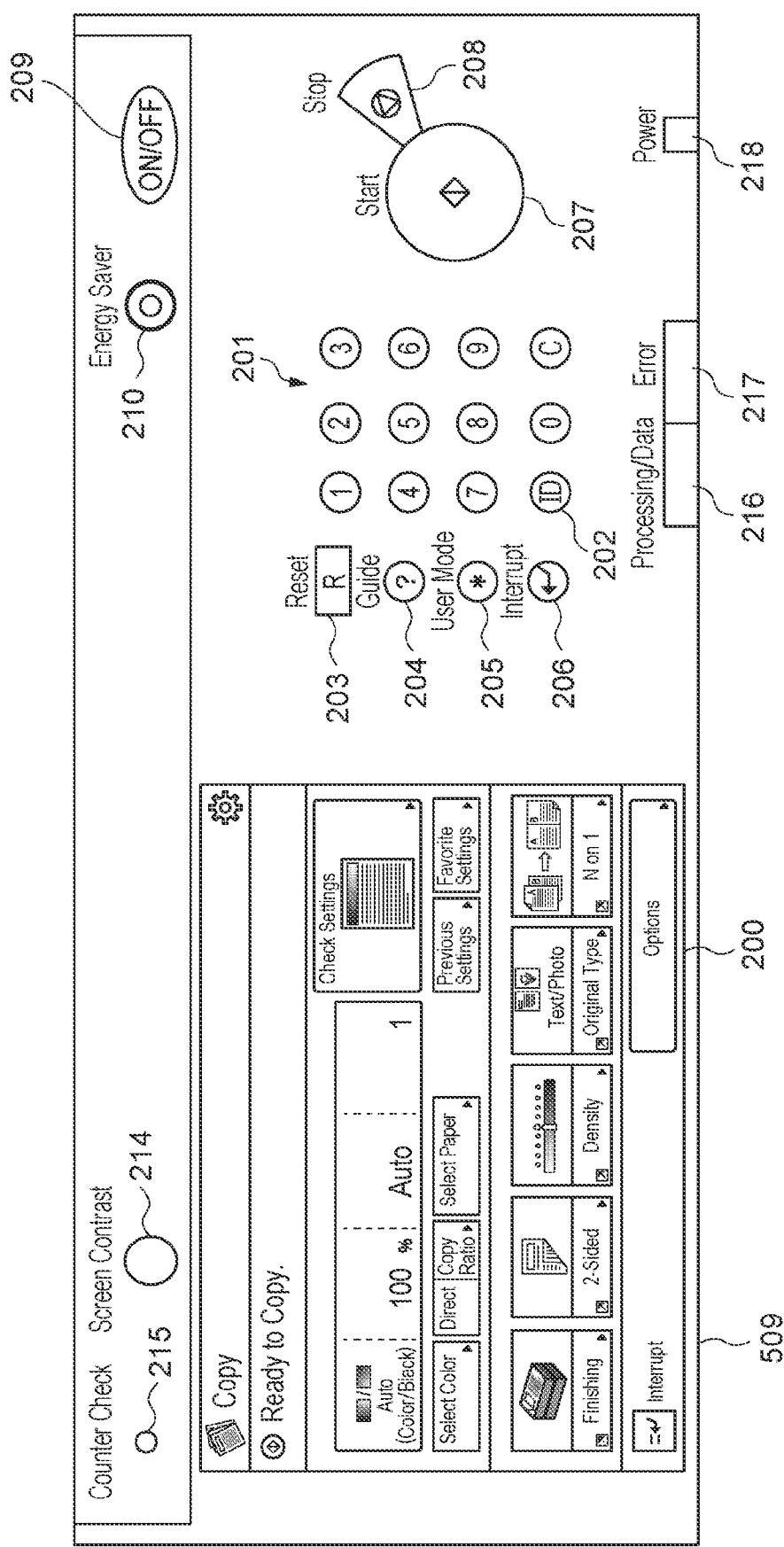
FIG. 2 illustrates a configuration of an operation panel.

FIG. 2 illustrates a configuration of the operation panel 509 of the image forming apparatus 101. The operation panel 509 is a display device that includes light-emitting diodes (LEDs) and a liquid crystal display (LCD), and displays operations of the user 106 and the internal states of the apparatus. The operation panel 509 also functions as an accepting device (input device) that accepts operations from the user 106. The operation panel 509 includes not only a plurality of hardware keys, but also a touch panel integral with the LCD. A display unit 200 is an LCD touch panel where primary mode setting and status display operations take place.

Keys 201 to 210 are hardware keys, such as tactile switches.

The key 201 represents a numeric keypad (including numeric keys) used to enter numeric values from 0 to 9. The key 202 is an identification (ID) key used for an authentication action (such as a login or logout action) when the apparatus is managed through user/department authentication.

The key 203 is a reset key used to reset the set mode, and the key 204 is a guide key used to display a screen showing a description of each mode. The key 205 is a user mode key used to display a user mode screen. The key 206 is an interrupt key used to perform interrupt copying.

The key 207 is a start key used to start copying, and the key 208 is a stop key used to stop a copy job in progress.

The key 209 is a soft power switch. Pressing the key 209 turns off the backlight of the LCD touch panel 200 and brings the apparatus into a low-power state. The key 210 is an energy saver key. Pressing the key 210 brings the apparatus into an energy saving state, and pressing the key 210 again enables recovery from the energy saving state.

A key 214 is an adjustment key used to adjust the contrast of the LCD touch panel 200.

A key 215 is a counter check key. By pressing the key 215, a count screen showing the total number of copies made so far is displayed on the LCD touch panel 200.

An LED 216 is an LED indicating that a job is in progress or an image is being stored into an image memory. An LED 217 is an error LED indicating that the apparatus is in an error state. For example, the LED 217 indicates that a paper jam has occurred or a door is open. An LED 218 is a power LED indicating that the main switch of the apparatus is ON.

(Hardware Configuration of Audio Control Apparatus)

Figure 3:
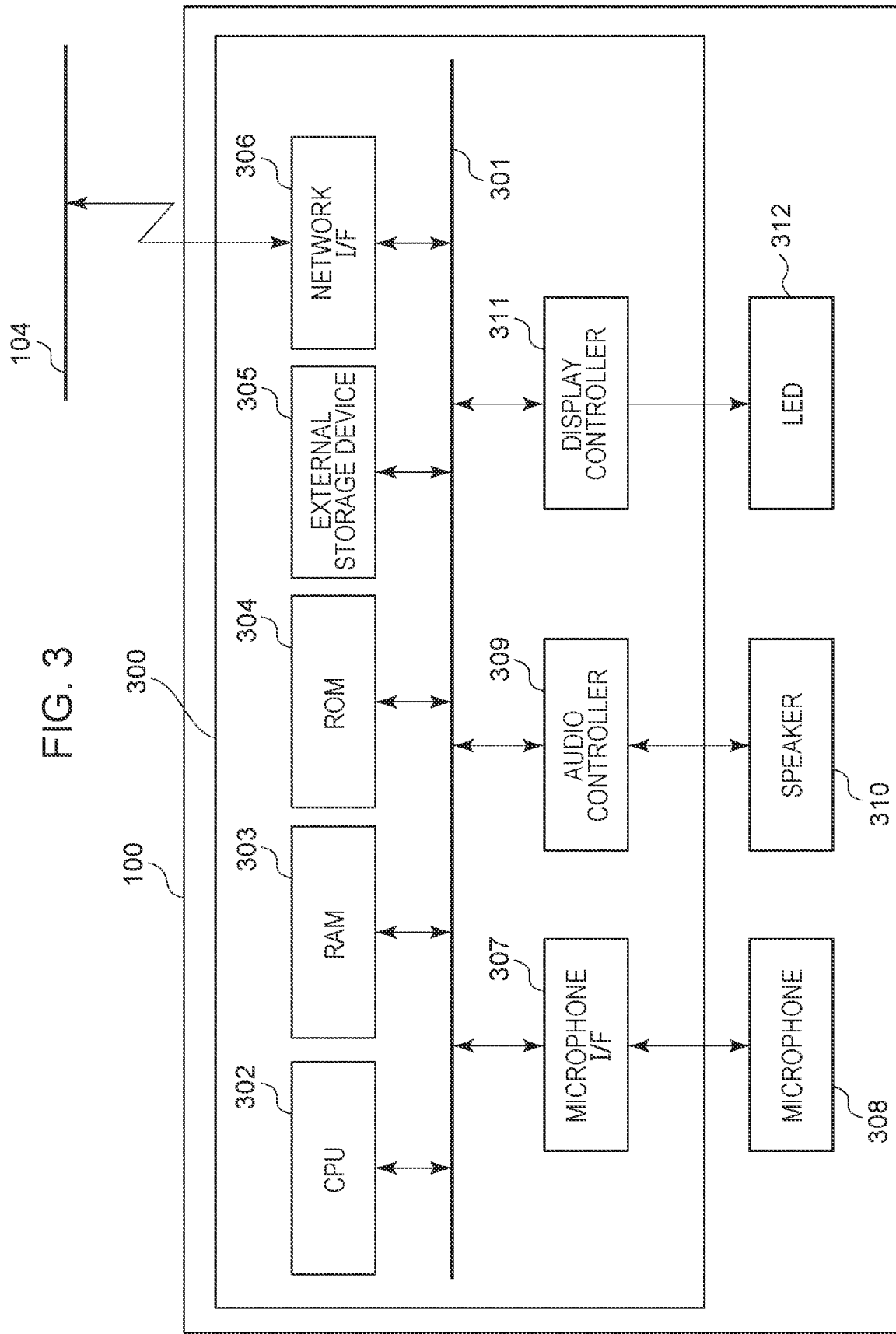
FIG. 3 is a conceptual diagram illustrating a hardware configuration of an audio control apparatus.

FIG. 3 is a diagram illustrating a hardware configuration of a controller unit 300 of the audio control apparatus 100 and devices included in the audio control apparatus 100.

As illustrated in FIG. 3, the controller unit 300 includes a central processing unit (CPU) 302, a random-access memory (RAM) 303, a read-only memory (ROM) 304, an external storage device 305, a network interface (I/F) 306, a microphone I/F 307, an audio controller 309, and a display controller 311 that are connected to a system bus 301. The audio control apparatus 100 further includes devices accompanying the controller unit 300. The devices include a microphone 308 serving as a speech input device, a speaker 310 serving as an audio output device, and an LED 312 serving as a notification device.

The CPU 302 is a central processing unit that controls the overall operation of the controller unit 300. The RAM 303 is a volatile memory. The ROM 304 is a nonvolatile memory and stores a boot program for the CPU 302. The external storage device 305 (e.g., secure digital memory card or SD card) is a storage device with a larger capacity than the RAM 303. A control program executed by the controller unit 300 to control the audio control apparatus 100 is stored in the external storage device 305. The external storage device 305 may be a flash ROM, not the SD card, or may be replaced with a different type of storage device having a function equivalent to that of the SD card.

At startup (e.g., when the power is turned on), the CPU 302 executes the boot program stored in the ROM 304. The boot program is for reading the control program stored in the external storage device 305 and developing the read control program in the RAM 303. After executing the boot program, the CPU 302 executes the control program developed in the RAM 303 to carry out control. The CPU 302 stores, in the RAM 303, data used during execution of the control program, and performs reading from and writing to the RAM 303. Various settings required during execution of the control program can also be stored in the external storage device 305, and are read and rewritten by the CPU 302. The CPU 302 communicates with other devices on the network 104 via the network I/F 306.

The network I/F 306 includes a circuit and an antenna for performing communication in accordance with a wireless communication system based on the IEEE 802.11 standard series. The communication system does not necessarily need to be a wireless communication system, and may be a wired communication system based on the Ethernet standard.

The microphone I/F 307 connects to the microphone 308, converts speech spoken by the user 106 and received by the microphone 308 into coded audio data, and stores the data in the RAM 303 in accordance with an instruction from the CPU 302.

The microphone 308 is, for example, a small micro-electro mechanical systems (MEMS) microphone mounted on a smartphone, but may be any device capable of acquiring speech of the user 106. Three or more microphones 308 may be arranged at predetermined positions to calculate the direction of the incoming speech spoken by the user 106.

However, the present embodiment can be implemented with one microphone 308. The number of the microphones 308 does not necessarily need to be three or more.

The audio controller 309 connects to the speaker 310, converts the audio data into an analog audio signal in accordance with an instruction from the CPU 302, and outputs the resulting speech through the speaker 310.

The speaker 310 reproduces an audio response indicating that the audio control apparatus 100 is responding, and also reproduces speech synthesized by the server 102. The speaker 310 is a sound reproducing device for general purposes.

The display controller 311 connects to the LED 312 and controls the display of the LED 312 in accordance with an instruction from the CPU 302. In the present embodiment, the display controller 311 mainly controls the illumination of the LED 312 to indicate that the audio control apparatus 100 is properly receiving speech input from the user 106.

The LED 312 is, for example, a blue LED visible to the user 106. The LED 312 is a general-purpose device. The LED 312 may be replaced by a display device capable of displaying text and pictures.

(Hardware Configuration of Server)

Figure 4:
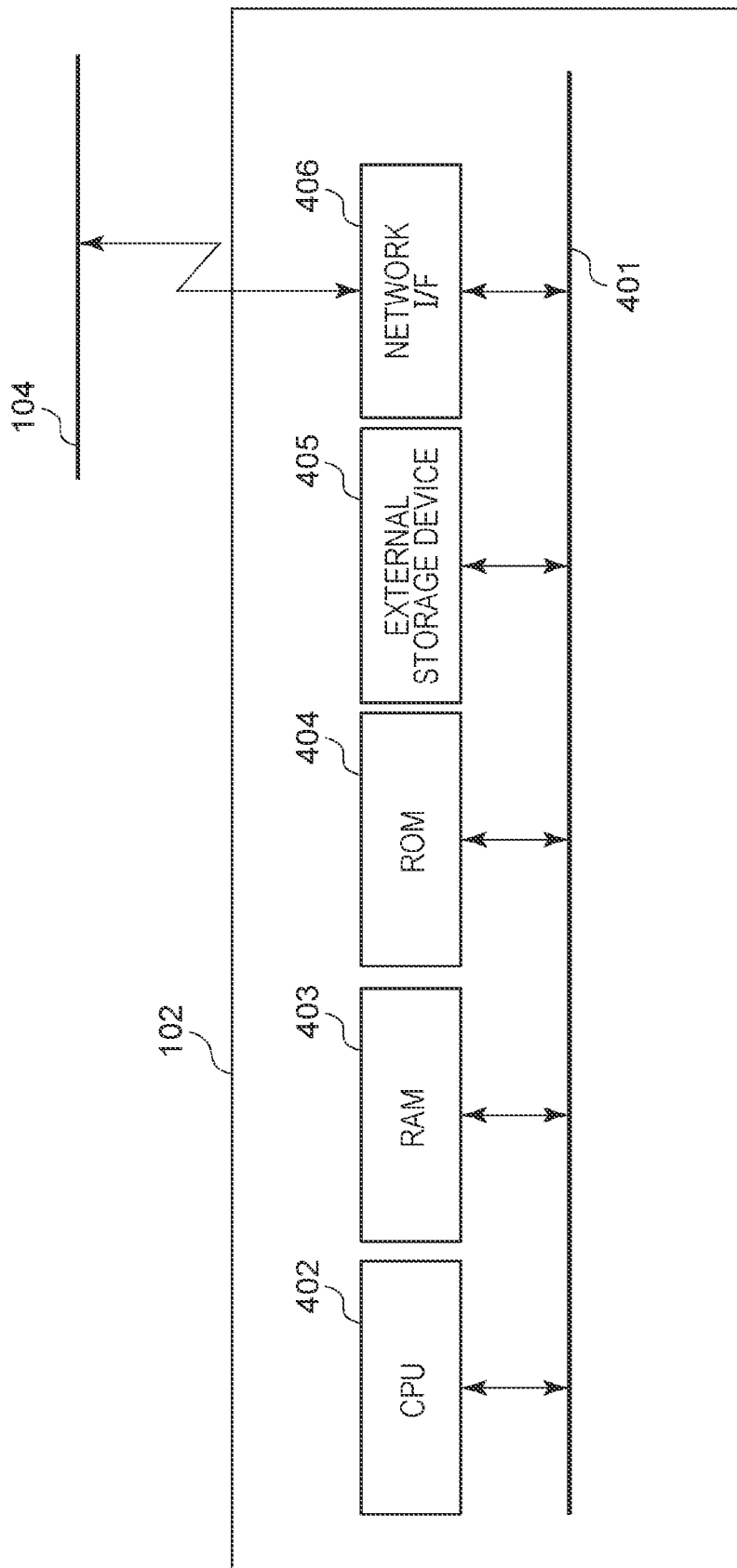
FIG. 4 is a conceptual diagram illustrating a hardware configuration of a server.

FIG. 4 is a diagram illustrating a hardware configuration of a controller unit of the server 102.

As illustrated in FIG. 4, the controller unit includes a CPU 402, a RAM 403, a ROM 404, an external storage device 405, and a network I/F 406 that are connected to a system bus 401.

The CPU 402 is a central processing unit that controls the overall operation of the controller unit. The RAM 403 is a volatile memory. The ROM 404 is a nonvolatile memory and stores a boot program for the CPU 402. The external storage device 405 (e.g., hard disk drive or HDD) is a storage device with a larger capacity than the RAM 403. A control program executed by the controller unit to control the server 102 is stored in the external storage device 405. The external storage device 405 may be a solid state drive (SSD), or may be replaced with a different type of storage device having a function equivalent to that of the HDD.

At startup (e.g., when the power is turned on), the CPU 402 executes the boot program stored in the ROM 404. The boot program is for reading the control program stored in the external storage device 405 and developing the read control program in the RAM 403. After executing the boot program, the CPU 402 executes the control program developed in the RAM 403 to carry out control. The CPU 402 stores, in the RAM 403, data used during execution of the control program and performs reading from and writing to the RAM 403. Various settings required during execution of the control program can also be stored in the external storage device 405, and are read and rewritten by the CPU 402. The CPU 402 communicates with other devices on the network 104 via the network I/F 406.

(Hardware Configuration of Image Forming Apparatus)

Figure 5:
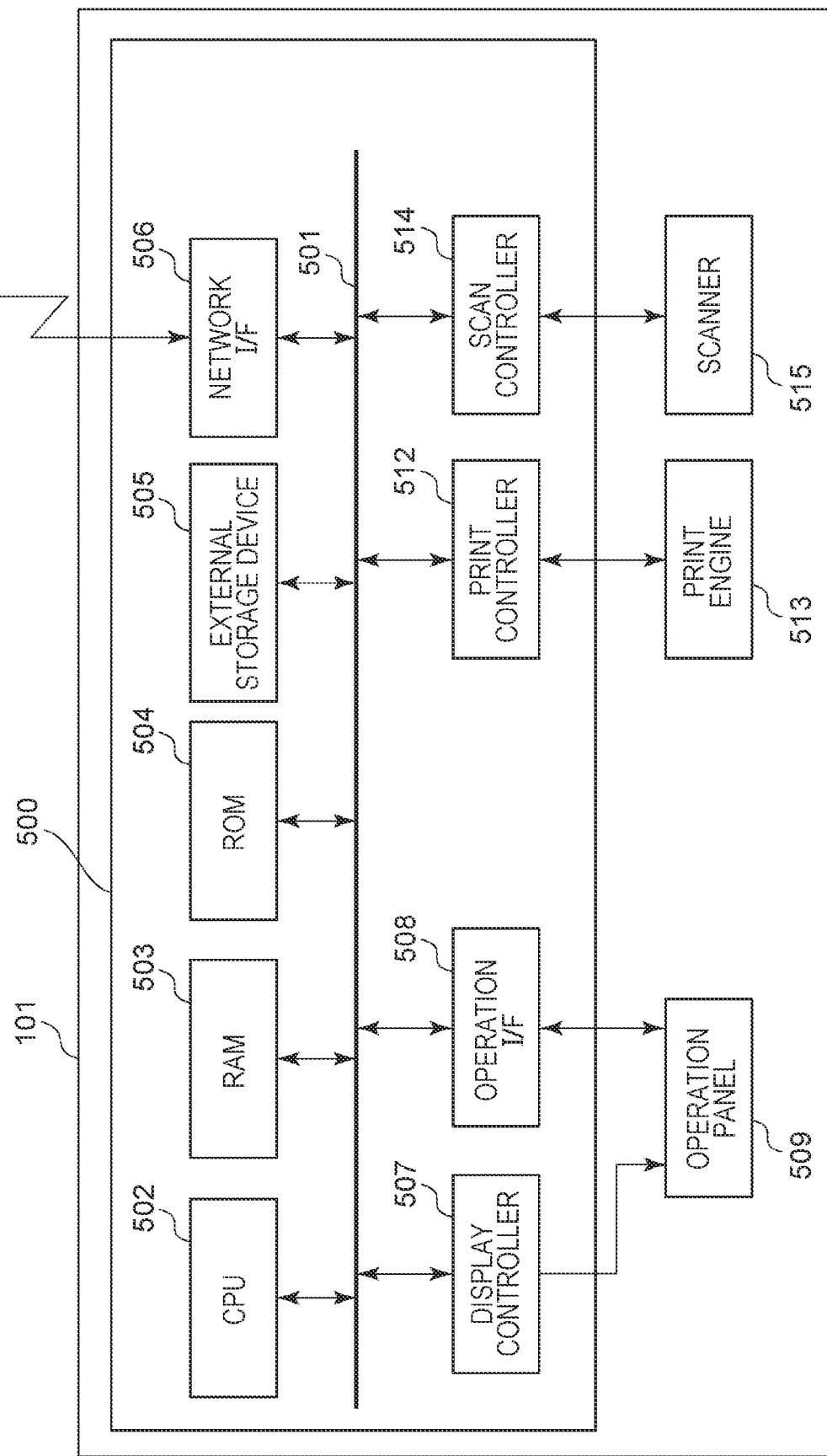
FIG. 5 is a conceptual diagram illustrating a hardware configuration of an image forming apparatus.

FIG. 5 is a diagram illustrating a hardware configuration of a controller unit 500 of the image forming apparatus 101 and devices included in the image forming apparatus 101.

As illustrated in FIG. 5, the controller unit 500 includes a CPU 502, a RAM 503, a ROM 504, an external storage device 505, a network I/F 506, a display controller 507, an operation I/F 508, a print controller 512, and a scan controller 514 that are connected to a system bus 501.

The CPU 502 is a central processing unit that controls the overall operation of the controller unit 500. The RAM 503 is a volatile memory. The ROM 504 is a nonvolatile memory and stores a boot program for the CPU 502. The external storage device 505 (e.g., HDD) is a storage device with a larger capacity than the RAM 503. A control program executed by the CPU 502 to control the image forming apparatus 101 is stored in the external storage device 505. The external storage device 505 may be an SSD, or may be replaced with a different type of storage device having a function equivalent to that of the HDD.

At startup (e.g., when the power is turned on), the CPU 502 executes the boot program stored in the ROM 504. The boot program is for reading the control program stored in the external storage device 505 and developing the read control program in the RAM 503. After executing the boot program, the CPU 502 executes the control program developed in the RAM 503 to carry out control. The CPU 502 stores, in the RAM 503, data used during execution of the control program and performs reading from and writing to the RAM 503. Various settings required during execution of the control program and image data read by the scanner 515 can also be stored in the external storage device 505, and are read and rewritten by the CPU 502. The CPU 502 communicates with other devices on the network 104 via the network I/F 506.

In accordance with an instruction from the CPU 502, the display controller 507 controls the screen display of the LCD touch panel 200 of the operation panel 509 connected to the display controller 507.

The operation I/F 508 allows input and output of operation signals. The operation I/F 508 is connected to the operation panel 509. When the LCD touch panel 200 is pressed, the CPU 502 acquires, via the operation I/F 508, coordinates corresponding to the press of the LCD touch panel 200. The operation I/F 508 detects the press of each of the hardware keys 201 to 210 on the operation panel 509.

In accordance with an instruction from the CPU 502, the print controller 512 transmits a control command or image data to the print engine 513 connected to the print controller 512.

The print engine 513 is a printing device that prints the received image data (or performs printing) on a sheet in accordance with the control command received from the print controller 512. The print engine 513 will not be described further, as its details are beyond the scope here.

In accordance with an instruction from the CPU 502, the scan controller 514 transmits a control command to the scanner 515 connected to the scan controller 514, and writes image data received from the scanner 515 into the RAM 503.

The scanner 515 is a reading device that reads (or performs reading of) an original on a platen glass (not shown) of the image forming apparatus 101 using an optical unit, in accordance with the control command received from the scan controller 514. The scanner 515 will not be described further, as its details are beyond the scope here.

Combining the print engine 513 and the scanner 515 enables photocopying of the read image of the original.

(Functional Configuration of Audio Control Program of Audio Control Apparatus)

Figure 6:
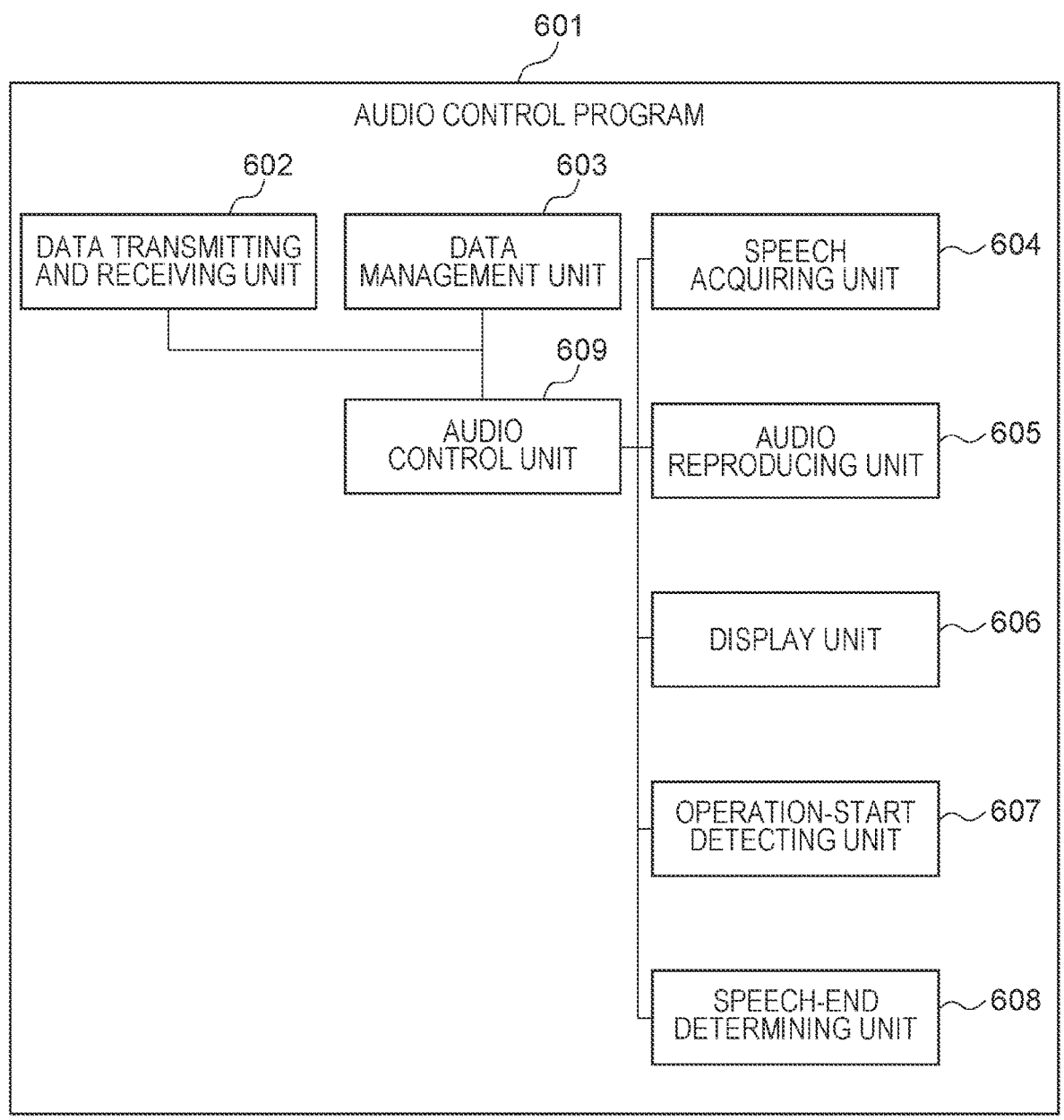
FIG. 6 is a conceptual diagram illustrating a functional configuration of a control program of the audio control apparatus.

FIG. 6 is a block diagram illustrating a functional configuration of an audio control program 601 of the audio control apparatus 100, executed by the CPU 302.

The audio control program 601 of the audio control apparatus 100 is stored in the external storage device 305 as described above. At startup, the CPU 302 develops the audio control program 601 in the RAM 303 and executes it.

A data transmitting and receiving unit 602 transmits and receives data to and from other devices on the network 104 via the network I/F 306 in accordance with the Transmission Control Protocol/Internet Protocol (TCP/IP). The data transmitting and receiving unit 602 transmits, to the server 102, audio data representing speech of the user 106 acquired by a speech acquiring unit 604 (described below). The data transmitting and receiving unit 602 receives synthesized speech data generated on the server 102 as a response to the user 106.

A data management unit 603 stores various types of data in a predetermined region of the external storage device 305 and manages the stored data. The various types of data include work data generated during execution of the audio control program 601. Specifically, for example, the data management unit 603 stores and manages volume setting data for setting the volume of speech reproduced by an audio reproducing unit 605 (described below), authentication information required for communicating with the gateway 105, and device information required for communicating with the image forming apparatus 101 and the server 102.

The speech acquiring unit 604 converts analog speech of the user 106 near the audio control apparatus 100, acquired by the microphone 308, into audio data and temporarily stores the audio data. The speech of the user 106 is converted to a predetermined format, such as an MPEG-1 Audio Layer-3 (MP3) format, and temporarily stored in the RAM 303 as coded audio data to be transmitted to the server 102. The start and end timing of processing in the speech acquiring unit 604 is managed by an audio control unit 609 (described below). The audio data may be coded in a general-purpose streaming format, and the coded audio data may be sequentially transmitted by the data transmitting and receiving unit 602.

The audio reproducing unit 605 reproduces, from the speaker 310 via the audio controller 309, synthesized speech data (audio message) received by the data transmitting and receiving unit 602. The timing of audio reproduction in the audio reproducing unit 605 is managed by the audio control unit 609 (described below).

A display unit 606 illuminates the LED 312 via the display controller 311. For example, the display unit 606 illuminates the LED 312 when an operation-start detecting unit 607 (described below) has detected the start of a speech operation. The timing of when the display unit 606 is to illuminate the LED 312 is managed by the audio control unit 609 (described below).

The operation-start detecting unit 607 detects a wake word spoken by the user 106, or a press of an operation start key (not shown) of the audio control apparatus 100. The operation-start detecting unit 607 then transmits an operation start notification to the audio control unit 609. Note that the wake word is a predetermined word to be spoken. The operation-start detecting unit 607 always detects a wake word from analog voice of the user 106 near the audio control apparatus 100, acquired by the microphone 308. The user 106 can operate the image forming apparatus 101 by saying a wake word and then speaking what he or she wants to do. Speech processing performed after the operation-start detecting unit 607 detects a wake word will be described later on below.

A speech-end determining unit 608 determines the end timing of processing in the speech acquiring unit 604. For example, when the speech of the user 106 stops for a predetermined length of time (e.g., three seconds), the speech-end determining unit 608 determines that the speech of the user 106 has ended. The speech-end determining unit 608 then transmits a speech end notification to the audio control unit 609. The determination of whether the speech has ended may be made on the basis of a predetermined word spoken by the user 106, not on the basis of the length of time during which no speech takes place (hereinafter referred to as "blank period"). For example, if a predetermined word, such as "Yes", "No", "OK", "Cancel", "Finish", "Start", or "Begin", is received, the speech-end determining unit 608 may determine that the speech has ended, without waiting for a predetermined length of time. The determination of the speech end may be made by the server 102, instead of the audio control apparatus 100. The end of the speech may be determined from the meaning and context of the speech made by the user 106.

The audio control unit 609 serves as a central control unit that enables other modules in the audio control program 601 to operate in a mutually coordinated manner. Specifically, the audio control unit 609 controls the start and end of processing of the speech acquiring unit 604, the audio reproducing unit 605, and the display unit 606. After the speech acquiring unit 604 acquires audio data, the audio control unit 609 performs control such that the data transmitting and receiving unit 602 transmits the audio data to the server 102. After the data transmitting and receiving unit 602 receives synthesized speech data from the server 102, the audio control unit 609 performs control such that the audio reproducing unit 605 reproduces the synthesized speech data.

The start and end timing of processing in the speech acquiring unit 604, the audio reproducing unit 605, and the display unit 606 will now be described.

Upon receiving an operation start notification from the operation-start detecting unit 607, the audio control unit 609 starts the processing in the speech acquiring unit 604. Upon receiving a speech end notification from the speech-end determining unit 608, the audio control unit 609 ends the processing in the speech acquiring unit 604. For example, assume that the user 106 speaks a wake word and then says "I want to make a copy". In this case, the operation-start detecting unit 607 detects the sound of the wake word and transmits an operation start notification to the audio control unit 609. Upon receiving the operation start notification, the audio control unit 609 performs control such that processing in the speech acquiring unit 604 starts. The speech acquiring unit 604 converts the subsequent analog speech "I want to make a copy" into audio data and temporarily stores the audio data. If the speech-end determining unit 608 determines that the speech "I want to make a copy" has been followed by a predetermined blank period, the speech-end determining unit 608 transmits a speech end notification to the audio control unit 609. Upon receiving the speech end notification, the audio control unit 609 ends the processing in the speech acquiring unit 604. Note that the state between the start and end of processing in the speech acquiring unit 604 will be referred to as a speech processing mode. The display unit 606 illuminates the LED 312 to indicate that the audio control apparatus 100 is in the speech processing mode.

After the speech-end determining unit 608 determines that the user 106 has ended the speech, the audio control unit 609 performs control such that the audio data is transmitted from the data transmitting and receiving unit 602 to the server 102, and then waits for a response from the server 102. The response is, for example, a response message composed of synthesized speech data and a header indicating that this is a response. When the data transmitting and receiving unit 602 receives a response message, the audio control unit 609 performs control such that the audio reproducing unit 605 reproduces synthesized speech data. The synthesized speech data is, for example, "Copy screen will be displayed". Note that the state between the speech end determination and the end of reproduction of the synthesized speech data will be referred to as a response processing mode. The display unit 606 blinks the LED 312 to indicate that the audio control apparatus 100 is in the response processing mode.

After the response processing, as long as the interactive session with the server 102 continues, the user 106 can speak what he or she wants to do without saying any wake word. The determination of whether the interactive session has ended is made by the server 102. The server 102 notifies the audio control apparatus 100 that the interactive session has ended by transmitting an end notification thereto. Note that the state between the end of one interactive session and the start of another interactive session will be referred to as a standby mode. The audio control apparatus 100 is always in standby mode until receiving an operation start notification from the operation-start detecting unit 607. The display unit 606 does not illuminate the LED 312 in the standby mode.

(Functional Configuration of Audio-Data Conversion Control Program of Server)

Figure 7A:
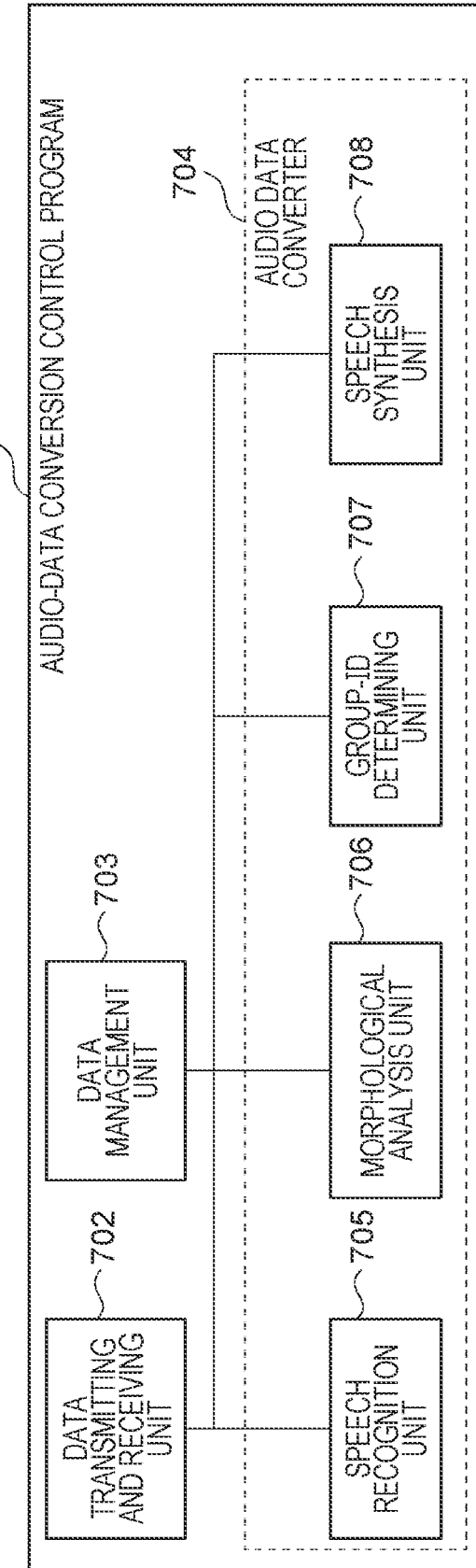
FIG. 7A is a conceptual diagram illustrating a functional configuration of a control program of the server.

FIG. 7A is a block diagram illustrating a functional configuration of an audio-data conversion control program 701 of the server 102, executed by the CPU 402. FIG. 7B shows examples of group ID lists used by a group-ID determining unit 707 to determine a group ID. In the group ID lists, words having the same meaning or intention in relation to user's operations on the image forming apparatus 101 are grouped under the same ID. The words listed here are results of speech recognition of words spoken to the audio control apparatus 100 by the user 106.

The audio-data conversion control program 701 of the server 102 is stored in the external storage device 405 as described above. At startup, the CPU 402 develops the audio-data conversion control program 701 in the RAM 403 and executes it.

A data transmitting and receiving unit 702 transmits and receives data to and from other devices on the network 104 via the network I/F 406 in accordance with the TCP/IP. The data transmitting and receiving unit 702 receives audio data representing speech of the user 106 from the audio control apparatus 100. The data transmitting and receiving unit 702 transmits the result of group ID determination made by the group-ID determining unit 707 (described below).

A data management unit 703 stores various types of data in a predetermined region of the external storage device 405 and manages the stored data. The various types of data include work data generated during execution of the audio-data conversion control program 701, and parameters necessary for an audio data converter 704 to perform speech recognition processing. Specifically, for example, the data management unit 703 stores, in a predetermined region of the external storage device 405, acoustic and language models for a speech recognition unit 705 to convert the audio data received by the data transmitting and receiving unit 702 into text, and manages the stored models. Also, for example, the data management unit 703 stores, in a predetermined region of the external storage device 405, dictionaries for a morphological analysis unit 706 to perform morphological analysis on text, and manages the stored dictionaries. Also, for example, the data management unit 703 stores, in a predetermined region of the external storage device 405, group ID lists for the group-ID determining unit 707 to determine group IDs, and manages the stored group ID lists. Also, for example, the data management unit 703 stores, in a predetermined region of the external storage device 405, a speech database for a speech synthesis unit 708 to perform speech synthesis, and manages the stored speech database. The data management unit 703 also stores and manages device information required for communicating with the audio control apparatus 100 and the image forming apparatus 101.

The audio data converter 704 includes the speech recognition unit 705, the morphological analysis unit 706, the group-ID determining unit 707, and the speech synthesis unit 708. The audio data converter 704 will now be described.

The speech recognition unit 705 performs speech recognition processing to convert audio data representing speech of the user 106, received by the data transmitting and receiving unit 702, into text. The speech recognition processing involves converting the audio data of speech of the user 106 into phonemes using an acoustic model, and further converting the phonemes into actual text data using a language model. In the present embodiment, the text data is composed of "katakana" text containing one or more katakana characters (one type of kana or Japanese phonetic symbols), and "kana/kanji" text obtained by kana-kanji conversion of the katakana text and containing a mixture of hiragana characters (the other type of kana), katakana characters, and kanji characters (non-phonetic characters). The kana/kanji text also contains numbers, alphabetical letters, and signs. A different technique may be used to perform speech recognition processing that converts the audio data into text data, and the technique is not limited to that described above. The speech recognition processing will not be described further, as its details are beyond the scope here.

The morphological analysis unit 706 performs morphological analysis on the text data obtained through conversion by the speech recognition unit 705. The morphological analysis involves extracting morpheme sequences from a dictionary having information about the grammar and parts of speech of the language, and determining the part of speech of each morpheme. The morphological analysis unit 706 can be implemented by known software, such as JUMAN, ChaSen, or MeCab, designed for morphological analysis. The morphological analysis unit 706 analyzes the text data obtained through conversion by the speech recognition unit 705, into a morpheme sequence. For example, text data "Kopi-o-shi-tai (I want to make a copy)" is analyzed into a morpheme sequence "kopi", "o", "shi", and "tai", and text data "Esan-kara-eyon-e (From A3 to A4)" is analyzed into a morpheme sequence "esan", "kara", "eyon", and "e".

The group-ID determining unit 707 compares the result of morphological analysis made by the morphological analysis unit 706 to the group ID lists shown in FIG. 7B to determine a group ID and generates the result of group ID determination (hereinafter referred to as "group-ID determination result"). For example, the group-ID determining unit 707 determines that the morpheme sequence "kopi", "o", "shi", and "tai" matches the group ID "FNC00001" for "kopi (copy)" and generates {ID: FNC00001} as the group-ID determination result. Also, the group-ID determining unit 707 determines that the morpheme sequence "esan", "kara", "eyon", and "e" matches two group IDs "PAP00100" and "PAP00101" for "esan (A3)" and "eyon (A4)", respectively, and generates {ID: PAP00100, ID: PAP00101} as the group-ID determination result.

When the group-ID determination result includes a plurality of IDs, they are generated in the order they have been subjected to speech recognition and morphological analysis. For example, when the result of speech recognition and morphological analysis is the morpheme sequence "eyon (A4)", "kara", "esan (A3)", and "e", then {ID: PAP00101, ID: PAP00100} is generated as the group-ID determination result. A combination of adjacent morphemes may be compared to the group ID lists for the determination. In this case, if a match is found for one morpheme in any group ID list and a match is also found for a combination of morphemes including the one morpheme in any group ID list, then the latter result is used to generate a group-ID determination result. For example, if the morpheme sequence is "A" and "4", then {ID: PAP00101} corresponding to "A4" is generated as the group-ID determination result, instead of {ID: CHR00000, ID: NUM00004} corresponding to "A" and "4". Also, katakana text composed of one or more katakana characters included in a result of speech recognition and morphological analysis, and kana/kanji text converted from the katakana text, may be combined and compared to the group ID lists. For example, the group-ID determining unit 707 first compares the kana/kanji text to the text in the column labeled as "kana/kanji" of the group ID lists. Then, if no corresponding group ID is found, the group-ID determining unit 707 compares the katakana text to the text in the column labeled as "katakana" of the group ID lists to detect the corresponding group ID. If there is an overlap in "katakana" and a plurality of corresponding group IDs are found in the group ID lists, a plurality of group-ID determination results may be generated as candidates. A group-ID determination result is thus generated, which accommodates errors in kana-kanji conversion and variations in furigana (or reading aid indicating pronunciation) attached to kanji characters.

The speech synthesis unit 708 performs speech synthesis on the basis of a notification received from the image forming apparatus 101. In the speech synthesis, text prepared in advance to be paired with a predetermined notification is converted to audio data of a predetermined format, such as MP3. Exemplary combinations of received notification data and text to be synthesized into speech will be described later on below with reference to the sequence diagram of FIGS. 9A to 9C. The speech synthesis generates, for example, audio data on the basis of the speech database stored in the data management unit 703. The speech database is, for example, a collection of spoken words with fixed contents. Although speech synthesis is performed using a speech database in the present embodiment, a different technique may be used for speech synthesis. The speech synthesis technique is not limited to that using a speech database. The speech synthesis will not be described further, as its details are beyond the scope here.

(Functional Configuration of Device Control Program of Image Forming Apparatus)

Figure 8:
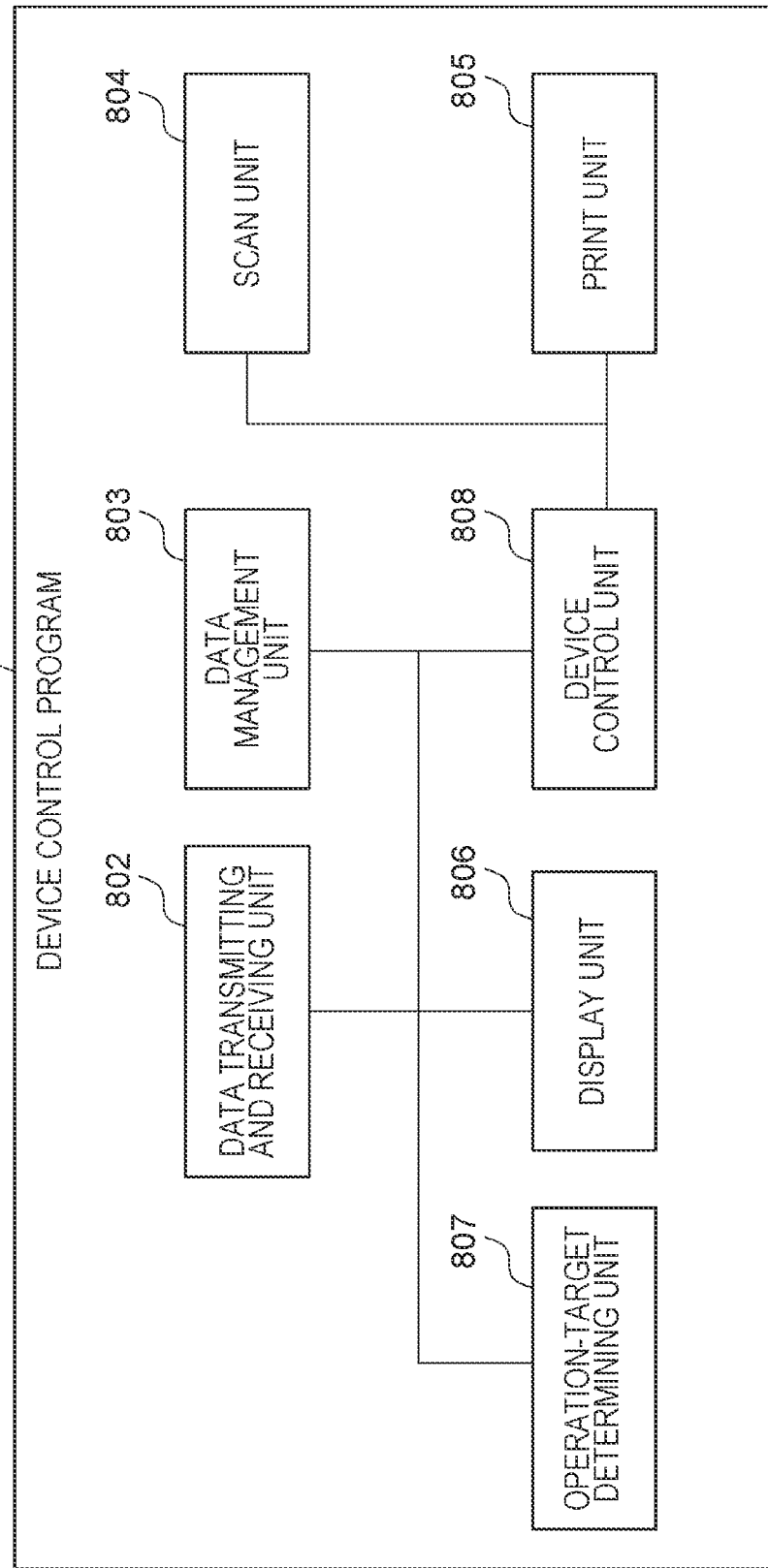
FIG. 8 is a conceptual diagram illustrating a functional configuration of a control program of the image forming apparatus.

FIG. 8 is a block diagram illustrating a functional configuration of a device control program 801 of the image forming apparatus 101, executed by the CPU 502.

The device control program 801 of the image forming apparatus 101 is stored in the external storage device 505 as described above. At startup, the CPU 502 develops the device control program 801 in the RAM 503 and executes it.

A data transmitting and receiving unit 802 transmits and receives data to and from other devices on the network 104 via the network I/F 506 in accordance with the TCP/IP. The data transmitting and receiving unit 802 receives a group-ID determination result generated by the group-ID determining unit 707. The data transmitting and receiving unit 802 transmits, from the image forming apparatus 101 to the server 102, a screen update notification indicating that information displayed on the screen of the LCD touch panel 200 of the operation panel 509 has been updated, and a job state notification indicating the execution state of the job. The details of the notifications will be described later on below with reference to the sequence diagram of FIGS. 9A, 9B, and 9C.

A data management unit 803 stores various types of data in predetermined regions of the RAM 503 and the external storage device 505 and manages the stored data. The various types of data include work data generated during execution of the device control program 801, and setting parameters necessary for controlling each device. Specifically, for example, the data management unit 803 manages job data including combinations of setting items and set values of jobs executed by a device control unit 808 (described below), and also manages machine setting information defining sheet attribute information. Also, the data management unit 803 stores and manages authentication information required for communicating with the gateway 105, and device information required for communicating with the server 102. The data management unit 803 also stores and manages image data used by the image forming apparatus 101 to form images. Also, the data management unit 803 stores screen control information used by a display unit 806 for screen display control, and operation-target determination information used by an operation-target determining unit 807 to determine an operation target. The data management unit 803 manages the screen control information and the operation-target determination information for each screen displayed by the display unit 806.

A scan unit 804 causes the scanner 515 to execute scanning via the scan controller 514 on the basis of scan job parameter settings for the device control unit 808 (described below). The scan unit 804 stores the read image data in the data management unit 803.

A print unit 805 causes the print engine 513 to execute printing via the print controller 512 on the basis of print job parameter settings for the device control unit 808 (described below).

The display unit 806 controls the operation panel 509 via the display controller 507 and displays user operable user interface (UI) components (e.g., buttons, pull-down lists, and checkboxes) on the LCD touch panel 200 on the basis of the screen control information described above. Also, the display unit 806 acquires the coordinates of a touched point of the LCD touch panel 200 (hereinafter referred to as "screen") via the operation I/F 508, and determines the UI component or icon (operation target) and processing to be performed upon accepting the operation. Also, the display unit 806 detects the press of the hardware keys 201 to 210 on the operation panel 509. In accordance with the results described above, the display unit 806 updates the information displayed on the screen, or transmits job parameters set by the user's operation and an instruction to start the job to the device control unit 808. In accordance with the result of operation target determination made by the operation-target determining unit 807 (described below), the display unit 806 similarly updates the information displayed on the screen, or transmits job parameters set by the user's operation and an instruction to start the job to the device control unit 808.

On the basis of the group-ID determination result received by the data transmitting and receiving unit 802, the operation-target determining unit 807 determines one of the user operable UI components of the screen displayed on the operation panel 509 or the hardware keys 201 to 210 of the operation panel 509 as an operation target. The operation-target determining unit 807 will be described in detail later on below with reference to FIGS. 11A and 11B.

The device control unit 808 controls and gives instructions to the print engine 513 and the scanner 515 via the print controller 512 and the scan controller 514. For example, when the display unit 806 detects a press of the start key 207 during display of a copy function screen, the device control unit 808 receives parameters for a copy job and a job start instruction from the display unit 806. Then, on the basis of the job parameters, the device control unit 808 performs control such that image data read by the scanner 515 is printed on a sheet by the print engine 513. The mechanism of scan and print control will not be described further, as it is beyond the scope here.

(System Control Sequence)

Figure 9A:
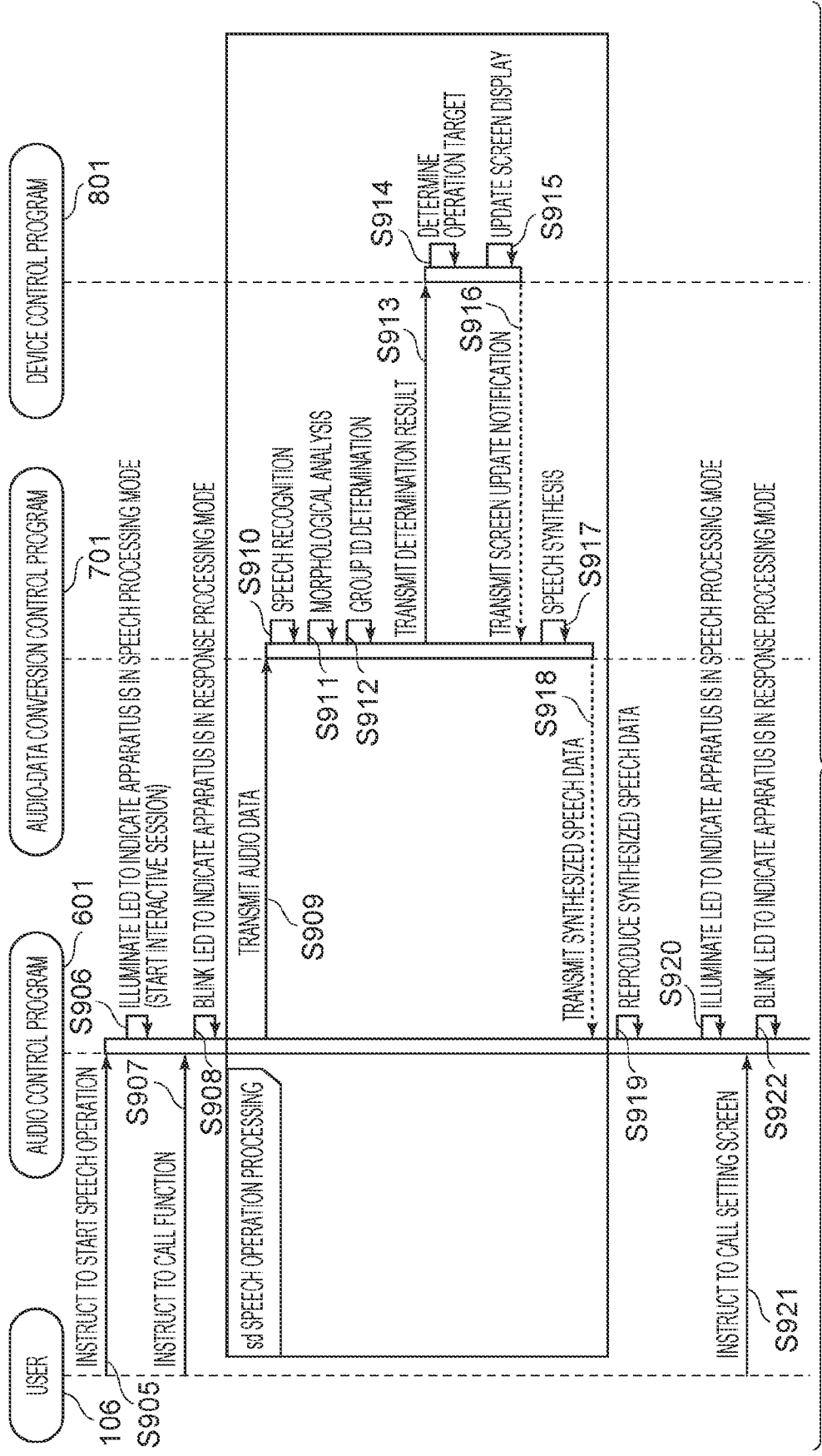
Figure 9C:
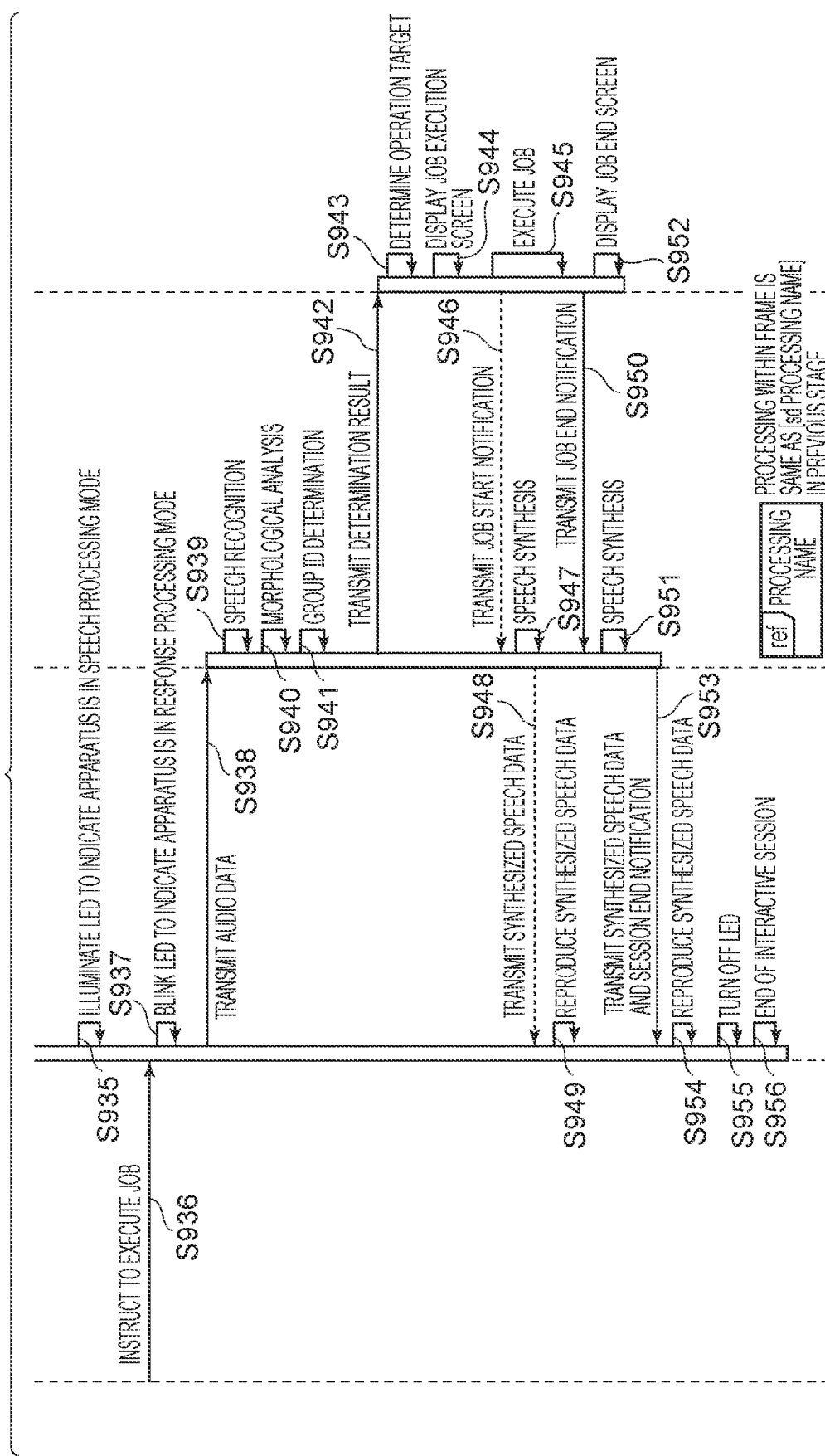

FIGS. 9A to 9C present a sequence diagram illustrating interactions between the apparatuses included in the image forming system illustrated in FIG. 1 and also between the control programs of the apparatuses illustrated in FIGS. 6 to 8. FIGS. 9A to 9C particularly illustrate a sequence in which, after the audio control apparatus 100 receives a speech operation based on voice of the user 106, the image forming apparatus 101 executes the corresponding processing and returns an audio response representing a result of the execution to the user 106. The sequence example illustrated in FIGS. 9A to 9C assumes that the audio control apparatus 100, the image forming apparatus 101, and the server 102 are all ready to communicate with each other. This sequence example also assumes that after startup (e.g., after the power is turned on), the image forming apparatus 101 displays a main menu screen which allows the user 106 to call a function, such as copying, scanning, or printing.

First, in step S905 (hereinafter referred to as S905 and so on), the user 106 instructs the audio control apparatus 100 to start a speech operation. The instruction to start the speech operation is sent when the user 106 says a wake word or presses the operation start key of the audio control apparatus 100. The instruction to start the speech operation is detected by the operation-start detecting unit 607.

When the instruction to start the speech operation is detected, the display unit 606 of the audio control program 601 illuminates the LED 312 in S906 to indicate that the audio control apparatus 100 is in the speech processing mode. At the same time, the speech acquiring unit 604 starts to perform processing.

In S907, the user 106 instructs the audio control apparatus 100 to call a function. This function calling instruction is sent when the user 106 speaks, for example, "I want to make a copy" or "Display the copy screen" after saying a wake word in S905. From the speech acquired by the speech acquiring unit 604, audio data is generated. After the elapse of a predetermined blank period, the speech-end determining unit 608 determines that the speech has ended.

In response to the speech-end determination, the display unit 606 of the audio control program 601 blinks the LED 312 in S908 to indicate that the audio control apparatus 100 is in the response processing mode. At the same time, the speech acquiring unit 604 ends its processing.

After the audio data representing the function calling instruction received in S907 is generated, the data transmitting and receiving unit 602 transmits the generated audio data to the server 102 in S909.

In S910, the speech recognition unit 705 of the audio-data conversion control program 701 performs speech recognition on the audio data received by the data transmitting and receiving unit 702. By the speech recognition, for example, text is generated from the speech "Kopi-shi-tai (I want to make a copy)" spoken by the user 106.

In S911, the morphological analysis unit 706 of the audio-data conversion control program 701 performs morphological analysis on the text generated in S910. By morphological analysis, for example, the text "Kopi-shi-tai" is analyzed into a morpheme sequence "kopi", "shi", and "tai".

In S912, the group-ID determining unit 707 of the audio-data conversion control program 701 performs group ID determination on the text analyzed into a morpheme sequence. By the group ID determination, for example, the morpheme sequence "kopi", "shi", and "tai" is compared to the group ID lists shown in FIG. 7B, and {ID: FNC00001} is generated as the group-ID determination result.

In S913, the data transmitting and receiving unit 702 of the audio-data conversion control program 701 transmits the group-ID determination result obtained in S912 to the image forming apparatus 101.

In S914, the operation-target determining unit 807 of the device control program 801 preforms operation target determination on the group-ID determination result received by the data transmitting and receiving unit 802. For example, from the group-ID determination result {ID: FNC00001}, the operation-target determining unit 807 determines that the "Copy" button in the main menu screen has been selected.

In S915, in accordance with the determination made in S914, the display unit 806 updates the information displayed on the screen. For example, on the basis of the processing described above, if it is determined, from the speech "Kopi-shi-tai" spoken by the user 106, that the target of the operation is the "Copy" button displayed on the screen, the display unit 806 displays the copy function screen in the same manner as when the "Copy" button is touched on the LCD touch panel 200.

In S916, the data transmitting and receiving unit 802 transmits, to the server 102, a screen update notification indicating that information displayed on the screen has been updated. For example, when the display unit 806 switches the display from the main menu screen to the copy function screen, the data transmitting and receiving unit 802 transmits text data "copy function screen displayed" as a screen update notification.

In S917, the speech synthesis unit 708 of the audio-data conversion control program 701 performs speech synthesis on the screen update notification received by the data transmitting and receiving unit 702. Specifically, the speech synthesis unit 708 synthesizes speech from predetermined text data corresponding to the screen update notification. For example, if the screen update notification is "copy function screen displayed", the speech synthesis unit 708 synthesizes the speech "Copy screen has been displayed" from the corresponding text data.

In S918, the audio data (synthesized speech data) generated through speech synthesis in S917 by the speech synthesis unit 708 is transmitted by the data transmitting and receiving unit 702 to the audio control apparatus 100. The synthesized speech data is received by the data transmitting and receiving unit 602 of the audio control program 601.

In S919, the audio reproducing unit 605 reproduces the synthesized speech data received in S918. For example, the synthesized speech data "Copy screen has been displayed" generated in S917 is reproduced through the speaker 310.

In S920, after the synthesized speech data is reproduced, the display unit 606 of the audio control program 601 illuminates the LED 312 again to indicate that the audio control apparatus 100 is in the speech processing mode. At the same time, the speech acquiring unit 604 starts processing again.

In S921, the user 106 instructs the audio control apparatus 100 to call a setting screen. The instruction to call a setting screen is sent when the user 106 speaks, for example, "Yoshi-o-sentaku (Select paper)". From the speech acquired by the speech acquiring unit 604, audio data is generated. When a predetermined blank period elapses after the speech of the user 106, the speech-end determining unit 608 determines that the speech has ended.

In S922, the same operation as that in S908 is performed.

In S923, the speech operation processing similar to that performed in S909 to S918 is performed. The difference is that in S923, the display unit 806 updates the screen in accordance with the instruction (sent in S921) to call a setting screen. For example, when the group-ID determination result {ID: PAP00000, ID: OPR00040} is obtained during display of the copy function screen, the display unit 806 displays a paper selection screen.

In S924, the audio reproducing unit 605 reproduces the synthesized speech data generated by speech synthesis in S923. For example, when the paper selection screen is displayed as a setting screen in S923, the audio reproducing unit 605 reproduces the synthesized speech data "Paper selection screen has been displayed. Please select the paper" through the speaker 310.

In S925, the same operation as that in S920 is performed.

In S926, the user 106 instructs the audio control apparatus 100 to change the setting. The setting change instruction is sent when the user 106 speaks, for example, "Eyon (A4)". When a predetermined blank period elapses after the speech of the user 106, the speech-end determining unit 608 determines that the speech has ended.

In S927, the same operation as that in S908 is performed.

In S928, the speech operation processing similar to that performed in S909 to S918 is performed. The difference is that in S928, the display unit 806 changes a set value displayed on the setting screen (i.e., the display unit 806 executes processing that accepts an instruction to change a set value) in accordance with the instruction (sent in S926) to change the setting. For example, when the group-ID determination result {ID: PAP00101} is obtained during display of the paper selection screen, the display unit 806 updates the displayed paper selection screen by changing the set value specifying the paper type to A4.

In S929, the audio reproducing unit 605 reproduces the synthesized speech data generated by speech synthesis in S928. For example, when the set value specifying the paper type is changed and displayed in S928, the audio reproducing unit 605 reproduces the synthesized speech data "A4 paper has been selected" through the speaker 310.

In S930, the same operation as that in S920 is performed.

In S931, the user 106 instructs the audio control apparatus 100 to determine the setting.

In S932, the same operation as that in S908 is performed.

In S933, the speech operation processing similar to that performed in S909 to S918 is performed.

In S934, the audio reproducing unit 605 reproduces the synthesized speech data generated by speech synthesis in S933.

In S935, the same operation as that in S920 is performed.

In S936, the user 106 instructs the audio control apparatus 100 to execute a job. The job execution instruction is sent when the user 106 speaks, for example, "Kopi-sutato (Start copying)". When a predetermined blank period elapses after the speech of the user 106, the speech-end determining unit 608 determines that the speech has ended.

The processing in S937 to S942 is similar to that performed in S908 to S913.

In S943, the operation-target determining unit 807 of the device control program 801 preforms operation target determination on the group-ID determination result received by the data transmitting and receiving unit 802. If the group-ID determination result is {ID: FNC00001, ID: OPR00011}, the operation-target determining unit 807 determines that the "Copy Start" button displayed on the screen or the start key 207, which is a hardware key, has been operated.

In S944, the display unit 806 displays the job execution screen in accordance with the determination made in S943. For example, if the operation-target determining unit 807 determines, on the basis of the processing performed so far, that the speech "Kopi-sutato (Start copying)" spoken by the user 106 is an operation on the start key 207, the display unit 806 displays a copy job start screen.

In S945, a job is executed in accordance with job parameters set on the screen of the image forming apparatus 101.

In S946, the data transmitting and receiving unit 802 transmits a job state notification to the server 102. Specifically, the data transmitting and receiving unit 802 transmits information (job start notification) indicating that job execution has started. For example, when a copy job has started, the text data "copy job started" is transmitted as a job state notification to the server 102.

In S947, the data transmitting and receiving unit 702 of the audio-data conversion control program 701 receives the job state notification, and the speech synthesis unit 708 synthesizes speech from predetermined text data corresponding to the job state notification (job start notification) received. For example, if the job state notification is "copy job started", the speech synthesis unit 708 synthesizes the speech "Copying will start" from the corresponding text data.

In S948, the same operation as that in S918 is performed.

In S949, the audio reproducing unit 605 reproduces the synthesized speech data received in S948. For example, the synthesized speech data "Copying will start" generated in S947 is reproduced through the speaker 310.

In S950, the data transmitting and receiving unit 802 transmits a job state notification to the server 102. Specifically, the data transmitting and receiving unit 802 transmits information (job end notification) indicating that job execution has ended. For example, when the copy job has ended, the text data "copy job completed" is transmitted as a job state notification to the server 102.

In S951, the data transmitting and receiving unit 702 of the audio-data conversion control program 701 receives the job state notification, and the speech synthesis unit 708 synthesizes speech from predetermined text data corresponding to the job state notification (job end notification) received. For example, if the job state notification is "copy job completed", the speech synthesis unit 708 synthesizes the speech "Copying has been completed" from the corresponding text data.

In S952, in response to completion of the job executed in S945, the display unit 806 displays a job end screen. For example, when execution of a copy job ends, the display unit 806 displays a copy job end screen.

In S953, the data transmitting and receiving unit 602 receives, from the server 102, the synthesized speech data generated in S951. The data transmitting and receiving unit 602 also receives, from the server 102, a session end notification notifying the audio control apparatus 100 that the interactive session with the user 106 is to be completed.

In S954, the audio reproducing unit 605 reproduces the synthesized speech data received in S953. For example, the synthesized speech data "Copying has been completed" generated in S951 is reproduced through the speaker 310.

In S955, in response to receiving the session end notification in S953, the display unit 606 of the audio control program 601 turns off the LED 312 to indicate that the audio control apparatus 100 is in standby mode.

In S956, in response to receiving the session end notification in S953, the audio control apparatus 100 is brought into standby mode.

Even when the sequence diagram shows that the LED 312 is blinking to indicate that the audio control apparatus 100 is in the response processing mode, the audio control apparatus 100 is ready to receive input of a wake word. Therefore, after speaking a wake word, the user 106 may say "Cancel" or "Stop" to forcibly terminate the interactive session.

(Processing Flow of Device Control Program of Image Forming Apparatus)

FIG. 10 is a flowchart illustrating overall processing of the device control program 801 of the image forming apparatus 101. FIG. 10 particularly illustrates a processing flow of the device control program 801 corresponding to S914, S915, S923, S928, S933, and S943 to S952 in the sequence diagram of FIGS. 9A to 9C.

Figure 12A:
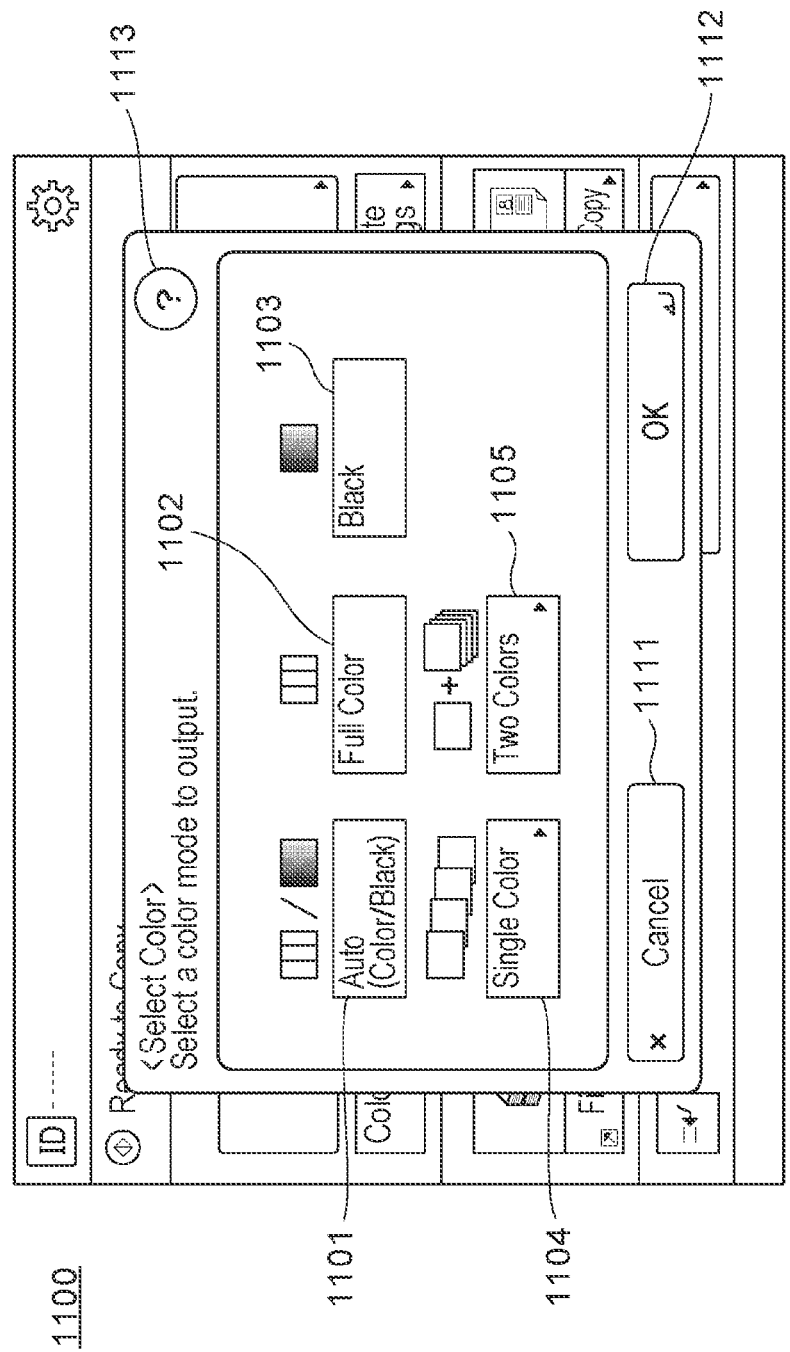
FIG. 12A illustrates in English a screen displayed by the control program of the image forming apparatus.
Figure 13A:
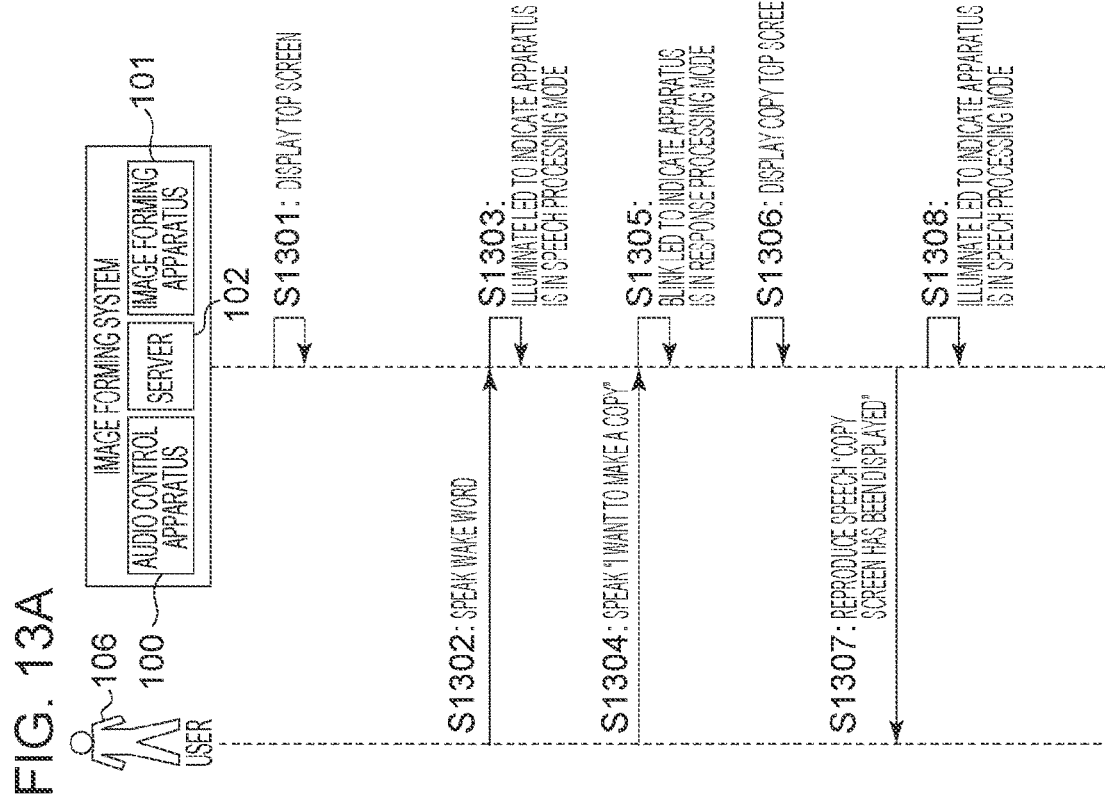
Figure 13B:
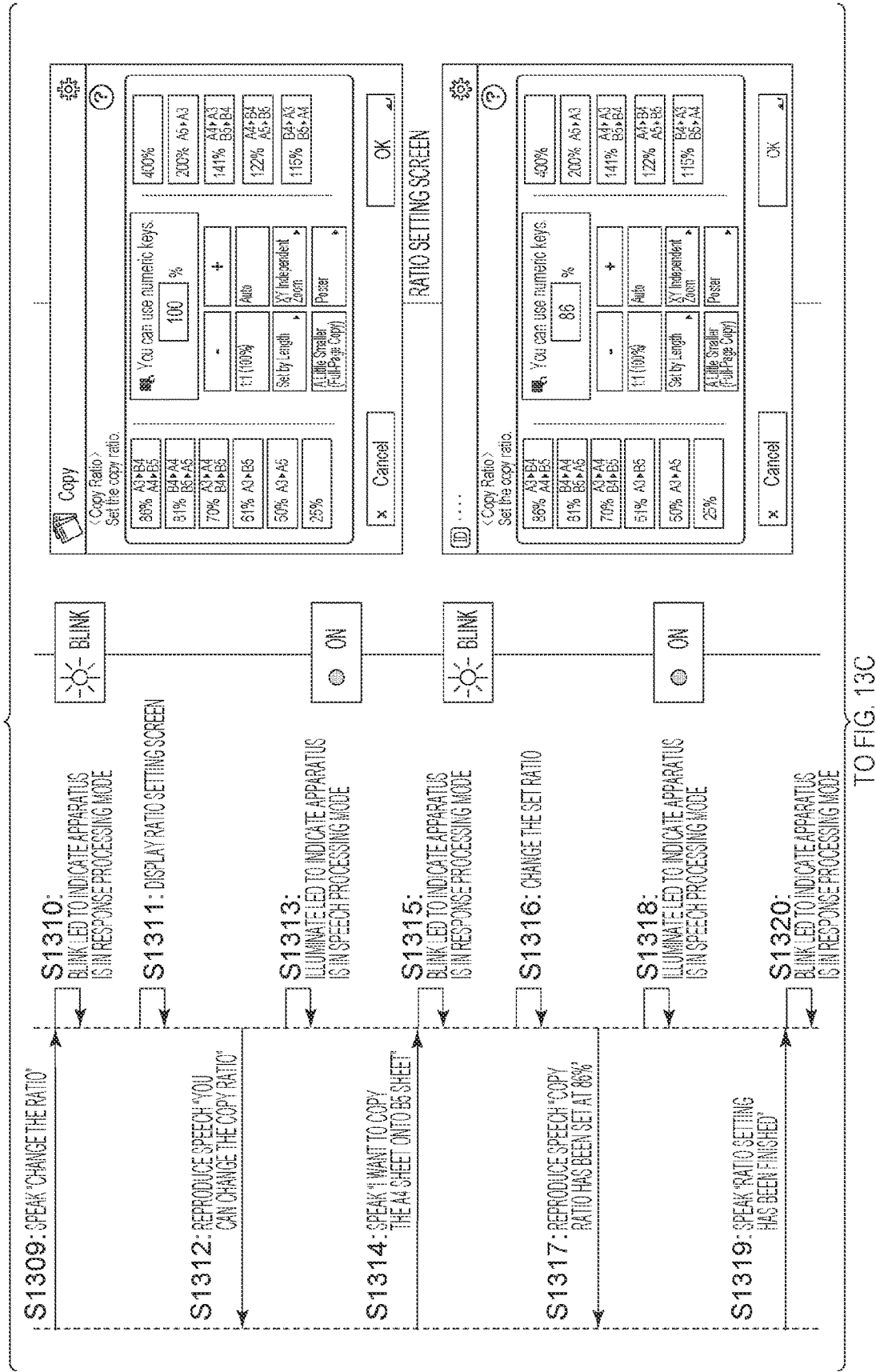
Figure 13C:
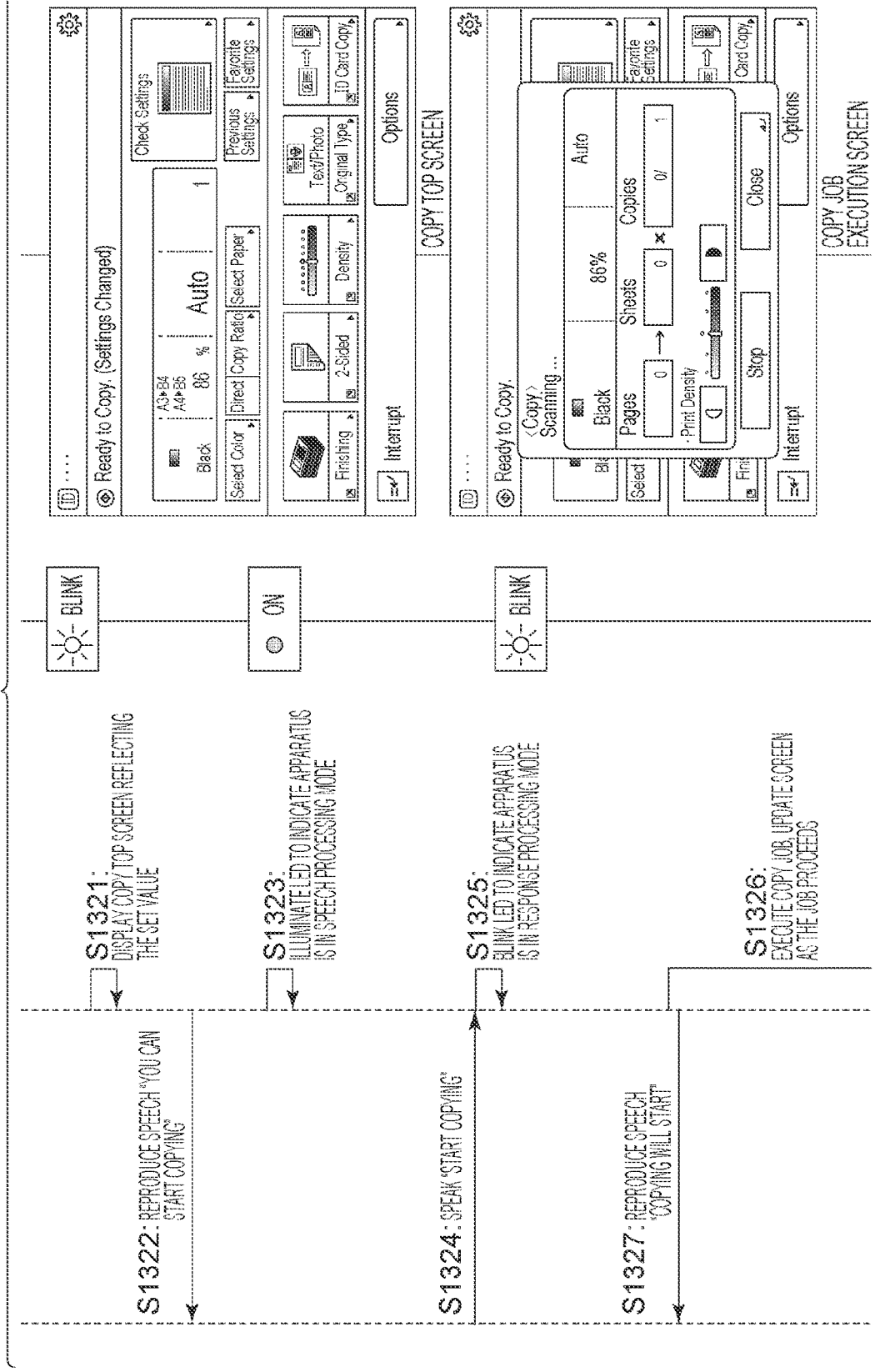

The processing flow illustrated in FIG. 10 will now be described in detail with reference to FIGS. 11A and 11B and FIGS. 12A to 12C. FIGS. 11A and 11B show other examples of group ID lists added to the group ID lists shown in FIG. 7B. FIG. 12A illustrates in English a screen displayed by the display unit 806. FIG. 12D illustrates in Japanese a screen displayed by the display unit 806. FIG. 12D corresponds to FIG. 12A, FIG. 12B illustrates an example of screen control information corresponding to the screen illustrated in FIG. 12A. The screen control information in FIG. 12B includes a list of user operable UI components (e.g., buttons 1101 to 1105 and 1111 to 1113) included in the screen, and actions (screen control, internal processing) carried out when a user operation is performed on the UI components. FIG. 12C illustrates an example of operation-target determination information corresponding to the screen illustrated in FIG. 12A. In the operation-target determination information, each of the user operable UI components is associated in advance with at least one group-ID determination result. That is, FIG. 12C shows a table representing screen configuration information. In the table shown in FIG. 12C, "example of user speech during operation" and "operation on operation panel" are added as a reference for the following description and do not necessarily need to be included in the operation-target determination information managed by the data management unit 803. These examples shown in FIG. 12C are suitable examples of speech operations performed by the user who viewed the screen (FIG. 12D) displayed in Japanese.

In S1001, the data transmitting and receiving unit 802 receives a group-ID determination result generated by the group-ID determining unit 707.

In S1002, the device control program 801 acquires the screen control information corresponding to the screen displayed by the display unit 806 and the operation-target determination information used by the operation-target determining unit 807 to determine an operation target. For example, when the display unit 806 displays a color setting screen 1100 (see FIG. 12A) for the copy function, the device control program 801 acquires the screen control information (see FIG. 12B) corresponding to the color setting screen 1100 and also acquires the operation-target determination information (see FIG. 12C).

In S1003, the operation-target determining unit 807 performs operation target determination using the group-ID determination result received in S1001 and the operation-target determination information acquired in S1002. This operation target determination determines one of the user operable UI components included in the screen displayed on the operation panel 509, or the hardware keys 201 to 210 included in the operation panel 509, as an operation target. For example, from the speech "Jido (automatic or auto)" spoken by the user 106, a group-ID determination result {DGR00008} determined by the group-ID determining unit 707 is transmitted. Then, the "Auto (Color/Black)" button 1101 matching the group-ID determination result received in S1001 by the data transmitting and receiving unit 802 is determined as an operation target. When speech "Jido, kara, shirokuro (auto, color, black and white)" is detected, the "Auto (Color/Black)" button 1101 is also determined as an operation target. Thus, a plurality of speech patterns can be associated with each item.

In S1004, the display unit 806 updates the information displayed on the screen on the basis of the result of the operation target determination made in S1003 and the screen control information acquired in S1002. For example, if the "Auto (Color/Black)" button 1101 is determined as an operation target in S1003, the display unit 806 updates the screen to highlight the "Auto (Color/Black)" button 1101 in accordance with the screen control information shown in FIG. 12B. FIG. 12C shows that touching the "Auto (Color/Black)" button 1101 displayed on the LCD touch panel 200 of the operation panel 509 can also highlight this button.

In S1005, on the basis of the result of the operation target determination made in S1003 and the screen control information acquired in S1002, the device control program 801 determines whether the job is to be executed. If the job is to be executed, the process proceeds to S1007 and otherwise, to S1006. For example, if the "Auto (Color/Black)" button 1101 is determined as the operation target in S1003, the job is determined not to be executed because no internal processing is shown in FIG. 12B. For example, if the start key 207 is determined as the operation target in S1003, the job is determined to be executed because FIG. 12B shows "start execution of copy job" as internal processing.

In S1006, the data transmitting and receiving unit 802 transmits the screen update notification to the server 102 as in S916 described above.

In S1007, the job is executed on the basis of set job parameters. Specifically, the image forming apparatus 101 executes a series of image forming operations (e.g., copying, scanning, or printing). For example, when a copy job is to be started while the "Auto (Color/Black)" button 1101 on the screen illustrated in FIG. 12A is being highlighted, the copy job is executed by using set values for the "Auto (Color/Black)" button 1101 as job parameters.

In S1008, the data transmitting and receiving unit 802 transmits a job state notification to the server 102, as in S946 and S950 described above.

FIGS. 13A, 13B, 13C, and 13D present a schematic diagram for specifically describing the exemplary interactions between the speech operation of the user 106 and the response of the image forming system, illustrated in the sequence diagram of FIGS. 9A to 9C. FIGS. 13A, 13B, 13C, and 13D show speech examples, which are speech operations of the user 106, and the corresponding LED statuses, each presented by the image forming system to indicate the audio processing mode of the audio control apparatus 100. FIGS. 13A, 13B, 13C, and 13D also illustrate correspondences between, and flows of, the screens displayed on the operation panel 509 of the image forming apparatus 101 and the audio responses reproduced by the audio control apparatus 100.

First, the image forming system displays the top screen on the operation panel 509 (S1301). The LED 312 is off and this indicates that the audio control apparatus 100 is in standby mode. If the user 106 speaks a wake word at this point (S1302), the image forming system starts to accept a speech operation and illuminates the LED 312 to indicate that the audio control apparatus 100 is in speech processing mode (S1303). Note that S1302 and S1303 are presented as examples of S905 and S906, respectively, in the sequence diagram of FIGS. 9A to 9C. When the user 106 says "I want to make a copy" (S1304) after the wake word, the image forming system blinks the LED 312 to indicate that the audio control apparatus 100 is in response processing mode (S1305) and displays the copy top screen (S1306). Then, the image forming system reproduces "Copy screen has been displayed" as an audio response (S1307) and illuminates the LED 312 again to prompt the user 106 to speak (S1308). Note that S1304, S1305, S1306, S1307, and S1308 are presented as examples of S907, S908, S915, S919, and S920, respectively, in the sequence diagram of FIGS. 9A to 9C.

When the user 106 speaks "Change the ratio" (S1309), the image forming system blinks the LED 312 (S1310) and displays a ratio setting screen (S1311). Then, the image forming system reproduces "You can change the copy ratio" as an audio response (S1312) and illuminates the LED 312 (S1313). Note that S1309, S1310, S1311, S1312, and S1313 are presented as examples of S921, S922, S915, S924, and S925, respectively, in the sequence diagram of FIGS. 9A to 9C.

When the user 106 speaks "I want to copy the A4 sheet onto B5 sheet" (S1314), the image forming system blinks the LED 312 (S1315) and updates the screen to reflect the change in set ratio (S1316). Then, the image forming system reproduces "Copy ratio has been set at 86%" as an audio response (S1317) and illuminates the LED 312 (S1318). Note that S1314, S1315, S1316, S1317, and S1318 are presented as examples of S926, S927, S915, S929, and S925, respectively, in the sequence diagram of FIGS. 9A to 9C.

When the user 106 speaks "Ratio setting has been finished" (S1319), the image forming system blinks the LED 312 (S1320) and displays the copy top screen reflecting the change in set ratio (S1321). Then, the image forming system reproduces an audio response "You can start copying" (S1322) and illuminates the LED 312 (S1323). Note that S1319, S1320, S1321, S1322, and S1323 are presented as examples of S931, S932, S915, S934, and S935, respectively, in the sequence diagram of FIGS. 9A to 9C.

When the user 106 speaks "Start copying" (S1324), the image forming system blinks the LED 312 (S1325) and starts to execute the copy job. Upon starting the copy job, the image forming system displays a screen indicating that the copy job is in progress (S1326) and reproduces an initial audio response "Copying will start" (S1327). Upon completion of the copy job, the image forming system displays, for a certain length of time, a screen indicating that the copy job has been completed, reproduces a final audio response "Copying has been completed" (S1328), and turns off the LED 312 to indicate that the audio control apparatus 100 has stopped accepting speech (S1329). Note that S1324, S1325, S1326, S1327, S1328, and S1329 are presented as examples of S936, S937, S944, S949, S954, and S955, respectively, in the sequence diagram of FIGS. 9A to 9C.

FIGS. 14A, 14B, 15A, 15B, 15C, 15D, 16A, 16B, 16C, 17A, 17B, 18A, 18B, 19A, 19B, 19C, 20A, 20B, 20C, 20D, 21A, 21B, 21C, 22A, 22B, 23A, 23B, 24, 25A, and 25B show other examples of the group ID lists shown in FIG. 7B. These group ID lists are used to operate any of the screens provided by the image forming apparatus 101.

FIGS. 26A, 26B, 26C, 26D, 26E, 26F, 26G, and 26H and FIGS. 27A, 27B, and 27C present other examples of the screen, screen control information, and operation-target determination information illustrated in FIGS. 12A to 12C. The information presented in these drawings is used for operation of screens that can be operated on the image forming apparatus 101 and are different from the screen illustrated in FIG. 12A.

Figure 26A:
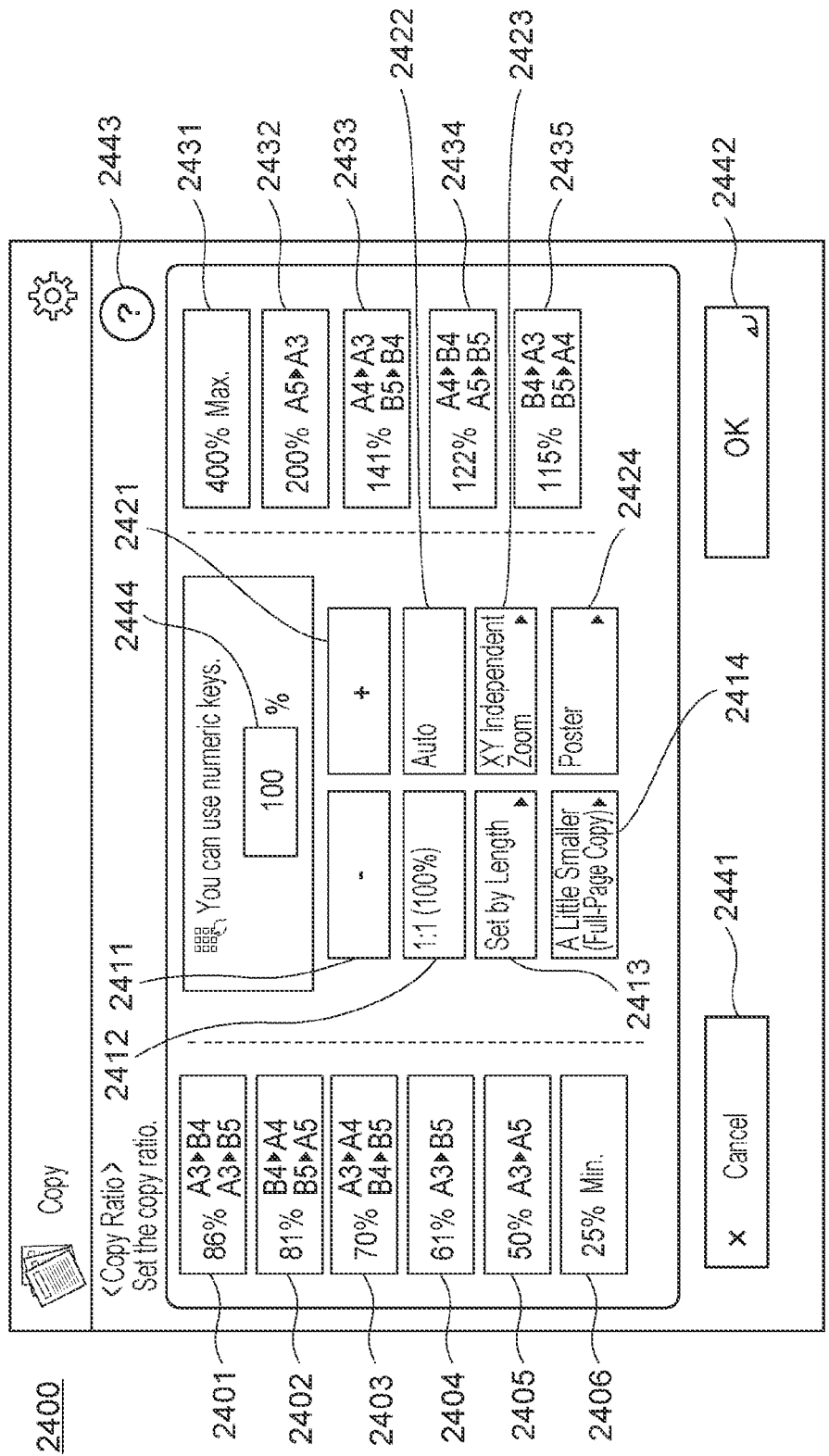
FIG. 26A illustrates in English another screen displayed by the control program of the image forming apparatus.
Figure 27A:
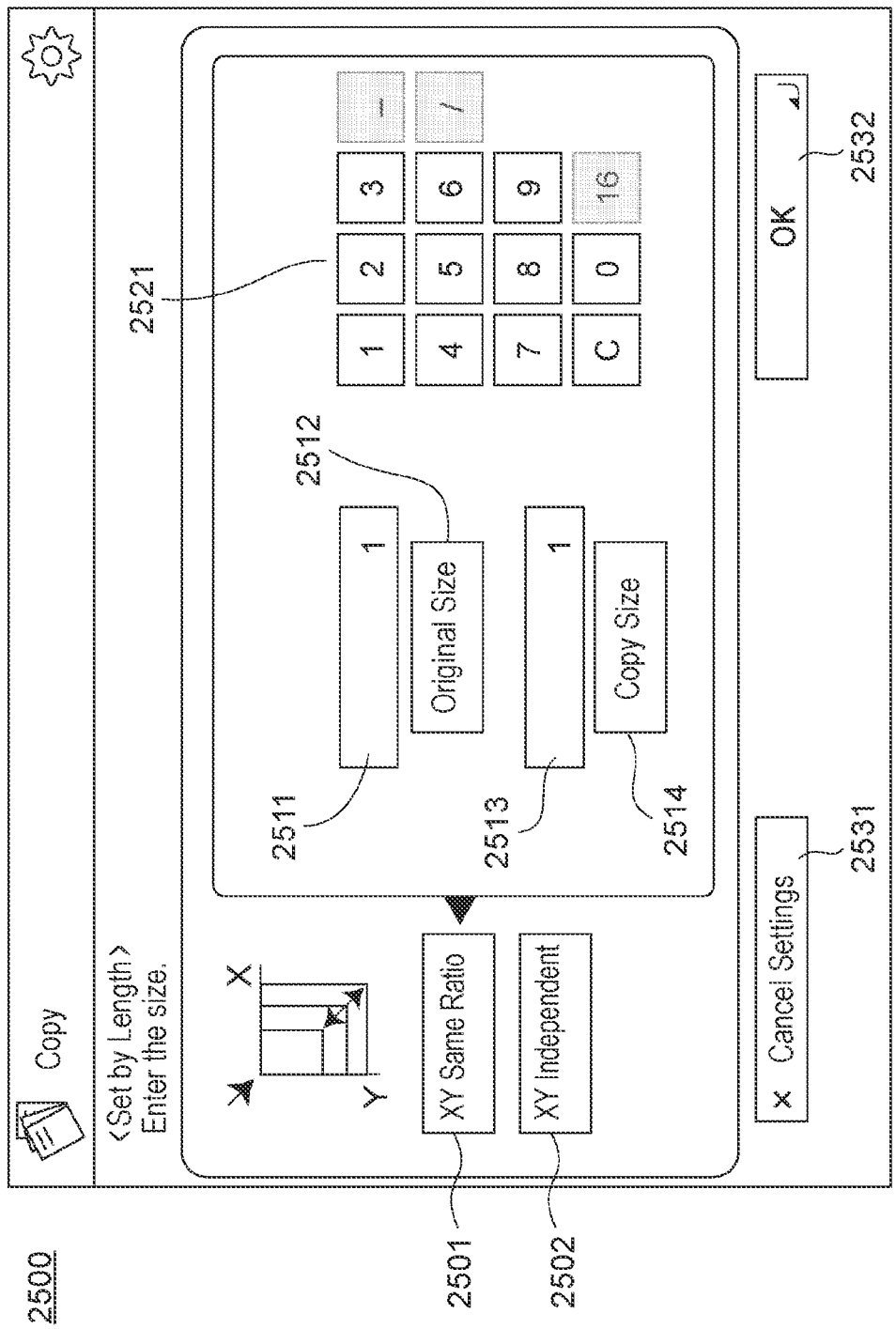
FIG. 27A illustrates in English another screen displayed by the control program of the image forming apparatus, and Figs.

The screens illustrated in English in FIG. 26A and FIG. 27A are examples of the screens different from the screen illustrated in FIG. 12A. The screens illustrated in Japanese in FIG. 26I and FIG. 27D are examples of the screens different from the screen illustrated in FIG. 12D. FIG. 26I corresponds to FIG. 26A. FIG. 27D corresponds to FIG. 27A. As in FIGS. 26A to 26H, items with longer labels can also be selected by speech input. FIGS. 26A to 26H present an example of the screen displayed by the device control program 801 and examples of the screen control information and operation-target determination information managed and used by the device control program 801.

The screen illustrated in FIG. 26A is a setting screen 2400 for setting copy ratios in the copy function. The setting screen 2400 has items 2401 to 2406, items 2411 to 2414, items 2421 to 2424, items 2431 to 2435, and items 2441 to 2444 arranged thereon. These items are labeled as shown in the table of FIG. 26B, and are operated as shown in the tables of FIGS. 26C to 26H. These examples shown in FIG. 26C to 26H are suitable examples of speech operations performed by the user who viewed the screen (FIG. 26I) displayed in Japanese. The item 2414 is labeled as "A Little Smaller (Full-Page Copy)". The user's speech on the item 2414 is, for example, "A little smaller, make it a bit small" or "Full page copy, full page", which includes words matching those in the label. On the other hand, the user 106 may say "Don't make the edge of the original disappear" or "Copy all four sides" using words that are not included in the label. That is, in this example, items on the screen can be operated even when words and expressions different from those appearing in the labels are used. The value for the item 2444 can be incremented or decremented by selecting and operating the item 2411 or item 2421.

FIGS. 27A to 27C present another example of the screen displayed by the device control program 801 and examples of the screen control information and operation-target determination information managed and used by the device control program 801. The screen illustrated in FIG. 27A is a setting screen 2500 used to specify lengths for enlargement and reduction in the copy function. The setting screen 2500 includes items 2501 and 2502, items 2511 to 2514, item 2521, and items 2531 and 2532. These items are labeled as shown in the table of FIG. 27B, and are operated as shown in the table of FIG. 27C. These examples shown in FIG. 27C are suitable examples of speech operations performed by the user who viewed the screen (FIG. 27D) displayed in Japanese. The setting screen 2500 includes not only items to be selected, such as the items 2501 and 2502, but also includes entry fields, such as the item 2511 and the item 2513, which allow entry of values. A numeric keypad, corresponding to the item 2521, may be used to enter values in the item 2511 and the item 2513. The numeric keypad may be displayed from the beginning, or may be displayed as required for entry of values. Instead of the numeric keypad used to enter numbers, a software keyboard that allows entry of alphabetic characters may be displayed. As illustrated in FIGS. 27A to 27C, the present embodiment supports entry of values using a numeric keypad. As described above, the present embodiment supports operations for entry of values, as well as operations for selection of items.

(Remarks)

As described above, in the present embodiment, the operation panel 509 of the image forming apparatus 101 can be operated by speech of the user 106. Particularly in the present embodiment, the UI components displayed on the screen can be operated even when the user 106 speaks using words that are not contained in the labels for the UI components.

In the present embodiment, an identifier is displayed on a button in response to a speech operation of the user 106. However, for operating the screen using speech, identifiers may be displayed in advance on all buttons, or on buttons that require identifiers (e.g., when the button has no name, when there is an overlap in button name, or when the button name is difficult to read).

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure may be applied either to a system including a plurality of devices, or to an apparatus including a single device. In the embodiment described above, the audio control program 601, the device control program 801, and the audio-data conversion control program 701 are executed by the audio control apparatus 100, the image forming apparatus 101, and the server 102, respectively. Alternatively, all the control programs described above may be executed by the image forming apparatus 101 that includes a microphone. The audio control program 601 and the device control program 801 may be executed by the image forming apparatus 101, with the server 102 alone separated.

The present disclosure is not limited to the embodiments described above. Various modifications (including organic combinations of the embodiments) may be made to the present disclosure on the basis of the spirit of the present disclosure, and such modifications should not be excluded from the scope of the present disclosure. That is, all combinations of the aforementioned embodiments and their modifications are included in the present disclosure.

In the embodiments described above, some of the operation screens provided by the image forming apparatus 101 have been presented, and operations performed on the screens have been explained. Screen operations based on natural language and, in particular, screen operations using words different from those appearing in labels on the screens, may also be applied to other operation screens. FIGS. 28A to 30C show tables each containing items that can be operated by speech input. The leftmost column in each of the tables in FIGS. 28A to 30C shows function categories. Exemplary functions of the image forming apparatus 101, which is an MFP, include print, copy, send, and settings for the main unit.

The second column from the left in each of the tables in FIGS. 28A to 30C shows item groups that are under the function categories shown in the leftmost column. Each of the item groups is output on one or more screens. The third column from the left in each of the tables in FIGS. 28A to 30C shows items that are put together into the item groups in the second column. The items include operation items and setting items that can be operated on the screen displayed for each of the item groups. The items in the item group "common" under the function category "common" are operation items that can be used in most of the screens, except some of them. By operating the operable operation items, the user 106 can instruct, for example, to change the setting, switch the screen, and execute the processing. That is, as in the embodiments described above, the items in shown in FIGS. 28A to 30C can be operated by speech input, as well as by touching. In particular, the speech operation can be performed by using not only the words contained in the label, but also by using alternative words related to the label.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing system comprising:
a multi-function device having plural functions of a printer and a scanner, configured to process an image;
a display device configured to display information;
a microphone configured to acquire speech information; and
one or more controllers configured to:
specify a function of the multi-function device in a speech acquired in the speech information via the microphone;
cause the display device to display specifying portions for specifying a setting of a specified function in accordance with the function being specified, the specifying portions including a plurality of selection objects regarding the specified function, wherein the plurality of selection objects includes one selection object associated with one setting;
acquire text information including a first word and a second word by analyzing speech information acquired through the microphone, and specify one setting related to processing to divide into separate sheets and enlarge corresponding to a combination of the first word and the second word;

acquire text information including a third word and a fourth word by analyzing another speech information acquired through the microphone, and specify the one setting related to the processing to divide into separate sheets and enlarge corresponding to another combination different from the combination of the first word and the second word, the another combination comprising a combination of the third word and the fourth word; and set the one setting related to the processing to divide into separate sheets and enlarge on the basis of acquisition of the combination of the first word and the second word, acquisition of the another combination of the third word and the fourth word, or selection of the one selection object.

2. The image processing system according to claim 1, wherein the display device is a touch panel with which the one selection object can be specified by a user's touch operation.

3. The image processing system according to claim 2, wherein the first word is a word contained in a label of the one selection object, and the third word and the fourth word are words not contained in the label of the one selection object.

4. The image processing system according to claim 1, wherein at least one of the first word, the second word, the third word, and the fourth word is a word obtained by kana-kanji conversion.

5. The image processing system according to claim 1, wherein a screen displayed on the display device transitions to another as execution of image processing starts.

6. The image processing system according to claim 1, further comprising an audio output device configured to output sound,
wherein the one or more controllers cause the audio output device to output an audio message as execution of image processing starts.

7. The image processing system according to claim 1, wherein settings of one of the plural functions include at least one of following:
an instruction to start scanning,
an instruction to stop scanning,
an instruction to check job status,
an instruction to start sending,
an instruction to recall a cancel confirmation screen,
one-touch operation setting,
registered destination,
mobile portal setting,
previous setting for sending function,
specified favorite setting for sending function,
scan color setting,
scan resolution setting,
scan size setting,
file format setting,
type of original setting,
two-sided original setting,
book setting,
different size originals setting,
density setting,
sharpness setting,
copy ratio setting,
setting related to erasing frame,
setting related to a job,
delayed send preview setting,
finished stamp setting,
job done notice setting,
file name information,
subject information,
message information,
reply information,
e-mail priority setting,
transmission report setting,
original content orientation setting,
blank-page scan setting, and
double feed detection setting.

8. The image processing system according to claim 1, wherein settings of one of the plural functions include at least one of following:
setting related to filtering an address list,
setting related to searching the address list,
address table setting,
detailed address information,
specified destination address,
search name information,
software keyboard setting,
registered one-touch operation information,
destination e-mail address information,
destination i-fax address information,
file information related to destination,
group information related to destination,
registered destination name,
folder search setting, and
address book information.

9. The image processing system according to claim 1, wherein settings of one of the plural functions include at least one of following:
one-touch operation settings relating to a plurality of functions,
network connection settings,
registered e-mail address information,
e-mail transmission settings,
registered i-fax address information,
i-fax transmission settings,
file storage settings,
file transmission settings,
group address information,
transmission destination information,
saved setting information,
settings related to updating configuration information,
automatic color selection settings,
color settings,
grayscale setting,
black and white binary settings,
scan resolution options,
scan size options,
file format options,
divide file into pages options,
text type of original option,
photo type of original option,
book type two-sided original option,
calendar type two-sided original option,
right-side book option,
left-side book option,
same width different size originals option,
different width different size originals option,
density adjustment option,
density background adjustment option,
high sharpness option,
low sharpness option,
preset, copy ratio options,
specified copy ratio options,
erase original frame option, erase book frame option,
erase binding option,
specified send time information,
scan and send preview options,
job done notice option,
job error notice option,
notice destination information,
remove file information setting,
overwrite existing file setting,
low priority send option,
normal priority send option,
high priority send option,
original content orientation option specifying top at far edge,
original content orientation option specifying top at side edge,
skip color originals option,
skip white originals option,
blank-page scan detection level setting, and
blank-page scan preview setting.

10. The image processing system according to claim 1, wherein each of the first word, the second word, the third word, and the fourth word is a noun or a verb.

11. The image processing system according to claim 1, wherein the processing to divide into separate sheets and enlarge is poster printing.

12. An image processing apparatus comprising:
a multi-function device having plural functions of a printer and a scanner, configured to process an image;
a display device configured to display information;
a microphone configured to acquire speech information; and
one or more controllers configured to:
specify a function of the multi-function device in a speech acquired in the speech information via the microphone;
cause the display device to display specifying portions for specifying a setting of a specified function in accordance with the function being specified, the specifying portions including a plurality of selection objects regarding the specified function, wherein the plurality of selection objects includes one selection object associated with one setting;
acquire text information including a first word and a second word by analyzing speech information acquired through the microphone, and specify one setting related to processing to divide into separate sheets and enlarge corresponding to a combination of the first word and the second word;
acquire text information including a third word and a fourth word by analyzing another speech information acquired through the microphone, and specify the one setting related to the processing to divide into separate sheets and enlarge corresponding to another combination different from the combination of the first word and the second word, the another combination comprising a combination of the third word and the fourth word; and
set the one setting related to the processing to divide into separate sheets and enlarge on the basis of acquisition of the combination of the first word and the second word, acquisition of the another combination of the third word and the fourth word, or selection of the one selection object.

13. The image processing apparatus according to claim 12, wherein the display device is a touch panel with which the one selection object can be specified by a user's touch operation.

14. The image processing apparatus according to claim 13, wherein the first word is a word contained in a label of the one selection object, and the third word and the fourth word are words not contained in the label of the one selection object.

15. The image processing apparatus according to claim 12, wherein at least one of the first word, the second word, the third word, and the fourth word is a word obtained by kana-kanji conversion.

16. The image processing apparatus according to claim 12, wherein a screen displayed on the display device transitions to another as execution of image processing starts.

17. The image processing apparatus according to claim 12, further comprising an audio output device configured to output sound,
wherein the one or more controllers cause the audio output device to output an audio message as execution of image processing starts.

18. An image processing system comprising:
a multi-function device having plural functions of a printer and a scanner, configured to process an image;
a display device configured to display information;
a microphone configured to acquire speech information; and
one or more controllers configured to:
specify a function of the multi-function device in a speech acquired in the speech information via the microphone;
cause the display device to display specifying portions for specifying a setting of a specified function in accordance with the function being specified, the specifying portions including a plurality of selection objects regarding the specified function, wherein the plurality of selection objects includes one selection object associated with one setting;
acquire text information including a first word and a second word by analyzing speech information acquired through the microphone, and specify one setting related to processing to divide into separate sheets and enlarge corresponding to a combination of the first word and the second word;
acquire text information including a third word and a fourth word by analyzing another speech information acquired through the microphone, and specify the one setting related to the processing to divide into separate sheets and enlarge corresponding to another combination different from the combination of the first word and the second word, the another combination comprising a combination of the third word and the fourth word; and
set the one setting related to the processing to divide into separate sheets and enlarge for a device configuration function on the basis of acquisition of the combination of the first word and the second word, acquisition of the another combination of the third word and the fourth word, or selection of the one selection object.

19. The image processing system according to claim 18, wherein settings of the multi-function device include at least one of following device configuration function settings:
paper cassette settings,
paper type options,
display screen settings, storage location settings,
language settings,
keyboard settings,
login user settings,
time settings,
sleep mode settings,
startup settings,
human-presence sensor settings,
network settings,
server settings,
port settings,
driver settings,
firewall settings,
device position information,
external interface settings,
external storage device settings,
audio mode settings,
volume settings, and
microphone settings.

20. The image processing system according to claim 18, wherein settings of the multi-function device include at least one of following device configuration function settings:
image quality adjustment settings,
specified density information for each application,
uneven density correction method settings,
uneven density correction settings for job type,
vividness settings,
fine adjust zoom settings,
color correction settings,
automatic gradation correction settings,
correction level settings,
test page settings,
test print settings,
saddle stitch position settings,
finisher action mode settings,
fold position settings,
stapler settings,
settings related to cleaning inside image processing system,
settings related to cleaning feeder, and
maintenance video settings.

21. The image processing system according to claim 18, wherein settings of the multi-function device include at least one of following device configuration function settings:
settings related to scan and store function,
settings related to accessing stored files,
mail box information,
mail box settings,
mail box security setting,
shared storage information,
shared storage settings,
shared storage security settings,
network storage settings, and
network communication information.

22. The image processing system according to claim 18, wherein settings of the multi-function device include at least one of following device configuration function settings:
authentication information,
user management information,
device information settings,
device name,
device location,
device information distribution settings,
destination information,
automatic distribution settings,
receipt restriction settings,
function restriction,
certificate settings,
key generation settings,
certificate information,
license information,
remote user interface settings,
software update information,
settings for managing import and export, of data in memory,
settings for managing import and export of data via network,
authentication function settings,
password information, and
password settings.

23. A method for an image processing system that includes a multi-function device having plural functions of a printer and a scanner, configured to process an image, a display device configured to display information, a microphone configured to acquire speech information, and one or more controllers, the method comprising:
specifying a function of the multi-function device in a speech acquired in the speech information via the microphone;
causing the display device to display specifying portions for specifying a setting of a specified function in accordance with the function being specified, the specifying portions including a plurality of selection objects regarding the specified function, wherein the plurality of selection objects includes one selection object associated with one setting;
acquiring text information including a first word and a second word by analyzing speech information acquired through the microphone, and specifying one setting related to processing to divide into separate sheets and enlarge corresponding to a combination of the first word and the second word;
acquiring text information including a third word and a fourth word by analyzing another speech information acquired through the microphone, and specifying the one setting related to the processing to divide into separate sheets and enlarge corresponding to another combination different from the combination of the first word and the second word, the another combination comprising a combination of the third word and the fourth word; and
setting the one setting related to the processing to divide into separate sheets and enlarge on the basis of acquisition of the combination of the first word and the second word, acquisition of the another combination of the third word and the fourth word, or selection of the one selection object.

* * * * *